US006758403B1

(12) United States Patent
Keys et al.

(10) Patent No.: US 6,758,403 B1
(45) Date of Patent: Jul. 6, 2004

(54) SYSTEM FOR EDITING DATA COLLECTION DEVICE MESSAGE DATA

(75) Inventors: Barry Keys, Batavia, NY (US); Stephen P. Deloge, Palmyra, NY (US); Larry Ramsey-Macomber, Fairport, NY (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/954,301

(22) Filed: Sep. 11, 2001

(51) Int. Cl.[7] .................................................. G05K 9/22
(52) U.S. Cl. ........................ 235/462.45; 235/462.46; 235/472.02; 235/472.03
(58) Field of Search ....................... 235/462.45, 462.46, 235/472.02, 472.03

(56) References Cited

U.S. PATENT DOCUMENTS

| 4,990,756 A | | 2/1991 | Hoemann ................... 235/462 |
| 5,065,003 A | * | 11/1991 | Wakatsuki et al. ...... 235/472.02 |
| 5,258,604 A | * | 11/1993 | Behrens et al. ......... 235/462.15 |
| 5,382,784 A | | 1/1995 | Eberhardt ................... 235/472 |
| 5,640,002 A | * | 6/1997 | Ruppert et al. ......... 235/462.46 |
| 5,664,229 A | | 9/1997 | Bhargava et al. ........... 395/885 |
| 5,675,139 A | | 10/1997 | Fama .......................... 235/472 |
| 5,696,496 A | * | 12/1997 | Kumar ................... 340/825.25 |
| 5,745,794 A | | 4/1998 | Poloniewicz et al. ....... 395/882 |
| 5,770,847 A | | 6/1998 | Olmstead ................... 235/462 |
| 5,814,803 A | | 9/1998 | Olmstead et al. ........... 235/462 |
| 5,875,415 A | | 2/1999 | Lieb et al. .................. 702/122 |
| 5,932,862 A | * | 8/1999 | Hussey et al. ......... 235/462.07 |
| 6,150,948 A | | 11/2000 | Watkins ................... 340/693.3 |
| 6,155,488 A | | 12/2000 | Olmstead et al. ........... 235/440 |
| 6,176,429 B1 | | 1/2001 | Reddersen et al. ..... 235/462.25 |
| 6,218,942 B1 | * | 4/2001 | Vega et al. .............. 340/572.1 |
| 6,293,467 B1 | | 9/2001 | Reddersen et al. ..... 235/462.15 |
| 6,415,978 B1 | | 7/2002 | McAllister ............. 235/462.01 |

OTHER PUBLICATIONS

Intermec 9511 Online Reader 1989.*

* cited by examiner

*Primary Examiner*—Michael G. Lee
*Assistant Examiner*—Kimberly Nguyen
(74) *Attorney, Agent, or Firm*—Stoel Rives LLP

(57) ABSTRACT

The invention is a data editing system for configuring a data collection device to edit decoded-out message data according to a data editing routine specified by a user programmer. In one embodiment the system includes a data collection device and a host processor assembly including a display, a user interface and a program builder program which displays on the display either representation of instructions being authored by the user-programmer or prompt messages prompting the user-programmer to information respecting requirement of the message data to be output by the data collection device. In response to information input by the user programmer, the program builder program builds a set of data editing instructions, and the set of data editing instructions are transmitted to the data collection device.

82 Claims, 20 Drawing Sheets

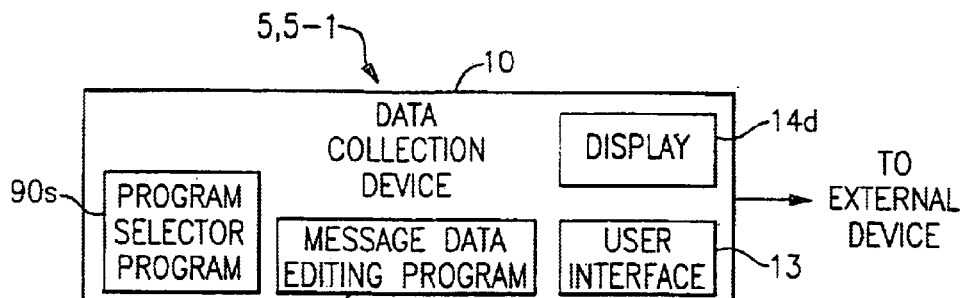
FIG.1A
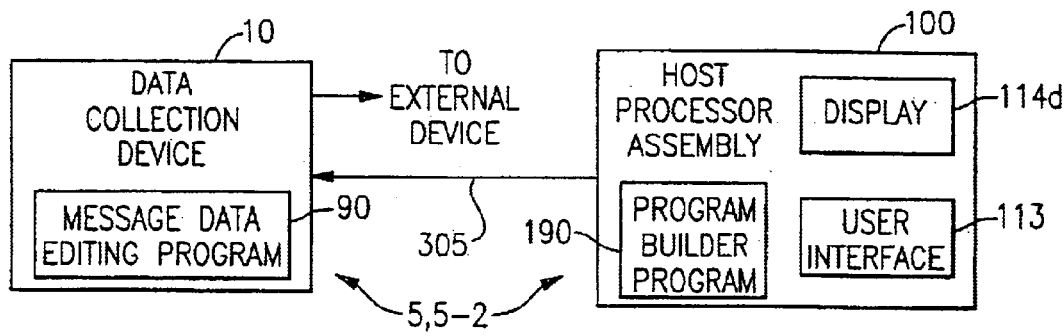
FIG.1B
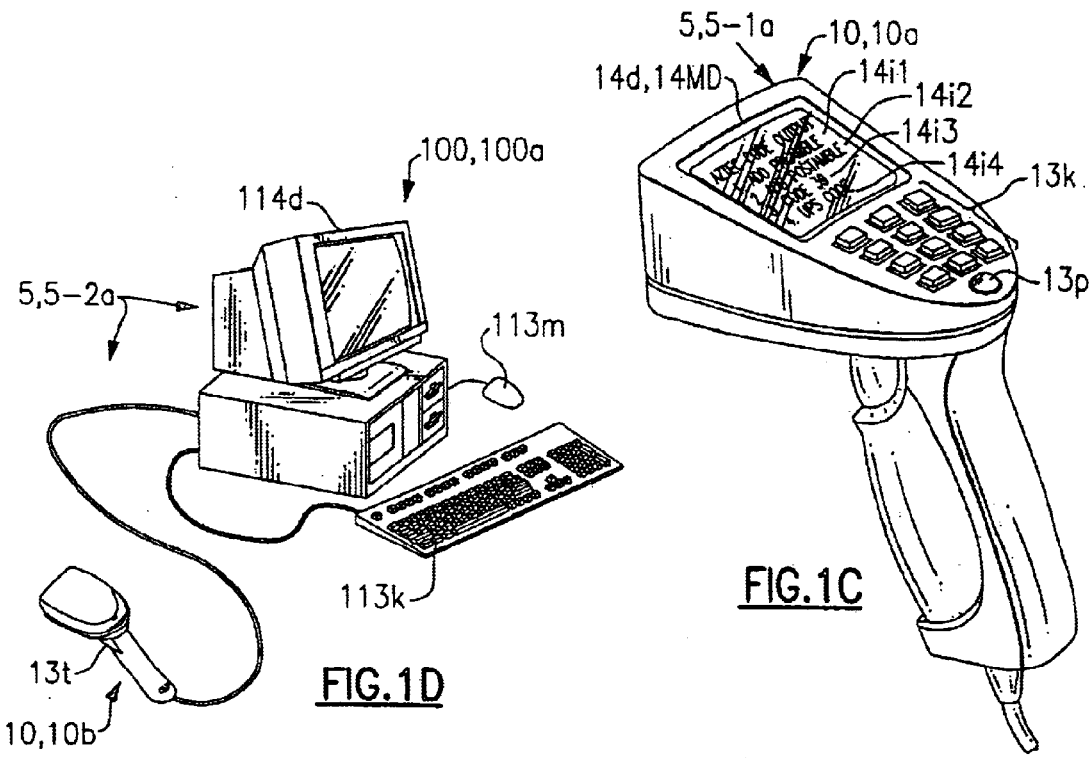
FIG.1C
FIG.1D

FIG.2C

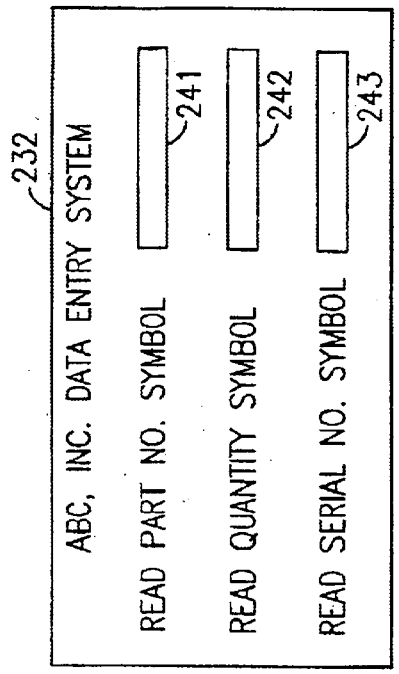
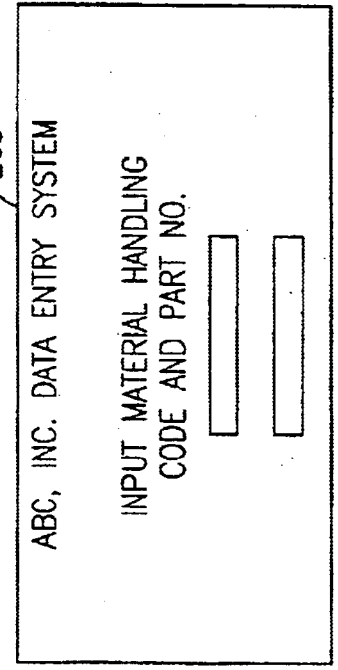
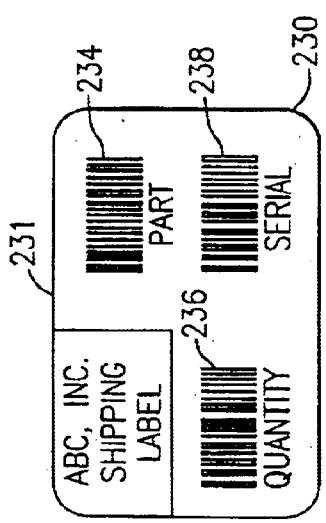

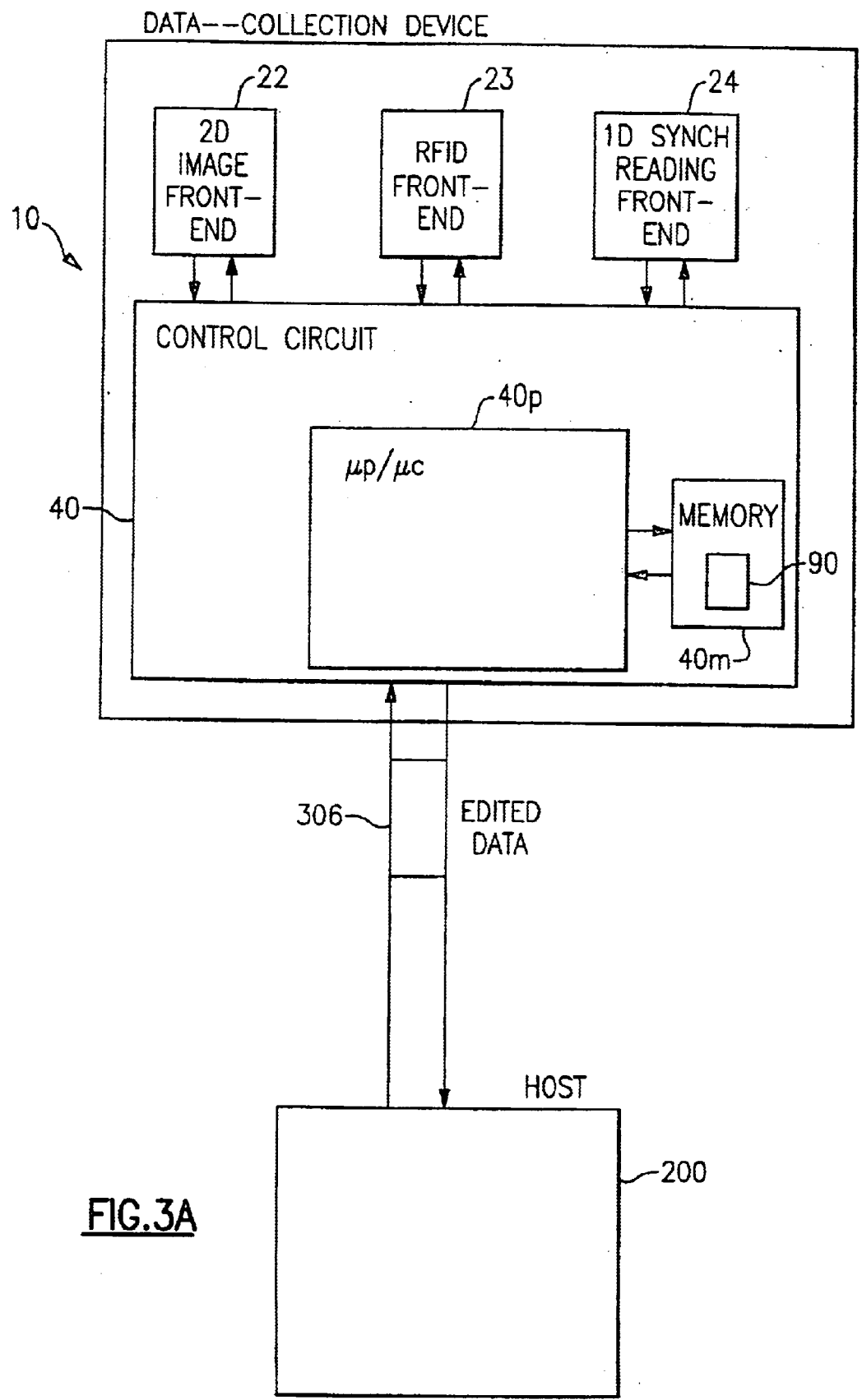

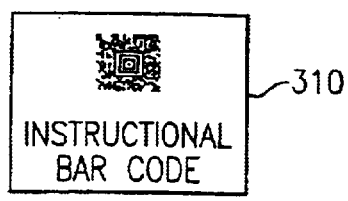
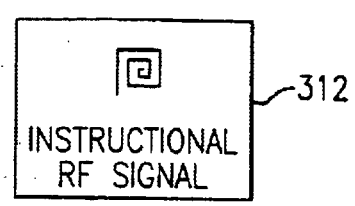
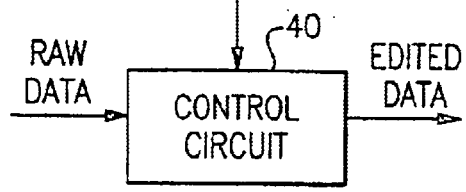
FIG.3I
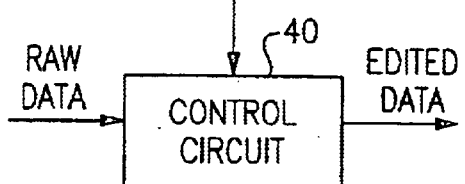
FIG.3J
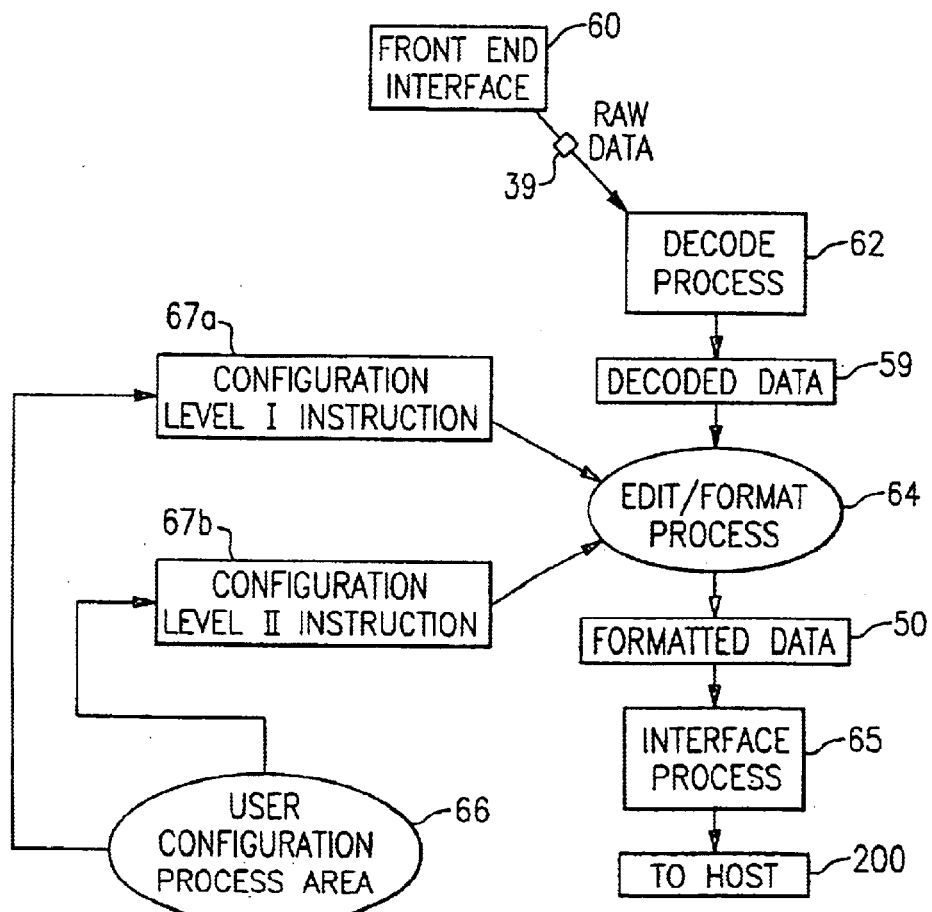
FIG.3K

FIG.4

| FIG.4A | FIG.4B |
| --- | --- |
| FIG.4C | FIG.D |
| FIG.4E | FIG.4F |

FIG.4A

TABLE 1

| DESCRIPTION | INSTRUCTION |
| --- | --- |
| DATA LOCATOR | %D% |
| DATA EDITLOG.SPEC WITH LITERAL TEXT | %D%(LITERAL STRING) |
| SYMBOL DATA MODIFIER | %DMX:Y% |
| DATA MODIFIER FIELD WITH LITERAL TEXT | %DM#,#%–%DM#,#% |
| PREAMBLE | %^PRx(STRING) |
|  | NOTE: %D% MUST BE DEFINED AFTER PREAMBLE FIELD |
| POSTAMBLE | %^POx(STRING) |
| LEFT JUSTIFICATION | %DL#% |
| RIGHT JUSTIFICATION | %DR#% |
| LEFT JUSTIFIED, PAD WITH ZEROES | %DZL#% |
| RIGHT JUSTIFIED, FILL WITH SPACE | %DSR#% |
| LEFT JUSTIFIED, NO FILL CHARS | %DNL#% |
| LEFT JUSTIFIED WITH FILL CHAR | %DZLM#,#% |
| RIGHT JUSTIFIED WITH FILL CHAR | %DZRM#,#% |
| RIGHT JUSTIFIED WITH SPACE, NO FILL CHAR | %DSRM#,#,#% |

FIG.4B

| EXAMPLE | SUBJECT MESSAGE | OUTPUT |
|---|---|---|
| %D% | 123456789012 | 123456789012 |
| %D%* | 123456789012 | 123456789012* |
| %DM1,3% | 123456789012 | 123 |
| %DM4,5% | 123456789012 | 45678 |
| %DM1,3%-%DM6,4% | 123456789012 | 123-6789 |
| %^PRA(BEFORE)%%D% | 123456789012 | BEFORE123456789012 |
| %D%%^PRA(BEFORE)% | 123456789012 | 123456789012 |
| %^PRa(BEFORE)%%D% | 123456789012 | BEFORE123456789012 |
| %^PRD(BEFORE)%%D% | 123456789012 | BEFORE123456789012 |
| %^PRd(BEFORE)%%D% | 123456789012 | BEFORE123456789012 |
| %^PRN(BEFORE)%%D% | 123456789012 | 123456789012 |
| %^PRn(BEFORE)%%D% | 123456789012 | 123456789012 |
| %^POA(AFTER)%%D% | 123456789012 | 123456789012AFTER |
| %^POa(AFTER)%%D% | 123456789012 | 123456789012AFTER |
| %^POD(AFTER)%%D% | 123456789012 | 123456789012AFTER |
| %^POd(AFTER)%%D% | 123456789012 | 123456789012AFTER |
| %^PON(AFTER)%%D% | 123456789012 | 123456789012 |
| %^POn(AFTER)%%D% | 123456789012 | 123456789012 |
| %DL3% | 123456789012 | 123 |
| %DL15% | 123456789012 | 123456789012 |
| %DR5% | 123456789012 | 89012 |
| %DR15% | 123456789012 | 123456789012 |
| %DZL15% | 123456789012 | 123456789012000 |
| %DSR15% | 123456789012 | <3 SPACES>123456789012 |
| %DNL15% | 123456789012 | 123456789012 |
| %DZLM1,15% | 123456789012 | 123456789012000 |
| %DZRM1,15% | 123456789012 | 000123456789012 |
| %DSRM1,3,5% | 123456789012 | <2 SPACES>012 |

| | | |
|---|---|---|
| RIGHT JUSTIFIED, NO FILL CHAR | %DRNM#,#,#% | |
| | %DRM#,#,#% | |
| | %DRZM#,#,#% | |
| | %DLZM#,#,#% | |
| FIXED LENGTH | %D^N=#% | |
| SEARCH STRING | %DM^N(STRING),#% | |
| SEARCH STRING WITH WILDCARD * | %D^S=(STRING WITH *)M#,#% | |
| SEARCH STRING WITH WILDCARD ? | %D^S=(STRING WITH ?)M#,#% | |
| SEARCH STRING WITH * AS LITERAL TEXT | %D^N=#,M#,#% | |
| | %D^S=(STRING WITH * AND **)M#,#% | |
| | %D^S=(STRING WITH ? AND **)M#,#% | |
| NEGATIVE SECOND PARAMETER MEANS REPORTING EVERYTHING THROUGH THE END OF STRING | %DM#,-#% | |
| E IN SECOND PARAMETER MEANS REPORTING IN REVERSE DIRECTION | %DM#,E-#% | |
| NEGATIVE FIRST PARAMETER MEANS COUNTING FROM RIGHT TO LEFT | %DM-#,#% | |
| | NOTE: IT IS ILLEGAL TO USE E IN THE SECOND PARAMETER IN THIS COMMAND | |

| | | |
|---|---|---|
| %DRSM1,3,5% | 1234567890l2 | <2 SPACES>0l2 |
| %DRNM1,3,5% | 1234567890l2 | 0l2 |
| %DRM1,3,5% | 1234567890l2 | 0l2 |
| %DR2M1,3,1% | 1234567890l2 | 3 |
| %DR2M13,2% | 1234567890l2 | 23 |
| %DR2M1,3,3% | 1234567890l2 | 123 |
| %DLZM1,3,2% | 1234567890l2 | 12 |
| %DLZM1,3,5% | 1234567890l2 | 12300 |
| %D^N=l2% | 1234567890l2 | 1234567890l2 |
| %D^N=l4% | 1234567890l2 | REPORT NOTHING |
| %DM^N(123),7% | 1234567890l2 | 1234567 |
| %DM^N(67),5% | 1234567890l2 | 67890 |
| %D^S==(4*7)M4,4% | 1234567890l2 | 4567 |
| %D^S==(678)M6,3% | 1234567890l2 | 678 |
| %D^S==(3756)M3,4% | 1234567890l2 | 3456 |
| %D^N=3,M4,3% | 1234567890l2 | 456 |
| %D^S==(1*2**)M1,4% | 123*4567 | 123* |
| %D^S==(12?**)M1,4% | 123*4567 | 123* |
| %DM5,-3% | 1834567 | 543 |
| %DM2,-1% | 1834567 | 8 |
| %DM2,-2% | 1834567 | 81 |
| %DM2,E-1% | 1834567 | 83456 |
| %DM2,E-3% | 1834567 | 8345 |
| %DM3,E-4% | 1834567 | 34 |
| %DM-3,2% | 1834567 | 56 |
| %DM-6,4% | 1834567 | 8345 |

| | | |
|---|---|---|
| SEARCH STRING WITH INDEX | %DM'CNSL(STRING),#% | NOTE: USING SL OPTION IMPLIES THE SEARCH ALWAYS START AT THE BEGINNING OF LABEL |
| | %DM'C#'(STRING),#% | |
| | %DM'C-#'(STRING),#% | |
| | %DM'C#(n)(STRING),#% | |
| SEARCH STRING WITH INDEX | | NOTE: n MEANS MOVE FORWARD n POSITIONS AFTER A SEARCHED STRING IS FOUND |
| | %DM'C#'(n)(STRING),#% | |
| | %DM'C-#'(n)(STRING),#% | NOTE: USING c IN SEARCH STRING MEANS NON-CASE SENSITIVE SEARCH. USING C IN SEARCH STRING MEANS CASE SENSITIVE SEARCH. |
| | %DM'C#E(n)(STRING),#% | |
| | %DM'C#W(n)(STRING),#% | |
| | %DM'C-#(-n)(STRING),#% | |
| | %DM'C-#(n)(STRING),#% | |
| | %DM'C-#(n)(STRING),E-#% | |
| | %DM'C-#(n)(STRING),-#% | |
| WHILE, SET OCCURANCE #, REPORT LAST RESULT | %$wcs% | |
| | WHILE,SET OCCURENCE#, REPORT LAST RESULT | |
| | %^0=#%%$w(%DM'N'(STRING),#%)(%)(%^L%%^O+%)% | |

| | | |
|---|---|---|
| %DM'CSL(34),4% | 1834567 | 3456 |
| %DM'CsI(34),4% | 1834567 | 3456 |
| %DM'CSI(34),4% | 1834567 | 3456 |
| %DM'C2(45),3% | 234567890120454 | 454 |
| %DM'C-2(45),3% | 234567890120454 | 456 |
| %DM'C[4](98),4% | 0987654321098765432 | 5432 |
| %DM'C[9](98),4% | 0987654321098765432 | 0987 |
| %DM'CS[4](89),4% | 0987654321098765432 | 5432 |
| %DM'C2[5](98),4% | 0987654321098765432 | 4321 |
| %DM'C-2[5](98),7% | 0987654321098765432 | 4321098 |
| | | |
| %DM'C-1[1-4](98),3% | 0987654321098765432 | 321 |
| %DM'C-2[4](98),5% | 0987654321098765432 | 54321 |
| %DM'C-2[4](98),E-1% | 0987654321098765432 | 543210987654321 |
| %DM'C-2[4](98),-1% | 0987654321098765432 | 5 |
| %DM'C-2[4](98),-3% | 0987654321098765432 | 567 |
| %O=1%$W%DM'N(98),5% | 0987654321098765432 | 9876598765 |
| %O=2%$W%DM'N(98),5% | 0987654321098765432 | 98765 |
| %O=2%$W%DM'N(98),5% | 0987654321098765432 | 98765 |
| %O=2%$W%DM'N(98),5% | | |

SYSTEM FOR EDITING DATA COLLECTION DEVICE MESSAGE DATA

BACKGROUND OF THE INVENTION

1. Field of the Invention

The invention relates to data editing systems in general and specifically to a system and method for editing a decoded-out data message generated by a data collection device.

2. Background of the Prior Art

Recent introductions of a variety of data encoding technologies (stacked codes, matrix codes, RF tags, smart cards, etc.) that compact more data into smaller space while providing greater error protection through redundancy have begun to replace old data encoding technologies such as 1D 4(linear) bar code technologies.

However, some managers of data management systems have avoided incorporating these data compaction technologies in their data management systems in spite of the above benefits. Many data management system managers have made significant investments in host-processor incorporated software for receiving and processing data messages (message data-receive software). Since the formats of data messages corresponding to new dataforms differ from those corresponding to old dataforms, these existing or "legacy" host incorporated software systems for receiving and processing bar code message data normally cannot receive decoded-out messages decoded from a new type of dataform without first being subjected to costly modifications.

There is a need for a system which provides for editing of message data generated by a data collection device so that message data can be generated in a custom format customized to best suited to the needs of a user.

SUMMARY OF THE INVENTION

According to its major aspects and broadly stated the invention is a data message editing system for editing message data generated by a data collection device such as an optical reader (bar code or OCR), smart card reader, mag stripe reader or RF ID reader.

In one embodiment of the invention, the data editing system of the invention includes a data collection device having a message data editing program and a program selector program incorporated therein. The data collection device is configured by the program selector program to receive device user inputs via user interface of the device and to convert the user inputs into data editing command instructions. The data editing program is responsive to the data editing command instructions so that when a decoded-out message is generated by the collection device, the decoded-out message data is edited in accordance with the user inputs.

In another embodiment of the invention, the data editing system of the invention includes a remote host processor assembly having incorporated therein a program building program for aiding a user in building a data editing program and a data collection device having incorporated therein a data editing program.

Operating in accordance with the program builder program, the host processor assembly presents prompts to a programmer-user message which prompts a programmer-user to enter data relating to the desired output format of a data message. This input data relating to the desired format of an output data message may be data relating to features of a legacy data-receive software package that will receive edited decoded-out message data from the data collection device. The program builder program builds a set of data editing instructions based on the input data, and transmits the set of data editing instructions to a data collection device. The data collection device, operating in accordance with the message data editing program, interprets and executes the transmitted set of data editing instructions to change the format of decoded-out message data so that the decoded-out message data is in a format specified by a programmer-user.

While the set of data editing instructions are conveniently developed using a program builder program which builds the set of instructions based on user-input data relating to the format of the desired output message, the program builder program in one embodiment can operate to enable a program write mode. In a program write mode, the program builder program aids a programmer-user in developing a set of data editing instructions by displaying the set of instructions presently being written by a programmer-user.

In a further aspect of the invention, highly advanced data editing instructions, such as conditional-type instructions are made available to a programmer-user for use in developing data-editing routines. A data collection device according to the invention is made so that intermediate result message data messages can be reported to a buffer memory location, so that the intermediate result message data message can be readily subjected to a subsequent data editing instruction data editing messages.

These and other details and advantages will become apparent from the detailed description of the preferred embodiment hereinbelow.

DETAILED DESCRIPTION OF THE DRAWINGS

FIG. 1a is a block diagram of a first embodiment of a data editing system of the invention comprising a specially configured data collection device;

FIG. 1b is a block diagram of another data editing system of the invention comprising a nonintegrated host processor assembly and a data collection device, both configured in accordance with the invention;

FIG. 1c is a physical schematic example of the invention as illustrated in FIG. 1a;

FIG. 1d is a physical schematic example of the invention as illustrated in FIG. 1b;

FIG. 2c is an example of a display screen driven by a program builder program of the invention in which programmer-aiming instructions displayed on a display include prompt message prompting a user-programmer to enter data respecting the desired format of a decoded-out data message;

FIG. 2d shows an exemplary shipping label comprising a plurality of 1D symbols;

FIG. 2e is a data receipt screen driven by a legacy data receive software package for receiving data generated by reading symbols of the exemplary shipping label shown in FIG. 2d;

FIG. 2f shows an exemplary shipping label comprising a single 2D symbol;

FIG. 2g shows another exemplary shipping label comprising a plurality of 1D symbols;

FIG. 2h is a data receipt screen driven by a legacy data receive software package for receiving data generated by reading symbols of the exemplary shipping label shown in FIG. 2g;

FIG. 2i illustrates an architecture of a set of data editing instructions configurable with use of a prompt screen;

FIGS. 3a–3h are block diagrams illustrating possible hardware elements which may be incorporated in various devices and host assemblies in accordance with the invention;

FIGS. 3i–3j illustrate methods for configuring a message data editing program using instruction dataforms;

FIG. 3k is a front diagram illustrating a data editing process according to the invention.

Figure 2A:
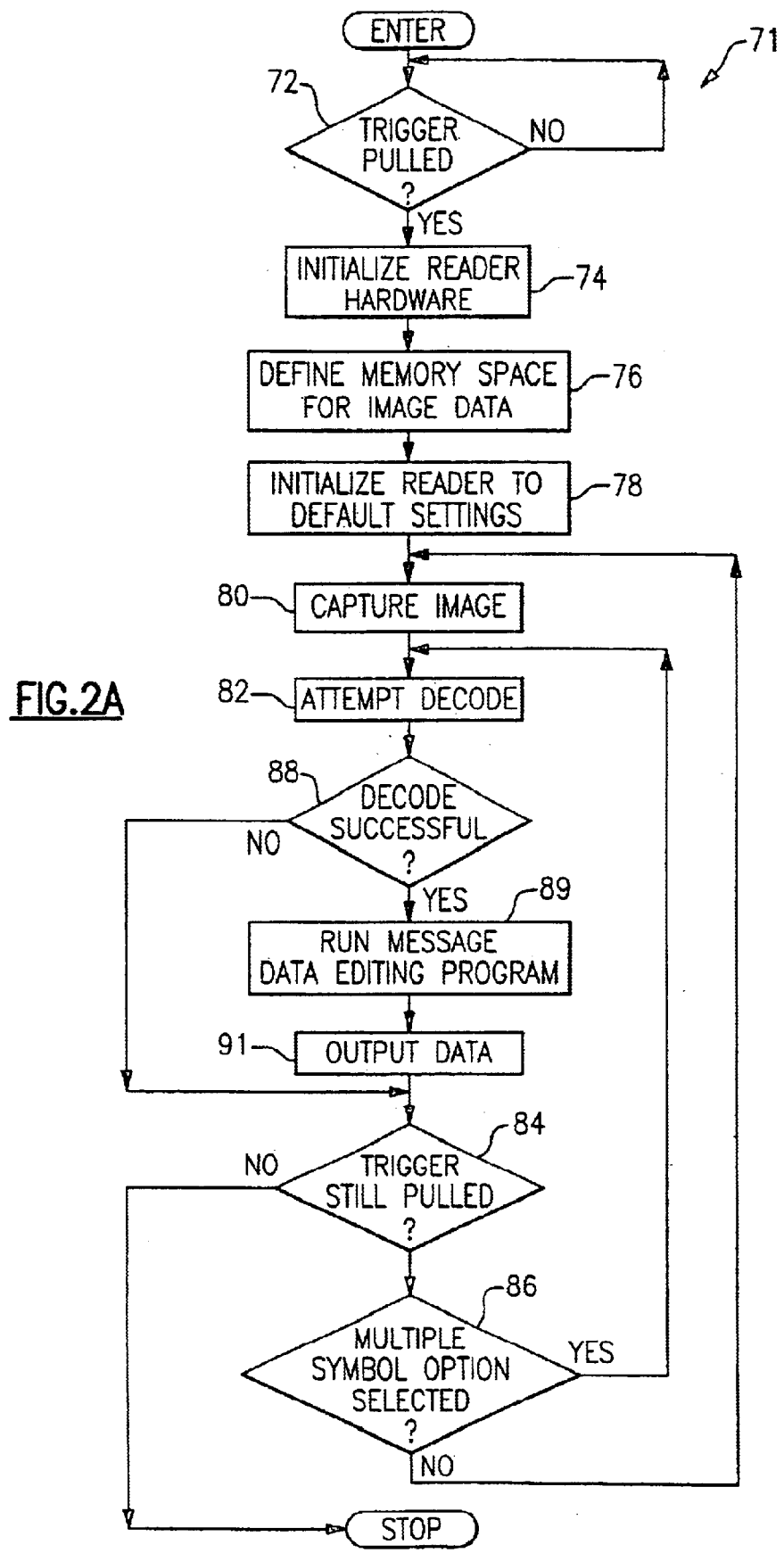
FIG. 2a is a main program loop of an optical reader data collection device configured in accordance with the invention to execute a message data editing program.

FIGS. 4 and 4A–4F compose a table illustrating instructions of an exemplary intermediate assembly code data editing instruction array.

DETAILED DESCRIPTION OF THE INVENTION

The data editing system of the present invention operates to edit decoded-out message data generated by a data collection device, such as an optical reader, so that when the data collection device outputs message data the message data is in a format desired by the user of the device.

In one embodiment of the invention, indicated by FIG. 1a, the data editing system is 5, 5-1 according to the invention is incorporated in data collection device 10 which includes a data editing program 90 and a program selector program 90s. Device 10 is configured by program selector program 90s to be responsive to user inputs entered into data collection device 10 via a user interface 13 of device (e.g. keyboard, or an instructional symbol to be discussed herein) so that a data editing routine of device 10 varies between a limited number of data editing protocol options, depending on which of a limited number of user-selectable options is selected.

In another embodiment indicated by FIG. 1b, system 5, 5-2 includes a host processor assembly 100 in communication with data collection device 10. Host processor assembly 100 includes a program builder program 190, a display 114d and a user interface 113 such as a keyboard and/or mouse, and data collection device 10 includes a data message editing program 90. Program builder program 190 displays messages aiding a programmer-user in developing a set of message data editing instructions. When developed, host assembly 100 transmits the set of data-editing instructions to data collection 10, which, operating in accordance with message data editing program 90, interprets and executes the set of message data editing instructions. System 5-2 comprising device 10 and host 100, will be described in greater detail herein.

A specific example of system 5-1 is illustrated by system 5-1a of FIG. 1c. In system 5-1a, device 10 is provided by keyboard and display-equipped optical reader 10a configured so that the specific data editing functionally provided by message data editing program builder program 90 changes depending on which of a limited number of user-selectable options is selected.

In an exemplary embodiment, system 5-1a includes a menu driver display screen 14MD outlining editing options for editing AZTEC Code message data. Device 10 can be configured so that other menu drivers outlining editing options for editing other types of message data (e.g. DATAMATRIX, RFID, PDF 417, etc.) can be displayed.

By selection of the ADD PREAMBLE option 14i1, the data message editing program 90 incorporated in reader device 10a controls reader 10a to add a preamble of predetermined form to a decoded AZTEC message before the message data is output to another device (such as a host processor assembly 200) and/or to a display, e.g. display 14d. As will be discussed in greater detail herein, device 10 can include a program builder 190 so that when the ADD PREAMBLE option is selected, the programmer-user of device 10 may be prompted via additional screen displays to add data indicating the specific PREAMBLE characters to be added and possibly, the position of the preamble characters. By selection of the ADD POSTAMBLE option corresponding to indicia 14i2, the data editing program 90 incorporated in reader 10a controls reader 10a so that reader 10a adds a postamble of a predetermined form (e.g. "CRLF") to decoded-out message prior the decoded-out message being output to an external device. As will be discussed in greater detail herein, device 10 can include a program builder program 190 so that a user may be prompted via additional screen displays to input the characters comprising the POSTAMBLE after the ADD POSTAMBLE option is selected.

With further reference to the example of FIG. 1c, it will be seen that by selection of the CODE 39 option corresponding to indicia 14i3, the data editing program 90 of reader 10a operates to convert the AZTEC code message data into a form that will be recognized by an external device as CODE 39 message data. AZTEC code message data in one data management system may comprise a first type of symbology identifier while CODE 39 message data in that data management system may comprise a second type of symbology identifier. Accordingly, when the CODE 39 option corresponding to indicia 14i3 is selected, the data message editing program 90 of reader 10a in one embodiment may operate to change the symbology identifier of the decoded-out message from the first type of the second type AZTEC code message data in one data management system may also comprise characters that cannot be encoded using CODE 39 symbology. Accordingly, when the CODE 39 option corresponding to indicia 14i3 is selected, the message data editing program 90 of device 10 in one embodiment may operate to change the value of characters in the message data that are not possible in CODE 39 into generic "fill" character possible in CODE 39. AZTEC code message data in a possible data management system may also comprise a long string of characters having multiple groups, wherein only one of the groups corresponds to data previously encoded in CODE 39 symbology in the data management system. Selection of option 14i3, in such a data management system may result in program 90 being configured to identify and selecting only the group corresponding to data previously encoded using a CODE 39 symbol. By selection of the UPS CODE option corresponding to indicia 14i4, program 90 operates to convert the AZTEC code message data into a form that will be recognized by an external device (e.g. device) as UPS CODE message data, according to a protocol similar to one of the editing protocols described above with reference to the code 39 option 14i3.

As alluded to with reference to the above example the particular data editing requirements of a user of device 10 may be rather specific and may vary from data management system to data management system, and from application to application. Accordingly, benefits and advantages of data of system 5-2, to be described in greater detail herein and of program builder program 190, (which may be incorporated in host 100 and/or device 10) relating to the ability of system 5-2 and program 190 to aid a user in developing highly specific and detailed customized message data editing routines and of system 5-3, which is useful in updating and reconfiguring menu drivers such as menu driver 14MD will be apparent.

Referring again to the example of FIG. 1c, device 10 can be configured so that the data editing program 90 incorporated in device 10 is called or executed prior to the outputting of message data as part of a main operating program incorporated in device 10. FIG. 2a shows a flow diagram of a main operating program 71 typical of device 10 when device is provided by an optical reader such as reader device 10a shown in FIG. 1c. At block 72, reader 10a waits for trigger 13t to be pulled. If trigger 13t is pulled, reader 10a proceeds to blocks 74, 76, and 78 to initialize reader hardware, define memory space for image data, and initialize reader default settings. Reader 10a then proceeds to block 80 to capture an image (in the case of an imaging based optical reader), and then attempts to decode a bar code at block 82. If decoding is unsuccessful, reader 10a proceeds to block 84 to determine whether trigger 13t is still activated. If trigger 13t is still activated, reader 10a proceeds again to attempt to decode another marking within a captured image or to capture another image at block 80 depending upon whether a multiple symbol option (block 86) has been selected. If decoding is successful (block 88) reader 10a proceeds to block 89 to launch message data editing program 90 according to the invention.

Message data editing program 90 is preferably a program that can execute script instructions. Script instructions are programming instructions that can be interpreted and executed, by an existing program without first being compiled as a group of instructions by a processor equipped with an operating system (e.g. WINDOWS, DOS, WINDOWS CE). Providing message data editing program 90 so that program 90 executes script instructions provides for a fast and versatile message data editing system. The specific message data editing that is performed by reader 10a is dependent on the specific set of script instructions presented to the script executing program for interpretation and execution. Therefore the specific data editing message processing that is performed by reader 10a in accordance with program 90 depends on the specific script instruction presented to program 90 for execution. In the embodiment of FIG. 1c, reader 10a is adapted so that program 10 is presented with a different set of script instructions depending on which menu option indicated by driver 14MD is selected. That is, if the ADD PREAMBLE option corresponding to indicia 14i1 is selected, a first set of script instructions is interpreted and executed by program 90. If the ADD POSTAMBLE option is selected corresponding to indicia 14i2, a second set of script instructions is interpreted and executed by program 90, and so on.

Of course, other methods for configuring reader data collection device 10a to execute a user-selected message data routines are possible. Message data editing program 90 can be embedded in the main operating program of device 10a without being of a type that interprets and executes script instructions. If equipped with an operating system, device 10 can be configured so that selection of one specific menu option such as an option indicated by driver 14MD results in a specific set of assembly language or high level language instructions being established which include both main loop instructions (corresponding to blocks 72, 74, 76, 78, 80, 82, 84, 86, 88, and 91), and message data instructions for editing message data which are then compiled, and loaded into a program memory device of reader 10a for replacing the existing main operating program.

The message data editing system described with reference to FIG. 1c is shown as being incorporated in an advanced type of optical reader 10a having a keyboard 13k, a pointer 13p, a display 14d, and a graphical user interface (GUI) which provides for "point and click" selection with use of pointer 13p of the menu options of menu driver display 14MD. Data collection devices of the type having a display 14d and keyboard 13k are sometimes referred to as portable data terminals (PDTs). However, in the interest of providing data collection devices that are rugged and low cost, many data collection devices do not have keyboards, displays, or graphical user interfaces, and many data collection devices do not have operating systems incorporated therein. Further, even with menu driver 14md presenting multiple data editing options, the specific data editing requirements of a user may be in advance of those available via preprogrammed menu driver 14md, without a reconfiguration of menu driver 14md.

Figure 2B:
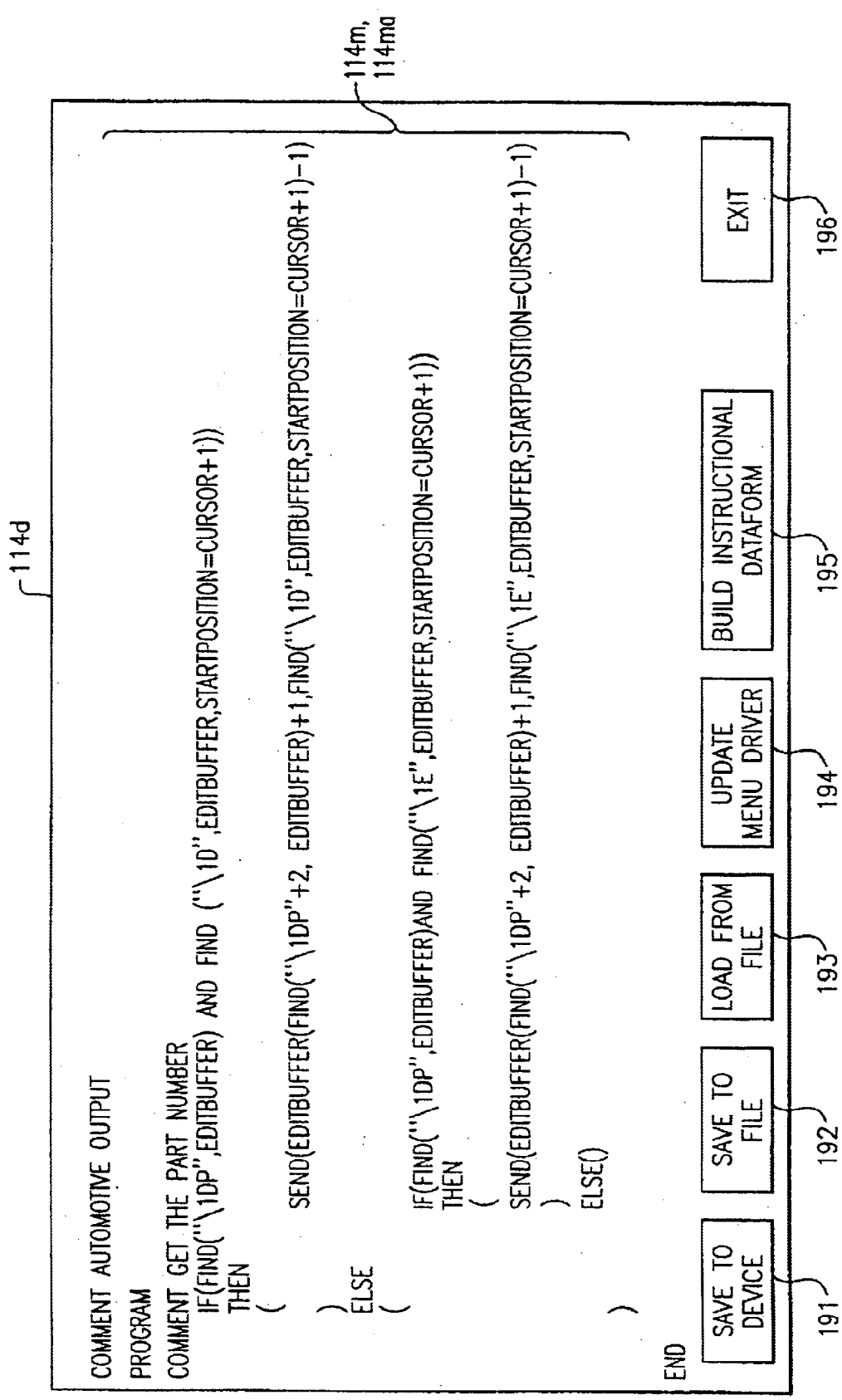
FIG. 2b is an example of a display screen driven by program builder program of the invention in which programmer-aiding message displayed on a display include data editing instructions.
Figure 21:
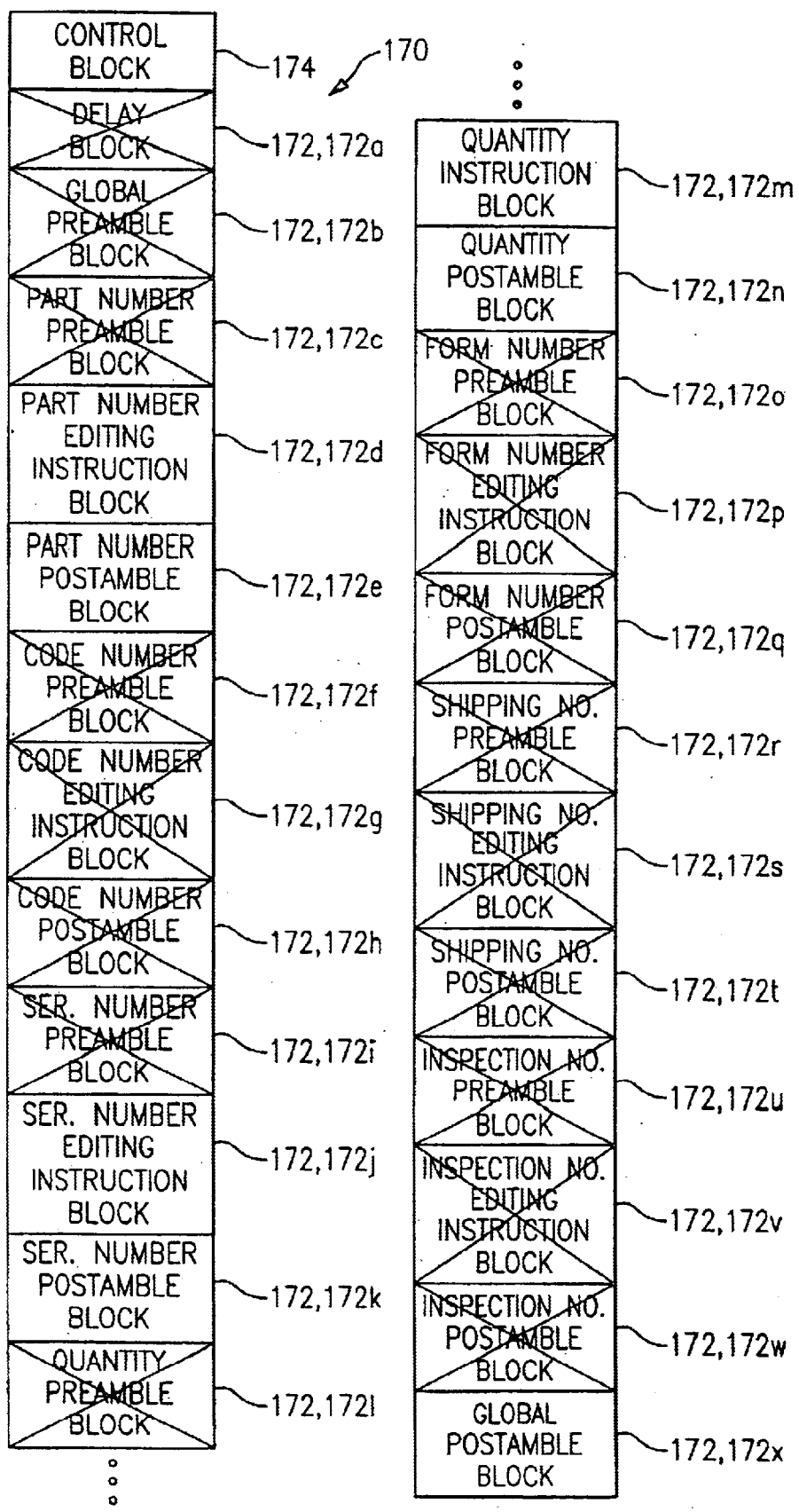

Referring again to FIG. 1b, a highly advantageous and useful embodiment of the invention including a host processor assembly 100 incorporating a program builder program 190 is described in detail. In the embodiment of FIG. 1b, data message editing system 5, 5-2 comprises a data collection device 10 having a data message editing program 190 and a nonintegrated local or remote host processor assembly 100 including a program builder program 90. Host processor assembly 100 operating in accordance with a program builder program 190 aids a user-programmer in building a set of data editing instructions which are transmitted to device 10 for interpretation and execution by data collection device 10 operating in accordance with message data editing program 90. The system architecture shown in FIG. 1b is highly useful in the case that device 10 does not have a keyboard or other hand-actuated user interface, because it allows advanced instructions regarding a desired message data editing protocol to be readily communicated to device 10 by way of hand input data input into host assembly 100. The system architecture shown in FIG. 1b is also highly useful in the case that device does comprise a keyboard 13k and/or an advanced hand activated user interface such as a GUI, because the system architecture shown in FIG. 1b can be universally applied for use relative to all data collection devices including those that have and those that do not have keyboards or other hand actuated user interfaces and further because it is in general easier for a programmer-user of host 100 to use a graphical user interface and keyboard of a relatively larger nonintegrated host processor assembly 100 which conveniently implemented by a personal computer (PC) than it is to utilize a keyboard and GUI of a relatively smaller portable data collection device, e.g. device 10a. Still further, because host processor assembly 100 is commonly in communication with device 10 at least for the purpose of receiving data messages output by device 10 the architecture of FIG. 1b makes use of a preexisting hardware and communication network, as is indicated by the specific embodiment of system 5-2 shown in FIG. 3g. In addition, the software architecture as shown in FIG. 1b, wherein program builder program 190 is incorporated in a non-integrated host processor assembly 100 physically separate from device 10, allows several devices 10 to be configured for data editing according to a certain protocol by installation of program builder program 90 in a single computer system, rather than in several devices. When the invention is provided in accordance with the architecture as shown in FIG. 2b, it is seen that the servicing, upgrading, or reconfiguring, of program builder program 190 requires servicing, upgrading, or reconfiguring of a single or limited number of host assemblies 100, and does not require servicing, upgrading, or reconfiguring of several individual data collection devices 10.

A specific example of data message editing system 5-2 shown in FIG. 1b is illustrated in FIG. 1d. In the embodiment of FIG. 1d data collection device 10 is provided by a keyboardless hand held optical reader 10b and nonintegrated host processor assembly 100 is provided by a local nonintegrated personal computer 100a. Nonintegrated host assembly 100 may also be a remote nonintegrated host assembly located remotely from device 10 and in communication with device 10 via a network which may be the Internet. Host assembly 100 can also be a remote or locally situated nonintegrated assembly 100 which communicates with device 10 via instructional dataforms which will be described further herein. While device 10 is shown in FIG. 1c or 1d as comprising the form factor of a traditional gun-style optical reader, it will be understood that device 10 can also comprise the form factor of, for example, a personal data assistant (PDA), a digital camera, a mobile telephone, a transaction terminal or an RF tag reader. While host assembly 100 is in the form factor of a PC, it is understood that host 100 could also comprise the form factor of, for example, a cash register, a transaction terminal, or another form factor that includes a user interface and a display such as a PDT OR PDA.

Referring to specific features of system 5-2a, host processor assembly 100 can be made to display on display 114d messages which aid a user of processor assembly 100 in developing data editing instructions for transmission to device 10 and for interpreting, and execution by message data editing program 90 of device 10. In one embodiment, program builder program 190 enables a program write mode of operation of processor assembly 100. In another embodiment to be described in greater detail herein, program builder program 190 controls host assembly 100 to display informational prompt messages on display 14d which prompt a programmer-user to enter information related to requirement of edited message data to be output by device 10. In a program write mode, a programer-user of host processor assembly 100 writes a series of instructions in a developed data message editing programming language, and host processor assembly 100 operating in accordance with program builder program 190 displays on display 114d the sequence of instruction presently being authored by programmer-user of host processor assembly 100.

In one embodiment of a program write mode which may be driven by program 190, the set of instructions displayed on display 14d are a set of instructions appearing in assembly code. In another embodiment, the set of instructions displayed on display 114d in a program write mode are represented in an intermediate assembly code language. An intermediate assembly code language is similar to a standard assembly code language in that in an intermediate assembly code language employs memory space-saving mnemonics to designate instructions. Memory space conserving mnemonics normally require that a user-programmer make reference to a user manual to comprehend the mnemonics unless the programer is extensively experienced with the intermediate assembly code language. However, unlike standard assembly code instructions, intermediate assembly code instructions are not immediately executable by device processor 40 and must be subjected to interpretation (e.g. with a control program) before being executed by device processor 40.

Currently available data collection devices have limited message data editing capability. Currently available data collection devices, such as optical readers, are responsive to only a limited set of data editing instruction types, cannot generate intermediate data output messages for further editing action by subsequent data editing instructions, and are not configured to execute advanced instruction types such as conditional type data editing instructions.

Given the limited data editing functionality of existing data collection devices, it is expected that reconfiguration of instruction interpreting software (e.g. a control program) of device 10 may be necessary for implementation of advanced data editing instructions of the types described herein.

It will be seen that several of the advanced types of data editing instructions to be described hereinbelow, particularly when implemented in combination require at least one intermediate result message data message being generated by program 90. An intermediate result message data message is a message data message that is generated for further action by a subsequent data editing instruction rather than for reporting to host 200. A program developer developing program 90 can enable program 90 to generate intermediate message data messages by configuring program 90 to establish buffer memory locations in memory 40M, and to write intermediate result message data messages to these established buffer memory locations during the course of executing a set of data editing instructions which require intermediate result message data message generation.

In one example of the invention described further hereinbelow, a user-programmer can establish and utilize a buffer memory location by declaring a variable and storing an intermediate result data to the variable. In addition, buffer memory locations will be established and utilized when program 90 is executed if program 90 is configured to execute certain recursion programming operations standardly known to skilled artisans including such operations as saving indices if specified strings are found in a data message, providing temporary markers relative to a data message for reference by a subsequent search, allowing a user-programmer to define an area of interest in a subject message data which can be transmitted to a subroutine to be further operated on, and allowing a user-programmer to create indexing variables.

Referring to further aspects of the development of message data editing program 90, a developer of data editing program 90 may make certain design choices relative to the implementation of conditional type instructions to be described hereinbelow. A program developer may determine, for example, whether conditional type instructions to be described hereinbelow will determine conditional results based on true/false outcomes from operations, whether conditional type instructions will determine conditional results based on the presence or absence of data, or whether conditional type instructions will determine conditional results based either on true/false conditions or on the presence or absence.

For enabling control circuit 40 to recognize control flag adding instructions to be described hereinbelow, a developer of program 90 may reconfigure a main programming loop e.g. loop 171 so that control circuit 40 is configured to carry out a plurality of predetermined actions (e.g sending a message to display 14m, controlling photo sensor 32, actuating acoustic output 14a, aborting the sending of a data message to host, sending a data message to host in spite of a data incompatibility being detected) in response to a control flags being recognized, wherein the specific predetermined action or actions executed by control circuit 40 depends on which type, out of a plurality of types of control flags is recognized by circuit 40.

An array of data editing instructions according to the invention previously comprises advanced instructions such as string search data locator type instructions, occurrence count type instruction, sort type instructions and conditional type instructions. A set of data editing instructions according to the invention may comprise the following instruction types:

1. Report type Instructions.

This type of instruction when executed by program 90 results in specified character data being output to display e.g. 14d, 214d, or to host processor assembly 100. In the intermediate assembly code EXAMPLE I described below, report instructions are defined by the "M" parameter embedded in an instruction strings as described in detail in that EXAMPLE. In high level instruction set EXAMPLE II described herein below, report type instructions are defined as separate instructions. The defined "OUTPUTSTRING" instruction of EXAMPLE II is used to report specified data to a display. The defined SEND instruction of EXAMPLE II is used to report specified message data to a data-receipt host 200. Report type instructions can also be used to report strings of data messages to internal memory locations, so that the reported string can be acted upon by a subsequent instruction. In the high level language EXAMPLE II described hereinbelow it is seen that a STRING instruction can be used to develop a string variable. Intermediate editing results can be copied to the string variable so the new value of the string variable is an intermediate editing result which can readily be acted upon by subsequent editing instructions. For example, wherein the set of instructions:

String sl+32 sl=LAST DECODED MESSAGE (FIND ("pall", last decoded messages),

Find ("ENDPAL", Last Decoded Message))

Output String (Sl(Find("P/N")+3, find ("P/N")+12))

In accordance with the array of instructions described in EXAMPLE II is provided (utilizing the overwrite feature at the LAST DECODED MESSAGE variable, Sec. 2.4) intermediate result data editing messages are copied to the variable s1, and therefore stored a buffer memory location. As described also hereinabove, buffer memory locations are also established and utilized wherein program 90 is configured to execute certain recursion programming operations. Report type instructions also include justification instructions as described in EXAMPLES I and II. Still further, "a last result reported" type report type instructions causes a previous report instructions to be repeated.

2. Data Locating type instructions.

This type of instruction when executed by program 90 causes program 90 to identify a character, or in accordance with an advanced feature incorporated in the invention, a string of characters. In the intermediate assembly code EXAMPLE I described hereinbelow, the instructions designated with the parameter D are used for identifying a character, and the instructions designated by the parameter S coupled with the parameter D for use in identifying strings of specified characters. In the high level language EXAMPLE II provided hereinbelow, the instruction FIND is defined and developed to implement data locating. As is explained in EXAMPLES I and II, data locating type instructions are commonly implemented in combination with report type instructions. That is, program 90 is commonly caused to locate a character or character strings (such as a group separator which is commonly several characters) and to report message data in a specified position relative to the located character or string.

3. Occurrence Count Type Instructions.

This type of instruction when executed by program 90 causes program 90 to maintain a record of the number of occurrences of a character or character string in a data message. In the intermediate assembly code EXAMPLE I below, the parameter O is defined for implementing an occurrence count instruction.

4. Sorting Type instructions.

This type of instruction, in one example, when executed by program 90 causes device 10 to report a specified section of a data message in reverse direction. In the intermediate assembly code EXAMPLE I, the combination of the modifier "−" and the parameter M are defined for implementation of a sorting instruction. Sort type instructions also include instructions which when executed by program 90 result the characters of message data message being reported in, for example ascending order from lowest to highest value or descending order from highest to lowest value.

5. Character adding type Instructions.

This type of instruction when executed by program 90 causes character data to be added to a message. In the intermediate assembly code EXAMPLEI, parenthesis "( )" are defined for implementation of an add character type instruction. Further, preamble (PR) and postamble (PO) parameters are defined for implementing character adding instructions specifically at preamble or postamble location of a data message. In EXAMPLE II, strings of characters can be added in connection with the report type instructions, designed to be implemented with use of the "OUTPUTSTRING" and "SEND" mnemonics.

6. Flag Adding Type Instructions.

This type of instruction when executed by program 90 causes a control flag to be communicated to control circuit 40 which will be recognized as a control flag and not as character data for reporting. In the intermediate assembly code EXAMPLE I, described below, the parameters E, W, and T are defined for implementation of an instruction of this type. IN EXAMPLE I, flag adding instructions are implemented in connection with a data locator instruction. Program 90 can be configured to recognize a control flag when a data message does not include a specified character or string specified by a data locating type instruction. In EXAMPLE I control flags can be raised in connection with conditional instructions to be described below. In EXAMPLE II, it is seen that several instructions (e.g. BEEP, TemporarilyEnableDisplay, WAIT, WARNING) are developed which when executed by program to result in a hardware element of device 10 being controlled. Such instruction are typically authored in combination with a conditional type instruction to be described hereinbelow so that the hardware element (e.g. OUTPUT 14A, display 14d) is controlled conditionally on the condition that a specified condition respecting the character data is satisfied. It will be seen that data editing instructions can be developed so that control circuit 40 executes a specified control (e.g. controls photodetector 32 to capture another image (block 80), attempts to decode again (block 82), displays an error message to display 14d) depending on whether a data message satisfies a predetermined condition. Flag adding type instructions can also be implemented to cause control circuit 40 to execute a delay after or before reporting a string of characters. In the intermediate assembly code described in EXAMPLE I, the syntax %^W=d% is defined for executing a delay before or after reporting a string of characters.

It will be seen that a highly useful and advantageous aspect of the invention is its capacity to cause control flags to be raised during processing of decoded out message data. For example, presently available data collection devices are able to determine that an attempt to decode a data form (block 88, FIG. 2*a*) is unsuccessful only if decoded-out message data cannot be generated. In prior art data collection devices, decoded out message data is reported to a host 100 as long as decoded-out message data is generated even if the decoded-out message data does not correspond to the message data intended to be encoded during the encoding of the data form. The availability of control flag instructions according to the present invention allows the determination of whether a decode attempt has been unsuccessful to be made by control circuit 40 after a decoded out string of message data is generated. For example, control circuit 40 can be configured by a set of data editing instructions to process a string of decoded-out message data so that control circuit 40 determines that decoding has failed based on whether the characters of a string of message data satisfy specified conditions indicative of the decoding attempt successfully decoding the specific character string encoded in the symbol. Program builder 90 allows a programmer-user to readily reconfigure the processing of the decoded-out data stream from application to application.

In a more specific example of the invention, control circuit 40 can be configured by way of a set of data editing messages including flag raising instructions described herein to impart different control on elements of device 10 depending on a determined level of compatibility between a decoded-out data message and known characteristics encoded data of the data form from which the decoded-out message data was generated (the expected decoded-out character string). It will be seen that control circuit 40 can be programmed by way of a set of data editing instructions described herein so that (1) if there is a low level of compatibility between the is actual decoded-out character string and the expected character string (indicating a "termination" condition), control circuit 40 stops the decoding attempt process until trigger 13*t* is released and reactivated and aborts the transmission of the decoded-out message to host, (2) if there is an intermediate level of compatibility between the actual decoded-out character string and the expected characters string (indicating an "error" condition), control circuit 40 automatically executes block 82 to attempt to decode a data form using the same image data yielding the present decoded-out message (or new image data via control of sensor 32 to capture a new image) but nevertheless transmits the error-containing data to host 200, and (3) if there is a high but imperfect level of compatibility between the decoded-out message data and the expected data (indicating a "warning" condition) control circuit 40 displays an error message on display 14*d* such as "CHARACTER ERROR" or "MESSAGE SENT WITH DECODE ERROR" or a similar message but nevertheless sends the error-containing message to host 200. Control circuit 40 can also be configured to display on display 14*d* a success-indicating message, e.g. "COMPATIBILITY CHECK SUCCESSFUL" if the compatibility check designated by a set of data editing instructions is successful. It is seen that the availability of flag raising instructions as part of data editing programming language allows control circuit 40 to transmit error-containing decoded-out message data to host 200 even though an error condition is detected by device 10 by analysis of decoded-out message data. Currently available data collection devices cannot transmit error-containing decoded-out message data contemporaneously while recognizing a decode fail condition is present by analysis of decoded-out message data.

Control circuit 40 can also be configured to activate acoustic output device 14*a* in response to receiving a control flag raising instruction from programming host 100. For example, control circuit 40 can be made to activate distinguishable warning, error, or termination-indicating alarms corresponding to the various "warning", "error", and "termination" conditions described above with use of acoustic output device 14*a* depending on the result of a compatibility check between a decoded-out data message and an expected data message defined by a set of data editing instructions.

7. Conditional Type Instructions.

This type of instruction when executed by program 90 results in acts being taken (e.g. a control flag being raised, a data locator instruction being executed, a character string reported, a string of characters being added, another conditional instruction being executed) only on the occurrence of a specified condition. Falling under this category (since they are executed only in connection with conditional type instructions) are all comparative type expressions (=,>,<) and all logic type expressions (and/or). In both the intermediate level code EXAMPLE I, and the high level language EXAMPLE II described hereinbelow, "If", "While" and "Do While" instructions are defined as types of conditional type instructions. In the intermediate assembly code EXAMPLE I, the parameters "I", "W", and "DW" are designed for implementing conditional type instructions. In the high level language example of the invention described in EXAMPLE II, the mnemonics "IF..THEN", "WHILE..ELSE" and "DO WHILE...else" are designed for implementing conditional type instructions.

Conditional type instructions can be combined with other types of instructions in applications involving the invention in an essentially endless variety of useful ways. As indicated above, a set of instructions can be developed using program builder program 190 so the raising of a control flag is made conditional based on, for example, (1) a character being present or not being present in the data message, (2) a character string being present or not being present in a data message (3) an occurrence count obtaining a specified value. The reporting of a character string with use of a report type instruction, or the adding of character data with use of a character adding type instruction can also me made conditional on the occurrence of a specified condition such as (1) a character being present or not being present in the data message (2) a character string being present or not being present in a data message (3) an occurrence count obtaining a specified value. Further, the execution of a conditional type instruction can be made conditional on the status of other conditional instructions. It can be seen that conditional instructions can be combined together to develop an essentially endless variety of instructions. For example, an advanced command which results in characters of a data message being reported in ascending (lowest value to highest value) or descending (highest value to lowest value) can be developed by combining conditional instructions with report instructions. In EXAMPLE I below it is seen that flag adding type instructions are implemented in combination with data locator type instructions. Data locator type instructions when used to condition whether a flag will be raised may be considered conditional type instructions, as described herein.

EXAMPLE I

In Example I, an array of data editing instructions developed in an intermediate assembly code language for use in developing strings of instructions referred to hereinbelow as "edit formats," comprising instructions and "fixed text," the characters added by a character adding type instructions is described. FIG. 4 shows a table (TABLE 1) Listing an array of intermediate assembly code instruction, and the effect of applying various instructions to subject messages. Further details respecting the instructions of TABLE 1 are as follows:

1.1 Data Locators.

A data locator permits symbol data to be edited and reported and can be used multiple times in an edit format to edit and report symbol data in different ways. For example, via the M parameter, so that only a subset of the raw data is reported; message data can also be right or left justified data editing instructions can conditionally add a preamble or postamble depending on whether or not any data results from the range adjustment step. For example, a social security number symbol decoded as "123456789" can be edited for reporting as "123-45-6789" using the edit format %DM1,3%-%DM4,2%-%DM6,4%, where 3 characters starting at the first position in the symbol data are specified, followed by a dash, followed by 2 characters starting at the fourth position in the symbol data, followed by a dash, followed by 4 characters starting at the sixth position in the symbol message data. The text "Soc. sec. #=" could be positioned in front of the %DM1,3% to produce "Soc. sec. #32 123-45-6789" as output by changing %DM1,3% to %D^PRD (Soc. sec. #=)M1,3%. The edit formats %DM1, 3%, %DM4, 2%, and %DM6,4% are all data locator type instructions embedded with reporting type instructions. In addition to specifying what text to report, message data can also optionally be right or left justified, possibly with blank or zero padding. For example, changing %DM1,3% to %DZLM1, 3,5% causes the first field to be left justified in a 5 character field resulting in "12300-45-6789", where two zero pad characters are added to the 3 symbol data characters. There are more elaborate ways of specifying the symbol data to be used via the M parameter (using search strings, for example) which will be explained in more detail in the Syntax section below.

Reporting from a data locator may also be controlled by fixed length and match string parameters that are a part of the overall data locator. These are applied to the symbol data after processing by the M parameter, but before justification. If a fixed length parameter exists, then the length of the range adjusted (M parameter) data must equal the fixed length specified. Likewise, if a match string parameter exists, then the range adjusted data must equal the string specified by the match string parameter. An example of match string usage is %D^S=(12*3)M1,3%, which will result in "123" being reported from the above social security number example, where the '*' is a wildcard match for zero or more characters between "12" and "3". %D^S=(12?3)M1, 3% will result in nothing being reported, where the '?' is a wildcard match for exactly one character between "12" and "3". An example of a fixed length parameter is %D^N=3, M1,3%, which results in "123" being reported from our social security number example, where it is stipulated that the result of range adjustment (M parameter) must be exactly three characters.

1.2 Default Preamble and Postambles.

Default preambles and default postambles are a supplement to the preamble and postamble instructions discussed in the data locator paragraphs above. When the same preamble or postamble is to be conditionally included with the results of all data locators, then a default preamble or postamble can be specified as a separate entity to be applied to all data locators. Note that a default preamble or postamble takes effect on all data locators that occur after it; data locators occurring before are unaffected. Note also that it is possible to specify a default preamble or postamble followed by several data locators to which it will be applied, then specify a new default preamble or postamble followed by several data edit locators to which the newer preamble or postamble will apply. If it is desired to specify a default preamble or postamble, but there are certain data locators to which the default preamble or postamble should not be applied, a preamble or postamble can be specified within that data locator, which will override the default preamble or postamble. An example of a default preamble is %PRA (Default preamble=)%, where "Default preamble=" will be reported before the result of each data locator, including those that fail to report any data. An example of a default postamble is %^PON(NO data found!)%, where "No data found!" will be reported after each data locator that fails to report any data.

1.3 Last Result Reporting.

Last result reporting is used to report the result of the last data locator. The envisioned usage is to use a data locator in a conditional statement, such as a WHILE loop (explained below), and then use last result reporting to actually report the conditional result. For example, your conditional for a WHILE loop may be based on a data locator that searches for the next occurrence of some string between two delineators and if found, last result reporting can be used in the execution section of the WHILE loop to report the result. This feature could also be used to report the same result multiple times. If the last result of a data locator was "123", then %^L% would cause the "123" result to be reported again. A more elaborate example is ^O=1%%$W(%DM'N (23),3%)(%^L %%^O+%)%, where all occurrences of "23" are searched for, starting with the first occurrence, the 3 characters starting at the position where the "23" was found are reported. For "1234567323895", "234238" would be reported.

1.4 Occurrence Number Modifier.

Occurrence number modifiers change the occurrence number used by the search string mechanism. At the start of an edit formatting session, the occurrence number is set to one. A search string operation may use and affect the occurrence number in one of two ways: the search may be to find the nth occurrence of a string, where n is the stored occurrence number OR the search may be to find a specific occurrence of a string (such as the 5th occurrence) as specified within the search string. The argument may be a negative number, indicating that it is desired to find the nth occurrence when starting the search from the end. For more details on occurrence numbers, see the description of the search string in the Syntax section below. The example used in last result reporting above contains an occurrence number modifier designated by the parameter "O" at the start of the edit format.

1.5 IF Conditionals.

IF conditionals cause execution of edit formats, embedded in the IF statement, depending on a true or false condition. The actual conditional part of the IF consists of one or more edit formats separated by AND (&&) or OR (||) operators, all of which is bounded in parentheses to form the conditional. See the Syntax section below for further information on how to construct a conditional. The conditional determines true if any data results from the conditional and false otherwise. An optional edit format, in parentheses, may be included for execution when the conditional result is true. Likewise, an optional edit format, in parentheses, may be included for execution when the conditional result is false. Note that if false section is included, the true must be also, even if it is NULL. For example, %$I((%DM'5 (123),3%)&&(%D^S=(456)M1,3%))(%D%)(String not found!)% causes the entire symbol data string to be reported if there are at least 5 occurrences of the string "123" and the first three characters are "456", else "String not found!" is reported.

1.6 WHILE Conditionals.

WHILE conditionals cause execution of an edit format, embedded in the WHILE statement, so long as the conditional expression causes a true result. For an explanation of the conditional, see the IF conditional above. The executable expression of the while statement, in parentheses, is mandatory. The example used in last result reporting above contains a WHILE conditional in the edit format.

1.7 DO WHILE Conditions.

DO WHILE conditionals function the same as a WHILE conditional, except that the conditional expression is evaluated AFTER the executable expression. Thus, even if the conditional is false on the first try, the executable expression will have been processed once already. For example, %^O=1%%$DW(%DM'N(23),3%)(Data loop executed!%^O+%)%, where we search for all occurrences of "23", starting with the first occurrence, and report "Data loop executed!" each time we run through the loop, would cause "Data loop executed!Data loop executed! " to be reported for input "234238" (we fail on the second when the occurrence number is 3, but we've already executed the loop twice).

1.8 SYNTAX Rules.

Fixed text is included between commands in an edit format. It is included, exactly as it appears, in the output stream of the edit format that it is a part of. There are special characters that require special syntax, as noted below in the Syntax section. For example, the edit string First expression: %DM1,3% Second expression: %DM4,3% would cause "First expression: 123 Second expression: 456"to be reported for input "123456789".

Delay commands are used to pause editing in the midst of an edit format. The intended purpose of this command is to introduce a user definable delay between edited field transmission so that a host system has time to process one field and be ready for the next field. For example, %DM1,3%%^W=20%%DM4,3% will cause the first three symbol characters to be transmitted, wait 200 milliseconds, and transmit the fourth through sixth symbol characters. This command has no effect when it is part of a conditional, a match string parameter, or a search string.

Edit formats may consist of any combination of fixed text (printable or unprintable ASCII) interspersed with instructions as noted above. The edit format may be encapsulated in parentheses, noting that it may be an argument to a search string, match string, or conditional statement. Fixed text is distinguished from instruction parameters in that instruction parameters are surrounded by % symbols. As an edit format of processed fixed text is searched for until we the start of a command is formed, a ")" is found signifying the end of the edit format, there are no more characters in the edit format, or an error occurs. When an instruction is found the previous step of looking for fixed text is reread. If its desired to include a right parenthesis or a percent symbol fixed text; in that case, a backslash (\) may be included before the right parenthesis or percent symbol to signify that it should be reported as literal text, rather than having it treated normally. Two backslashes need to appear contiguously if a backslash is desired in the fixed text. In order to include a left parenthesis in the fixed text, it also must be preceded by a backslash, whether the left parenthesis was meant to be reported as fixed text or was meant to be the start of a nested edit format; if it isn't, an error occurs. For backward compatibility with Imager 8000 firmware revisions 2.x and 3.x, two contiguous percent symbols can be designated to result in a single percent symbol being included in the fixed text, but the backslash method is preferred for future compatibility.

A data locator is used to report an edited version of the symbol data, consisting of at least one D field, an optional justification parameter, optional fill character to be used if a justification parameter is present, an optional range parameter, an optional match string parameter, an optional fixed length parameter, an optional preamble, an optional postamble, an optional missing data error flag parameter, an optional missing data warning flag parameter, an optional terminate flag parameter, and the range boundaries and justification size (if present). The parameters may appear in any order, but the range boundaries and the justification size must always appear at the end with the two range boundaries first, followed by the justification count. Each parameter may also occur multiple times (before the range boundaries and justification size, of course), but only the last occurrence will apply; range boundaries and justification size may occur only once. The order of parameter application is range parameter first (if any), application of fixed length and match string parameters to the range adjusted data, application of the justification parameter, and application of preamble/postamble. The syntax of each parameter is as follows:

1.8.1 D—indicates that this is a data locator. As mentioned above, it must occur at least once.

1.8.2 Preamble—specifies a preamble which will conditionally be included before the edited data resulting from this data locator. The syntax is ^PRx(e), where the 'P' and 'R' characters may be lower case, e is an edit format whose result will be reported as the preamble, and x is the condition for inclusion as follows: If x is an A or a, then the preamble is always reported, even if no edited data resulted from this data locator. If x is an N or n, then the preamble is only reported if no edited data resulted from this data locator. If x is a D or d, then the preamble is only reported if edited data resulted from this data locator.

1.8.3 Postamble—specifies a postamble which will be conditionally included after the edited data resulting from this data locator. The syntax is ^POx(e), where the 'P' and 'O' characters may be lower case, e is an edit format whose result will be reported as the postamble, and x is the condition for inclusion as follows: If x is an A or a, then the postamble is always reported, even if no edited data resulted from this data locator. If x is an N or n, then the postamble is only reported if no edited data resulted from this data locator. If x is a D or d, then the postamble is only reported if edited data resulted from this data locator.

1.8.4 Justification parameter—specifies whether to right justify (R) or left justify (L) the range adjusted data. If an R or L is present, then a positive integer (justification count) must appear at the end of the data locator that specifies the minimum number of characters to report from the range adjusted data. If the range adjusted data contains more characters than the justification count specifies, then the following occurs: 1) if left justification has been specified, then the justification count specifies the number of characters, starting from the beginning of the range adjusted data, to be reported or 2) if right justification has been specified, then the justification count specifies the number of characters, starting from the end of the range adjusted data, to be reported. If the range adjusted data contains less characters than the justification count specifies, then the difference is made up with fill characters, according to the fill character parameter, and justified either left or right.

1.8.5 Fill character—specifies the fill character to use when there is less range adjusted data than a justification parameter requires. The fill character may be any one (and only one) of the following: N if you do not wish to fill at all, Z if you wish to fill with zeroes, and S if you wish to fill with spaces. The default is N.

1.8.6 Range parameter—this optional parameter, M, specifies what subset of the symbol data is to be reported and if it is to be ordered in reverse. If present, then two boundaries must be included at the end of the data locator (but before the justification count) which specify the range of the symbol data to be reported and the direction to report in. Each boundary may either be a number or a search string of the form 'CNS[n](string), according to the following rules: (A) a ' must always be in the first position. (B) between the and ' (characters, a C may be used to specify a case sensitive compare or a c may be used to specify a non-case sensitive compare. (C) between the ' and (characters, an N may be used to specify the next occurrence of a search string or a positive integer (starting at one) may be used to specify the occurrence number of a search string. When starting the edit process for new symbol data, the search occurrence number is automatically set to one (first occurrence). If no N or number is specified, the occurrence number is assumed to be one. If N is specified, then the stored occurrence number is used. If a number is specified, then that number is used in place of the stored occurrence number, but the stored occurrence number is not updated. To add some versatility (and confusion), you may specify a negative occurrence number, which indicates that the search is to start from the end of the symbol data. If you specify the −2nd occurrence of "efgh", the search processor will look for the 2nd occurrence from the end of the string. Note that the number may be terminated with a ",", (D) between the ' and (characters, the letter S may be used to specify the start position in the symbol data to begin the search at. The search for the occurrence number, as described above, will then begin at that search position. The default start position is the beginning of the symbol data. The S may be followed by either of the following: (i) An integer specifying the position in the symbol data. A positive number will index from the start of the symbol data (starting with one). A negative number will index from the end of the symbol data (starting with −1). A zero is illegal. (ii) An L (or l) indicates that the search is to begin at the position in the symbol data where the last search result was found plus any index value (see description of the index below). If no search has yet been accomplished during the editing for a given symbol, then the last position is assumed to be at the beginning of the symbol data. (E) between the ' and (characters, an index may be specified of the form [#]. Without an index, the result of the search is the position where the string was found. With an index, which can be any integer value, the result of the search is the position where the string was found added to the index value. (F) between the ' and (characters, the letter E may be used to specify that if the search is unsuccessful, then the missing data error flag will be raised so that appropriate action may be taken by the application. (G) between the ' and (characters, the letter W may be used to specify that if the search is unsuccessful, then the missing data warning flag will be raised so that appropriate action may be taken by the application. (H) between the ' and (characters, the letter T may be used to specify that if the search is unsuccessful, then the terminate flag will be raised so that appropriate action may be taken by the application. (I) the search string is enclosed between parentheses and is actually an edit format, which may contain commands along with fixed text. The match string may use wildcards '*' and '?'. If the desire is to search for a '*' or a '?' character, then include ^* or ^? respectively. Because the ^ character is used to flag * and ?, the characters ^^ must be used to search for a single ^ character in the symbol data. This is an example of nesting, where an edit format may be used as an argument, in this case as a search string. The application of the first parameter is as follows: (i) If the first parameter is numeric, it specifies the start position of the symbol data to be reported. If the number is positive, then it is the index, starting at one, from the start of the string. If negative, then it is the index, starting at −1, from the end of the string. (ii) If the first parameter is a search string, then the position result of the search string is the start position of the symbol data to be reported. The application of the second parameter is made according to the following rules: (a) If the second parameter is numeric only, it specifies the number of characters of symbol data to be reported, beginning with the character at the start position specified by the first parameter. The polarity of the number determines the direction to move from the start position. If positive, character reporting moves forward from the start position. (b) If negative, character reporting moves backward from the start position. (c) If the second parameter is a 'P' or 'p' followed by a number, it specifies the end position of the symbol data to be reported. If the number is positive, then it is the index, starting at one, from the start of the string. If negative, then it is the index, starting at −1, from the end of the string. If the resulting end position falls after the start position, character reporting moves forward from the start position. If the end position is before the start position, character reporting moves backward from the start position.

If the second parameter is a search string, then the position result of the search string is the end position of the symbol data to be reported. All characters between and including the start and end positions will be reported. If the end position is after the start position, character reporting moves forward from the start position. If the end position is before the start position, character reporting moves backward from the start position.

1.8.7. Match string parameter—The syntax of this parameter is ^S=(string). The second character may be either a capital S, indicating that the string comparison is to be case sensitive, or a lower case s, indicating that the string comparison is to be non-case sensitive. One option is to include the letter E, which specifies that if the match string operation is unsuccessful, then the missing data error flag will be raised so that appropriate action may be taken by the application. Another option is to include the letter W, which specifies that if the search is unsuccessful, then the missing data warning flag will be raised so that appropriate action may be taken by the application. Still another option is to include the letter T, which specifies that if the search is unsuccessful, then the terminate flag will be raised so that appropriate action may be taken by the application. The match string is enclosed between parentheses and is actually an edit format, which may contain commands along with fixed text. The match string may use wildcards '*' and '?'. If the desire is to match against a '*' or a '?' character, then include ^* or ^? respectively. Because the ^ character is used to flag * and ?, ^^ must be used to match against a single ^ character in the symbol data. This is an example of nesting, where an edit format may be used as an argument, in this case as a match string parameter. The ^ and S (or s) characters must be contiguous; there can be no blanks, tabs, or nulls between them. Note that the match string is applied to the range adjusted data (M parameter) and that it only applies to the data locator of which it is a part.

1.8.8. Fixed length parameter—The syntax of this parameter is ^N=#. The second character may be either a capital N or a lower case n. The length (#) is a positive integer. The ^ and N (or n) characters must be contiguous; there can be no blanks, tabs, or nulls between them. Note that the fixed length is applied to the range adjusted data (M parameter) and that it only applies to the data locator of which it is a part. Note also that if the fixed length field appears just before the range parameter boundaries in the data locator, the length number may need a ",", after it if the first range boundary is also numeric. An E may be sandwiched between the N and =, which specifies that if the match string operation is unsuccessful, then the missing data error flag will be raised so that appropriate action may be taken by the application. A W may also be sandwiched between the N and =, which specifies that if the search is unsuccessful, then the missing data warning flag will be raised so that appropriate action may be taken by the application. A T may be sandwiched between the N and =, which specifies that if the search is unsuccessful, then the terminate flag will be raised so that appropriate action may be taken by the application.

1.8.9. Flagged Error parameter—The syntax of this parameter is the single character E. If included, this specifies that if no output results from this data locator, then the missing data error flag will be raised so that appropriate action may be taken by the application.

1.8.10. Flagged Warning parameter—The syntax of this parameter is the single character W. If included, this specifies that if no output results from this data locator, then the missing data warning flag will be raised so that appropriate action may be taken by the application.

1.8.11. Flagged Termination parameter—The syntax of this parameter is the single character T. If included, this specifies that if no output results from this data locator, then the terminate flag will be raised so that appropriate action may be taken by the application.

1.8.12 Other Rules.

Referring to additional features which may be incorporated in an exemplary intermediate assembly code editing instruction programming language default preambles and postambles, as described herein above, have a syntax similar to a data locator preamble or postamble field as described above, but are encapsulated in percent (%) signs as a standalone command.

The syntax for a last result reporting instruction is %^L% or %^l%.

The syntax for these various occurrence count type instructions are as follows: %^O=#% or %^o=#%, where # will be the stored next occurrence number; %^O+% to increment the stored occurrence number; %^O-% to decrement the stored occurrence number.

The syntax for a IF conditional is %$Ictf%, where 'I' may be lower case, c is the required conditional field, t is the optional executable (edit format) performed when the conditional result is true, and f is the optional executable (edit format) performed when the conditional result is false. Note that while the true executable is optional, it must be present if the false executable is present. The format of the conditional field is (e1×e2×e3 . . . ) where the e's are executables and the x's are logical operators (&& and ||); the entire conditional must always be contained within parentheses, consisting of zero or more edit formats separated by OR (||) or AND (&&) operators. Note that if more than one edit format is used, each edit format must be encapsulated in parentheses. The true and false executable fields are of the form (e), where e is an edit format.

The syntax for the WHILE loop is %$Wcs%, where 'W' may be lower case, c is the required conditional field, and s is the required executable part of the loop. For syntax details on the conditional field, see the IF conditional above. The executable part of the loop is of the form (e), where e is an edit format, which will be executed so long as the conditional returns true. If the conditional is false on the first run, the executable part of the loop will never be processed.

The syntax for a delay flag missing type instructions is the DO WHILE loop is %$DWcs%, where 'D' and 'W' may be lower case, c is the required conditional field, and s is the required executable part of the loop. For syntax details on the conditional field, see the IF conditional above. The executable part of the loop is of the form (e), where e is an edit format, which will be executed so long as the conditional returns true. Since the executable part of the loop is run before checking the conditional, if the conditional is false on the first run, the executable part of the loop will still execute once.

The syntax for this command is %^W=d%, where 'W' may be lower or upper case and d is a number specifying the delay in 10 s of milliseconds. The maximum allowable delay is 60 seconds, or a d value of 6000; any attempt to program a longer delay will result in an error. This command has no effect when it is part of a conditional, a match string parameter, or a search string. more examples:

Referring to further possible edit formats, %DM^N=92,-1% will cause an error. If the intent is to report symbol data from the second character through to the end if its' length is 9, then the correct syntax is %DM^N=9,2,-1. Assuming that the second format is used, then for symbol data "1234567890", "234567890" will be reported and for symbol data "12345678901", nothing will be reported.

%DM'c2[5](cOST=),E-1%×.%DM'c[5](COST=),'[-1](\%)% for symbol data "Final Cost=85%; original cost=100.25" will produce "100.25×0.85". If the "c" is either removed or changed to "C" after the first ', then the result will be "×0.85".

%DM'N(123),6%-%DM'N(ABC),6% for symbol data "&123456ABCDEF 123789 ABCGHI" will produce "123456-ABCGHI" rather than "123456-ABCDEF", since the search for "ABC" is for the next (or second) occurrence, not the first (see the description of the search string "N" functionality above).

Assuming a preamble of "$$", AIM identifiers enabled, a postamble of "\013\010" (carriage return/line feed), and an edit format of "(%%%DZL15%a%DSM3,8%)", UPC-A symbol data "123456789012" would produce "$$]E0 (%123456789012000a34567890)" followed by a carriage return and line feed. (End of EXAMPLE I).

As seen with reference to EXAMPLE I, the developed intermediate level assembly code language is useful in implementing advanced data editing instruction, such as conditional type, occurrence count type, string data locating instructions, and in developing intermediate messages which may be acted on by subsequent data editing messages. Nevertheless, a program developer developing program 190 and program 90 may wish to develop an array of high level data editing instructions for use in reconfiguring message data editing program 90. High level data editing instruction simplify the task of a programmer-user developing a set of data editing instructions in that high level instructions can be understood by a minimally experienced programmer with minimal reference to instruction explaining reference materials. High level instructions can be defined using commonly implementing instructional mnemonics, which can be readily understood and utilized by new user-programmers.

Skilled artisans will recognize that a high level programming language can be provided for any given intermediate assembly code language by (1) defining a set of high level instructions corresponding to the intermediate assembly code level instructions with significant format that is readily parsed out for significant actions defined by the previously defined intermediate assembly code instructions; and (2) develop instruction definition and translation programs which allow for (a) parsing significant information from read-in high level instructions defined in step 1 per the rules of the intermediate assembly code language, and (b) to translate of parsed out information into lower level strings (the intermediate assembly code instructions). A program developer developing program builder program 190 can develop the above noted instruction definition programs and translation programs using a commonly available high level programming language (e.g C, C++).

An example illustrating several high level data editing instructions which me be defined and utilized in connection with the invention are described in EXAMPLE II, hereinbelow.

EXAMPLE II

In EXAMPLE II, an array of high level instructions described as part of a high level data editing programming language developed for use with the invention is described. Description of several features of an exemplary high level language developed for defining data editing instructions is as follows:

2.1. Introduction.

Described herein is a high level programming language aimed at enabling users to control data acquisition devices. Programming language capabilities, including variable support, conditional statements, loop statements, and input/output functions, have been incorporated. The programmer will be able to control data acquisition from the scanner and from a keypad (if available), output to the display (if available), output to the host port, perform integer calculations, edit string data, and test device status.

On any given device, a subset of the programming language may be implemented to meet the needs of the device. For example, many units do not have a keypad or a display, so functions that are specific to keypads and displays would not be implemented.

To an experienced programmer, programming in the high level language is similar to programming in C or Basic.

2.2. Some Basic Rules And Programming Example.

When programming a programmer-user will have the opportunity to use certain words, such as OutputString to perform some operation. The programmer-user will also have the opportunity to define and use your own storage variables. Those operational words, called keywords, and your variable names are not case sensitive. In other words, OutputString, outputStRiNg, OUTPUTSTRING, and outputstring all do the same thing, because disregards alphabetic case in keywords and variables.

Here is a simple example program to read data from a keypad, then output the data, with a text description, to both a serial port and a display:

CommentSample Program
stringStringData*32

InputString(StringData)
StringData="Input Data="+StringData
OutputString(StringData)
Send(StringData+" . . . ")

2.3. User Defined Variables.

As illustrated in the example section above, it is possible to define storage variable to which text data may be assigned. There are three types of storage variables: numeric, boolean, and string.

Numeric variables are used to store integer numbers in the range −2147483648 to 2147483647. Here is an example of numeric variables and the operations that can be performed on them:

Int N1, N2, N3
Int N4
String S1*32

N1=3*5
N2=8
N3=N1/N2
N4=N3−N2
N1=N1+InputString (S1)

In this sample, four numeric variables (N1, N2, N3, and N4) are declared. We also declared a string S1 to be used in the InputString function. Line 4 leaves N1 with the value 15, line 5 leaves N2 with the value 8, line 6 leaves N3 with the value 1, line 7 leaves N4 with the value −7, and line 8 will get scan or keypad input, store it to S1 (which we're not using, but is a required parameter to InputString), and return the number of characters read, which is added to N1, with the result being stored back to N1.

Boolean variables have a value of either true or false, and are used to indicate whether or not a condition was met. We'll look at an example of Boolean variables and the operations that can be performed on them:

Int N1,N2
Boolean B1,B2
N1=3
N2=4
B1=(N2>N1)
B2=B1 AND (N2<>N1)

```
If (B2)
{
Send("N2 is greater than N1, N2 is not equal to N1")
}
else
{
Send("Either N2 is no greater than N1, or N2 is equal to N1")
}
```

In this example, we declare two Boolean variables: B1 and B2. We also declared N1 and N2 as numbers with values 3 and 4 respectively. In the B1 assignment statement, we perform a logical operation to see if N2 is greater than N1; B1 will be set to true if it this is the case and FALSE otherwise. In the B2 assignment statement, B2 will be set to true if both B1 is true and N2 is not equal to N1. See Logical Expressions section for more details. Finally we test if B2 is true via the If statement, executing the first send statement if it is and the second if B2 is false. See the If Statement section below for more details.

String variables are used to store text. The declaration is similar to that of numbers and booleans, but the maximum number of characters must also be specified. The form of the declaration is to.used the keyword String followed by variables, separated by commas. Each variable name in the declaration must be immediately followed by an asterisk and a numeric constant that specifies its' maximum size. We'll look at an example of string variables and the operations that can be performed on them:

String S1*48,S2*64

S1="1234567890abcdefghijklmnopqrstuvwxyz"
S2=S1
S2=S2+S1

In this example, we declare two string variables: S1 and S2. S1 is assigned some text and then S1 is copied to S2. Line 5 will not work, because concatenating S1, which is 36 characters in length, to S2, which is also 32 characters in length, will exceed the maximum of 64 characters allowed in S2.

Here are some general guidelines when choosing variable names:

The variable name must consist of a minimum of 1 and a maximum of 255 characters.

The variable name must start with an alphabetic character. Each remaining character must be either alphanumeric or an underscore.

Variable names must not conflict with either an keyword or a previously declared name or label.

2.4. Pre-Defined Variables.

There are several keywords in that behave as variables.

LastDecodedMessage is a pre-defined string that will contain the last data read by scanning a symbol. It may be used in the same manner as a string variable. If you assign a string value to it, you will overwrite the symbol information that was stored in it.

Cursor is a keyword used by data formatting functions described in the Data Formatting Functions below. It is used to mark a position in LastDecodedMessage. It may be used in the same manner as a numeric variable.

Host is a keyword that may be used in the same manner as a string variable. If you assign a string to it, the string will be written out the host port of the reader. If you assign Host to a string, any data waiting to be read in the host port buffer will be written to the assignment string.

2.5. Comments.

As we saw in the example section above, there are times when we want to intermingle documentation of the operations we're performing in an program, and we don't want them to be interpreted as an action to be taken by. To achieve this, we use either the keyword Comment or the Basic language keyword REM to denote that all text on the same line after the keyword is to be ignored by , because it is there for documentation purposes only.

2.6. Numeric Expressions.

Numeric expressions, which may be assigned to numeric variables or used as arguments to functions that expect a number, may consist of any combination of numeric constants, numeric variables, and functions that return a numeric value, separated by numeric operators. The numeric operators are '+' for adding, '−' for subtracting, '*' for multiplying, '/' for dividing, '&' for bitwise AND, '|' for bitwise OR, and '^' for bitwise XOR. In addition, a unary '~' before a numeric expression will cause the expression to be ONEs complemented. Note that when evaluating numeric expressions, precedence is right to left. For example, 3*4+5 evaluates to 27 rather than 17, whereas (3*4)+5 will evaluate to 17, using parenthesis to indicate that the multiplication operation is to be performed first.

2.7. Boolean Expressions.

Boolean expressions, which may be assigned to Boolean variables, used as arguments to functions that expect a Boolean value, or used in conditional statements (see If, While, and Do While Statement sections below) may consist of any combination of Boolean constants (keywords TRUE or FALSE), Boolean variables, and functions that return a Boolean value, separated by Boolean operators. The Boolean operators are 'AND' for logically ANDing two operands and 'OR' for logically ORing two operands.

2.8. String Expressions.

String expressions, which may be assigned to string variables or used as arguments to functions that expect a string, may consist of any combination of string constants enclosed between single or double quotes, string variables, and functions that return a string value, separated by string operators. The only string operator available is '+' for concatenating two strings values together. The reason that string constants may be enclosed between either single or double quotes is that it may be desirable to actually use a single or double quote in a constant. If you wish to create the text string "Doesn't this work?", you could use the following string expression: "'Doesn'+""+'t this work?'".

2.9. Logical Expressions.

Logical expressions, which may be used to test a number against a number or a string against a string, return a Boolean value based on the outcome of the test. The syntax is (V1 operator V2), where the left and right parenthesis are required, V1 and V2 are either numeric or string variables, and the operator may be "<", ">", "<=", ">=", "=", and "<>" (not equal). For numbers, these comparison operators are straightforward. For string expressions, the "=" (equal) and "<>" (not equal) operators are straightforward. The less than and greater than operations evaluate in the following manner: one string is considered less than a second string if the first non-equal character is less than the corresponding character in the second string or if the strings are equal up to the end of the first string, but the second string is longer than the first string.

2.10. String Range Specifier.

It is possible to select a range of characters within a string and use it as part of a string expression. The range is specified after the string variable with parenthesis surrounding two numeric expression, separated by commas. The first numeric expression specifies the start character and the second expression specifies the end character. Both numeric expressions must evaluate to a number that is greater than or equal to zero (the first position in the string) and is less than the number of characters in the string. If the first numeric expression is greater than the second numeric expression, then the range of characters is reversed. The following sample illustrates usage of the range specifier. The first OutputString statement will output "cd" and the second will output "fedcba".

String S1*32

S1="abcdefg"
OutputString(S1(2,3))
OutputString(S1(5,0))

It is also possible to assign a value to a range of character positions in a string variable by using a range expression, as defined above, on the string variable that is to be written to. This capability allows individual characters to be altered in a string variable without having to rewrite the entire contents of the variable. For example, you might wish to examine every character of the string for the letter k, and change it to the letter j. There are several aspects of the way this works that are not obvious:

- The numeric expressions for the beginning and end of the range to be written must be less than the maximum declared length of the string variable.
- The string length is set automatically during a normal assignment. For example, S1="abcde" sets the value of string variable S1 to "abcde" with a length of 5 characters. If you then do S1(6,7)="gh" to assign character 'g' to the 7$^{th}$ position and 'h' to the 8$^{th}$ position, the length will be reset to 8 and the 6$^{th}$ position will contain an undetermined value. If you wish to set the length to a fixed value, see the SetLength function in section 7 of this document.
- If the character range in a string variable is too small for the number of characters in the string expression being assigned to it, characters will be truncated from the right of the string expression in order to fit within the range. If, for example, you do the assignment S1(4,6)= "qrstuv", character 'q' will be written to the 5$^{th}$ position, 'r' to the 6$^{th}$ position, 's' to the 7$^{th}$ position, and characters 't', 'u', and 'v', will be lost.
- If there are not enough characters in the string expression to fill the character range in a string variable, then the characters that are available will be written starting at the beginning of the specified range until there are no more characters to write. If, for example, you do the assignment S1 (4,7)="jk", 'j' will be written to the 5$^{th}$ position, 'k' will be written to the 6$^{th}$ position, and the 7$^{th}$ and 8$^{th}$ positions will remain unchanged.

2.11. Array Variables.

Previously, we discussed string, integer, and boolean variable declarations and their usage in string, integer, and boolean expressions respectively. Although we didn't discuss it previously, it is possibly for a single variable to consist of many data elements by making it multi-dimensional. A variable that is declared to be multi-dimensional is called an array variable. Array variables may consist of up to five dimensions. When an array variable is declared, the maximum size of each dimension is enclosed in square brackets following the name of the variable being declared. In the case of a string declaration, the bracketed dimensional information comes after the maximum size of each string element. When an array variable element is referenced, the variable name is followed by a square bracketed numeric expression for each dimensional element declared for that variable. The numeric expressions are used to pinpoint the exact data element to be referenced. The following is an example of an integer array variable implementation, where we read some numbers and then try to find the first occurrence of the number 10:

```
IntI1 [5] [6]
Int      Row, Column
Row=0
While(Row < 5)
{
Column = 0
While(Column < 6)
    {
         InputNumber(I1 [Row] [Column])
         Column = Column + 1
    }
Row=Row+1
}
Row=0
Column = 0
While((Row < 5) AND (I1 [Row] [Column] <> 10))
{
Column = Column + 1
If(Column >= 6)
{
  Column = 0
  Row = Row + 1
}
}
if(Row < 5)
{
OutputString("10 found at "+string(Row) +", " +string(Column))
}
else
{
OutputString("No 10 found!")
}
```

This example first declares an integer array I1 to contain 5 rows and 6 columns of data for a total of 30 data elements. The user must then input 30 numbers, each of which is then put into a unique element of the array. We then search for the first occurrence of the number 10. If we found it, we'll display the row and column where it was found. Here is an example using a string array:

StringS1*40[6]
IntI1

S1[0]="Joe"
S1[1]="Kathy"
S1[2]="Karen"
S1[3]="Dave"
S1[4]="Mike"
S1[5]="Rob"

```
S1 [5] = "Rob"
If (InputNumber (I1, Minimum=0, Maximum=5))
{
OutputString("Hi "+S1 [I1])
}
```

In this example, we declare a one dimensional string array S1 consisting of 6 elements, which we load with names. We ask the user for a number in the range 0 to 5 and if we get it, we print a greeting using the input number as an index into our name table.

2.12 If Statement.

The If statement is used to conditionally perform operations depending upon whether or not a boolean expression evaluates to true or false. The syntax is of the following form:

IF(boolean expression) [THEN] (statements) [[ELSE] (statements)]

The boolean expression must always be enclosed in parentheses. The first set of program statements, which may be enclosed in either parentheses or curly brackets, must always be present and may optionally be preceded by the word THEN. These statements will be executed if the boolean expression evaluates to true. The second set of program statements are optional and may be enclosed in either parentheses or curly brackets and may optionally be preceded by the word ELSE. These statements will be executed if the boolean expression evaluates to false. The following sample program will cause the text "J is greater than or equal to K" and "B1 is true" to be sent to the display:

```
Boolean    B1,B2
Int    j,k
B1=true
B2=(j<k)
J=123
K=24
If(B2)
{
outputstring("J is less than K")
}
else
{
outputstring("J is greater than or equal to K")
}
If(B1)
{
outputstring("B1 is true")
}
else
{
outputstring("B1 is false")
}
```

2.13. While Statement.

The While statement is used to repeatedly perform a set of operations so long as a boolean expression evaluates to true. The syntax is of the following form:

WHILE(boolean expression) [DO] (statements)

The boolean expression must always be enclosed in parentheses. The set of program statements, which may be enclosed in either parentheses or curly brackets, must always be present and may optionally be preceded by the word DO. The boolean expression will be evaluated and the statements will be executed repeatedly so long as the boolean expression evaluates to true. Note that if the boolean expression evaluates to false on the first iteration, the statements will never be executed. In the following sample program, the statements in the first While will not be executed, since the boolean expression evaluates to false immediately. The statements in the second While will be executed 99 times (until k is incremented to 123), and the value of k will be output at each iteration.

```
Int    j,k
J=123
K=24
While (j<k)
{
outputstring("J = "+string(j))
j = j + 1.
}
While (k<j)
{
outputstring("K = "+string(k))
k = k + 1
}
```

2.14. Do While Statement

The Do While statement is used to repeatedly perform a set of operations so long as a boolean expression evaluates to true. The syntax is of the following form:

DO (statements) WHILE(boolean expression)

The boolean expression must always be enclosed in parentheses. The set of program statements, which may be enclosed in either parentheses or curly brackets, must always be present and may optionally be preceded by the word DO. The boolean expression will be evaluated and the statements will be executed repeatedly so long as the boolean expression evaluates to true. Note that if the boolean expression evaluates to false on the first iteration, the statements will already have been executed one. Unlike the While statement, the Do While executes the statements first and then evaluates the boolean expression. In the following sample program, the statements in the first Do While will be executed once, causing the string "J=123" to be sent to the display and J to be incremented to 124. The second Do While will be executed 100 times (until k is incremented to 124), and the value of k will be output at each iteration.

```
Int    j,k
J=123
K=24
do
{
outputstring("J = "+string(j))
j = j + 1
}
While (j<k)
do
{
outputstring("K = "+string(k))
k = k + 1
While(k<j)
```

While(k<j)

2.15. CaseInsensitiveCompare 2.15.1 Syntax:

CaseInsensitiveCompare(string expression 1 operator string expression 2); 2.15.2. Description: Compare string expression 1 to string expression 2 in a case insensitive manner using an operator defined in the logical expressions section; 2.15.3. Return Value: Boolean true if the strings compare according to the operator, false otherwise; 2.15.4. Example:

```
String S1*32
S1="AbCdEfG"
If (CaseInsensitiveCompare (S1 < "abcdefgh"))
{
OutputString("S1 less than abcdefgh")
}
else
{
OutputString("S1 greater than or equal to abcdefgh")
}
```

In this example, the first OutputString call will be made.

2.15.5 Run-Time Command Compatibility:

Not compatible.

2.16. CaseInsensitiveWildcardCompare 2.15.1 Syntax CaseInsensitiveWildcardCompare(string expression 1, string expression 2)

2.16.2. Description

Compare string expression 1 to string expression 2 using wildcard characters '*' and '?' in string expression 1. A '?' in the search string indicates that the next character in the string being searched (or compared) can be any character. A '*' in the search string indicates that zero or more characters in the string being searched can be ignored. Using "abcdefg" as string expression 2, the following examples will produce the accompanying results: a string expression 1 value of "a*ef*" will produce a match; a string expression 1 value of "a?bcdef?" will produce a match; a string expression 1 value of "a?bcdefg?" will not produce a match (there must be exactly one character corresponding to the '?'). The string expressions will be compared in a case insensitive manner.

2.16.3. Return Value

Boolean true if the strings compare, false otherwise.

2.16.4. Example

```
String S1*32
S1="AbCdEfG"
If (CaseInsensitiveWildcardCompare (S1, "a*ef*"))
{
OutputString("S1 equals a*ef*")
}
else
{
OutputString("S1 doesn't equal a*ef*")
}
If(CaseInsensitiveWildcardCompare (S1, "a*ef??"))
{
OutputString("S1 equals a*ef??")
}
else
{
OutputString("S1 doesn't equal a*ef??")
}
```

In this example, the first and fourth OutputString calls will be made.

2.16.5. Run-Time Command Compatibility

Not compatible.

2.17. CaseSensitiveCompare 2.17.1.Syntax

CaseSensitiveCompare (string expression 1 operator string expression 2)

2.17.2. Description

Compare string expression 1 to string expression 2 in a case sensitive manner using an operator defined in the logical expressions section.

2.17.3. Return Value

Boolean true if the strings compare according to the operator, false otherwise.

2.17.4. Example

String S1*32

```
S1="AbCdEfG"
If (CaseSensitiveCompare (S1 < "ABCDEFGH"))
{
OutputString("S1 less than ABCDEFGH")
}
```

```
else
OutputString("S1 greater than or equal to ABCDEFGH")
}
```

In this example, the second OutputString call will be made.

2.17.5 Run-Time Command Compatibility

Not compatible.

2.18. CaseSensitiveWildcardCompare 2.18.1. Syntax

CaseSensitiveWildcardCompare (string expression 1, string expression 2)

2.18.2 Description

Compare string expression 1 to string expression 2 using wildcard characters '*' and '?' in string expression 1. A '?' in the search string indicates that the next character in the string being searched (or compared) can be any character. A '%' in the search string indicates that zero or more characters in the string being searched can be ignored. Using "abcdefg" as string expression 2, the following examples will produce the accompanying results: a string expression 1 value of "a*ef*" will produce a match; a string expression 1 value of "a?bcdef?" will produce a match; a string expression 1 value of "a?bcdefg?" will not produce a match (there must be exactly one character corresponding to the '?'). The string expressions will be compared in a case sensitive manner.

2.18.3. Return Value

Boolean true if the strings compare, false otherwise.

2.18.4. Example

String S1*32

```
S1="AbCdEfG"
If(CaseSensitiveWildcardCompare (S1, "a*ef*"))
{
OutputString("S1 equals a*ef*")
}
else
{
OutputString("S1 doesn't equal a*ef*")
}
If (CaseSensitiveWildcardCompare (S1, "a*ef??"))
{
OutputString("S1 equals a*ef??")
}
else
{
OutputString("S1 doesn't equal a*ef??")
}
```

In this example, the second and fourth OutputString calls will be made.

2.18.5. Run-Time Command Compatibility

Not compatible.

2.19.CharacterHeight 2.19.1.Syntax

CharacterHeight 2.19.2. Description

Get the height of characters in pixels. This number will change depending upon the selected font.

2.19.3. Return Value

Return the integer height of a character in pixels.

2.19.4. Example

OutputString("Character height="+string (CharacterHeight))

In this example, the character height will be written to the display.

2.19.5. Run-Time Command Compatibility
Syntax: CharacterHeight. Returns the character height.

2.20. CharacterWidth

2.20.1. Syntax
CharacterWidth(string expression)

2.20.2. Description
Get the width in pixels of the character in the string expression. Note that the string expression must be exactly one character.

2.20.3. Return Value
Return the integer width in pixels of the character in the string expression.

2.20.4. Example
OutputString("Character width of 'a'="+string (CharacterWidth("a")))

In this example, the character width of the letter 'a' will be written to the display.

2.20.5. Run-Time Command Compatibility
Syntax: Characterwidth(character), where the character is enclosed in single quotes. Returns the character width.

2.21. DefaultPrefix

2.21.1. Syntax
DefaultPrefix (string expression, [Always|IfData|IfNoData])

2.21.2. Description
Sets a default prefix that can be used by the Send function depending on whether or not the string in the Send statement is empty (no data). Note that if Always, IfData, or IfNoData is not specified, the default is Always. This statement is not used as a prefix command within the Send statement, but defines the default prefix which can be used by the Send statement.

2.21.3. Return Value
None.

2.21.4. Example
DefaultPrefix("Prefix", IfNoData)
Send("", DefaultPrefix)

This code will define a default prefix, whose value is "Prefix", that should be applied when there is no data in the Send statement string expression. Since the Send statement is trying to write null data to the host, the default prefix will be applied.

2.21.5. Run-Time Command Compatibility
Not compatible.

2.22. DefaultSuffix

22.2.1. Syntax
DefaultSuffix (string expression, [Always|IfData|IfNoData])

2.22.2. Description
Sets a default suffix that can be used by the Send function depending on whether or not the string in the Send statement is empty (no data). Note that if Always, IfData, or IfNoData is not specified, the default is Always. This statement is not used as a suffix command within the Send statement, but defines the default suffix which can be used by the Send statement.

2.22.3. Return Value
None.

2.22.4. Example
DefaultSuffix("Suffix", IfNoData) Send("", , DefaultSuffix)

This code will define a default suffix, whose value is "Suffix", that should be applied when there is no data in the Send statement string expression. Since the Send statement is trying to write null data to the host, the default suffix will be applied.

2.23.5. Run-Time Command Compatibility
Not compatible.

8.9. DefaultPrefix

8.9.1. Syntax
DefaultPrefix (string expression, [Always|IfData|IfNoData])

8.9.2. Description
Sets a default prefix that can be used by the Send function depending on whether or not the string in the Send statement is empty (no data). Note that if Always, IfData, or IfNoData is not specified, the default is Always. This statement is not used as a prefix command within the Send statement, but defines the default prefix which can be used by the Send statement.

8.9.3. Return Value
None.

8.9.4. Example
DefaultPrefix("Prefix", IfNoData)
Send("", DefaultPrefix)

This code will define a default prefix, whose value is "Prefix", that should be applied when there is no data in the Send statement string expression. Since the Send statement is trying to write null data to the host, the default prefix will be applied.

8.9.5. Run-Time Command Compatibility
Not compatible.

8.10. DefaultSuffix

8.10.1. Syntax
DefaultSuffix (string expression, [Always|IfData|IfNoData])

8.10.2. Description
Sets a default suffix that can be used by the Send function depending on whether or not the string in the Send statement is empty (no data). Note that if Always, IfData, or IfNoData is not specified, the default is Always. This statement is not used as a suffix command within the Send statement, but defines the default suffix which can be used by the Send statement.

8.10.3. Return Value
None.

8.10.4. Example
DefaultSuffix("Suffix", IfNoData)
Send("", ,DefaultSuffix)

This code will define a default suffix, whose value is "Suffix", that should be applied when there is no data in the Send statement string expression. Since the Send statement is trying to write null data to the host, the default suffix will be applied.

8.10.5. Run-Time Command Compatibility
Not compatible.

8.20. Error

8.20.1. Syntax
Error

8.20.2. Description
The reader will issue an error beep sequence and terminate the script. This is intended for situations where a catastrophic error has occurred.

8.20.3. Return Value
None.

8.20.4. Example
String S1*32

---

InputString (S1)
If(S1 = " ")

-continued

```
{
  Error
}
```

In this example, if the user didn't input any data, then the error is issued.

8.20.5.Run-Time Command Compatibility
Not compatible.
8.21.Find
8.21.1.Syntax
[Wildcard]Find([SearchString=]string expression 1,
[StringToSearch=]string expression 2,
[[SearchStartPosition=]numeric expression 1],
[CaseSensitive|CaseInsensitive], [Forward|Backward],
[[StringPosition=]numeric variable])
8.21.2.Description
Find string 1 in string 2.
8.21.3 Return Value
Return the integer position where string 1 was found in string 2; a −1 will be returned if the string is not found.
8.21.4 Example String S1*32
Int I1

S1="AbCdEfG"
I1=Find("cde",S1,CaseInsensitive)
OutputString("Find position is "+string(I1))

In this example, the "Find position is 2" will be written to the display.
8.21.5 Run-Time Command Compatibility
Not Compatible.
The search will proceed forward by default, unless otherwise specified.
The default starting point of the search is at the beginning or end, depending on whether the search is forward or backward, but the starting point may be set by the optional numeric expression.
Alphabetic character comparisons will be according to the default case sensitivity unless otherwise explicitly specified.
An optional integer variable may be loaded with the position where the string was actually found (String Position).
If the keyword Wildcard appears at the front of the word Find, then wildcard search characters are used in string1 to search for an occurrence of string 1 in string 2. A '?' in the search string indicates that the next character in the string being searched (or compared) can be any character. A '*' in the search string indicates that zero or more characters in the string being searched can be ignored. using "abcdefg" as the string to be compared, the following examples will produce the accompanying results: a search string of "a*ef*" will produce a match; a search of "a?bcdef?" will produce a match; a search string of "a?bcdefg?" will not produce a match (there must be exactly one character corresponding to the '?').
Labeling of arguments is optional (the labels are enclosed in [ ]); they are used merely for readability.
8.21.3.Return Value
Return the integer position where string 1 was found in string 2; a −1 will be returned if the string is not found.
8.27.LeftJustify
8.27.1.Syntax
LeftJustify([String=]string, [Total=] n, [Fill=]'x')

8.27.2.Description
Return a string that has been left justified or truncated according to n. The integer constant n must be in the range of 1 to 32000 and specifies the total number of characters in the output; if n is greater than the size of string, then it is padded with the optional fill character or with nulls and if less than the size of string, the string is truncated from the right. Labeling of arguments is optional (the labels are enclosed in [ ]); they are used merely for readability.
8.27.3. Return Value
Returns the left justified or truncated string.
8.27.4.Example String S1*32

S1="abcdefg"
OutputString(LeftJustify(S1, 8, '0'))
OutputString(LeftJustify(S1, 5, ' '))

In this example, the first OutputString will add a zero fill character to the end of "abcdefg". In the second OutputString, "abcdefg" will be truncated to "abcde".
8.27.5.Run-Time Command Compatibility
Not compatible.
8.28.Length
8.28.1.Syntax
Length(string expression)
8.28.2.Description
Get the number of characters in the string expression.
8.28.3.Return Value
Integer number of characters in the string expression.
8.28.4.Example String S1*32

S1="AbCdEfG"
outputString("Size of S1="+string(length(S1)))

In this example, the "Size of S1=8" will be written to the display.
8.28.5.Run-Time Command Compatibility
Not compatible.
8.37.RightJustify
8.37.1.Syntax
RightJustify([String=]string, [Total=]n, [Fill=]'x')
8.37.2.Description
Return a string that has been right justified or truncated according to n. The integer constant n must be in the range of 1 to 32000 and specifies the total number of characters in the output; if n is greater than the size of string, then it is padded with the optional fill character or with nulls and if less than the size of string, the string is truncated from the left. Labeling of arguments is optional (the labels are enclosed in [ ]); they are used merely for readability.
8.37.3.Return Value
Returns the right justified or truncated string.
8.37.4.Example String S1*32

S1="abcdefg"
OutputString(RightJustify(S1, 8, '0'))

OutputString(RightJustify(S1, 5, ' '))

In this example, the first OutputString will add a zero fill character to the beginning of "abcdefg". In the second OutputString, "abcdefg" will be truncated to "cdefg".

8.37.5.Run-Time Command Compatibility
Not compatible.
8.39.Send
8.39.1.Syntax
Send ([String=]string expression 1, [[Prefix=]prefix], [[Suffix=]suffix], [[DataSource=]string expression 2])
8.39.2.Description
Send the string expression 1 to the host communication port. The string expression 1 may be optionally preceded by the text "String=". One of the uses of Send is to report barcode data, which sometimes needs to be wrapped with prefix text and suffix text. As part of the Send statement, a prefix and suffix may optionally be applied. The prefix may take on one of the following values:

Using the word DefaultPrefix to specify a prefix will cause a globally defined prefix (see the DefaultPrefix function below) to be applied.

Using the expression ImmediatePrefixAlways(string expression) will cause the string expression to be written as a prefix under all conditions.

Using the expression ImmediatePrefixWhenDataFound (string expression) will cause the string expression to be written as a prefix when the Send string expression is non-null.

Using the expression ImmediatePrefixWhenDataNotFound (string expression) will cause the string expression to be written as a prefix when the Send string expression is null.

Similarly, the suffix may take on one of the following values: Using the word DefaultSuffix to specify a suffix will cause a globally defined suffix (see the DefaultSuffix function below) to be applied.

Using the expression ImmediateSuffixAlways(string expression) will cause the string expression to be written as a suffix under all conditions.

Using the expression ImmediateSuffixWhenDataFound (string expression) will cause the string expression to be written as a suffix when the Send string expression is non-null.

Using the expression ImmediateSuffixWhenDataNotFound (string expression) will cause the string expression to be written as a suffix when the Send string expression is null.

The optional string expression 2 is used to specify the source of the data, where the first character is an HHP source identifier and the next 3 characters are an AIM identifier.

Labeling of arguments is optional (the labels are enclosed in [ ]); they are used merely for readability. Arguments must appear in the order indicated above.

8.39.3.Return Value
None.
8.39.4.Example
Send("abcd") causes the string "abcd" to be sent to the host. Send(string="abcd", ImmediatePrefixwhenDataNotFound("Prefix"), ImmediateSuffixWhenDataFound("Suffix"), "k]C0") will cause the string "abcdSuffix" to be sent to the host.
8.39.5.Run-Time Command Compatibility
Not compatible.
8.42.StringComparisonsAreCaseInsensitiveByDefault
8.42.1.Syntax
StringComparisonsAreCaseInsensitiveByDefault
8.42.2.Description
For string comparisons, the default is that they will be case insensitive.

8.42.3.Return Value
None.
8.42.4.Example

String S1*32

```
S1="abcd"
StringComparisonsAreCaseInsensitiveByDefault
If(S1 = "ABCD")
{
    OutputString ("Strings compare")
}
else
{
    OutputString("Strings don't compare")
}
```

In this example, "Strings compare" is written to the display.
8.42.5.Run-Time Command Compatibility
Not compatible.
8.46. Terminate
8.46.1.Syntax
Terminate
8.46.2.Description
The script will terminate immediately.
8.46.3. Return Value
None.
8.46.4.Example String S1*32

```
InputString (S1)
If(S1 = " ")
{
    Terminate
}
```

In this example, if the user didn't input any data, then the terminate is issued.
8.46.5.Run-Time Command Compatibility
Not compatible.
8.52.Warning
8.52.1.Syntax
Warning
8.52.2.Description
The reader will issue a warning beep sequence. This function is implementation dependent and may not be available on all readers.
8.52.3.Return Value
None.
8.52.4.Example StringS1*32

```
InputString (S1)
If(S1 = " ")
{
    Warning
}
```

In this example, if the user didn't input any data, then the warning is issued.
8.52.5.Run-Time Command Compatibility
Not compatible.

8.53. WildcardCompare 8.53.1. Syntax

WildcardCompare(string expression 1, string expression 2)

8.53.2. Description

Compare string expression 1 to string expression 2 using wildcard characters '*' and '?' in string expression 1. A '?' in the search string indicates that the next character in the string being searched (or compared) can be any character. A '*' in the search string indicates that zero or more characters in the string being searched can be ignored. Using "abcdefg" as string expression 2, the following examples will produce the accompanying results: a string expression 1 value of "a*ef*" will produce a match; a string expression 1 value of "a?bcdef?" will produce a match; a string expression 1 value of "a?bcdefg?" will not produce a match (there must be exactly one character corresponding to the '?'). The default setting for case sensitivity is used in this comparison.

8.53.3. Return Value

Boolean true if the strings compare, false otherwise.

8.53.4. Example

String S1*32

```
S1="abcdefg"
If(WildcardCompare(S1, "a*ef*"))
{
OutputString("S1 equals a*ef*")
}
else
{
OutputString("S1 doesn't equal a*ef*")
}
If(WildcardCompare (S1, "a*ef??"))
{
OutputString("S1 equals a*ef??")
}
else
{
OutputString("S1 doesn't equal a*ef??")
}
```

In this example, the first and fourth OutputString calls will be made.

8.53.5. Run-Time Command Compatibility

Not compatible.

2.35 Beep 2.35.1 Syntax

Beep ([Frequency=numeric expression 1], [Duration=numeric 2], Volume=numeric expression 3])

2.35.2 Description

Sound the beeper for the optional specified duration in milliseconds at the optionally specified frequency and at the optionally specified volume. Labeling of arguments is optional (the labels are enclosed in [ ]; they are used merely for readability. Valid volume values are 0 for off, 1 for low, 2 for medium, and 3 for high.

2.35.3 Return Value

None.

2.35.4 Example

Beep (800, 100, 3)

In the example above, the beeper will sound for 100 milliseconds at 800 Hz. high volume.

2.35.5 Run-=Time Command Compatibility

Syntax: Beep(frequency, duration, volume), where frequency, duration, and volume are numeric constants. Returns 1 for true if the command was correct and an error code otherwise.

2.36 DisplayBacklightOn 2.36.1 Description

Turns on the backlight for the display.

2.36.3 Return Value 2.36.4 Example

OutputString("Backlight is off")

DisplayBacklightOn

OutputString("Backlight is on")

In the example above, the display backlight is turned on between the first and second OutputString.

2.36.5 Run-Time Command Compatibility

Syntax: DisplayBacklighton. Returns 1 for true if the command was correct and error code otherwise.

2.37 TemporarilyEnableDisplay 2.37.1 Syntax

TemporarilyEnableDisplay ([Time-}numeric expression)

2.37.2 Description

Temporarily enable the display for the number of milliseconds specified by the numeric expression. When the time has expired, the display will be turned off, even if had previously been on. Labeling of the argument is optional (the label is enclosed in [ ]); it is used merely for readability. Control retu 4 rns immediate to the program after turning on the display; t he display will be turned off automatically in the background.

2.37.3 Return Value

None.

2.37.4 Example

TemporarilyEnableDisplay (50)

In the example above, the display will be turned on for 50 milliseconds.

2.37.5 Run-Time Command Compatibility

Not compatible.

2.38 Wait 2.38.1 Syntax

Wait(numeric expression)

2.38.2 Description

Sit idle for the number of milliseconds specified in the numeric expression. The accuracy of the timing is implementation dependent.

2.38.3 Return Value

None.

2.38.4 Example

OutputString("Before Wait")

Wait(575)

OutputString("After Wait")

In this example, the string "Before Wait" is written to the display, then 575 milliseconds later the string "AfterWait" is written to the display.

2.38.5 Run-Time Command Compatibility

Not compatible.

2.39 Warning 2.39.1 Syntax

Warning 2.39.2 Description

The reader will issue a warning bee3p sequence. This function is implementation dependent and may not be available on all readers.

2.39.3 Return Value

None.

2.39.4 Example

String s1*32

```
InputString (S1)
If (S1=" ")
```

```
{
    Warning
}
```

In this example, if the user didn't input any data, then the warning is issued.

2.39.5 Run-Time Command Compatibility
Not compatible.
End of EXAMPLE II.

Figure 2C:
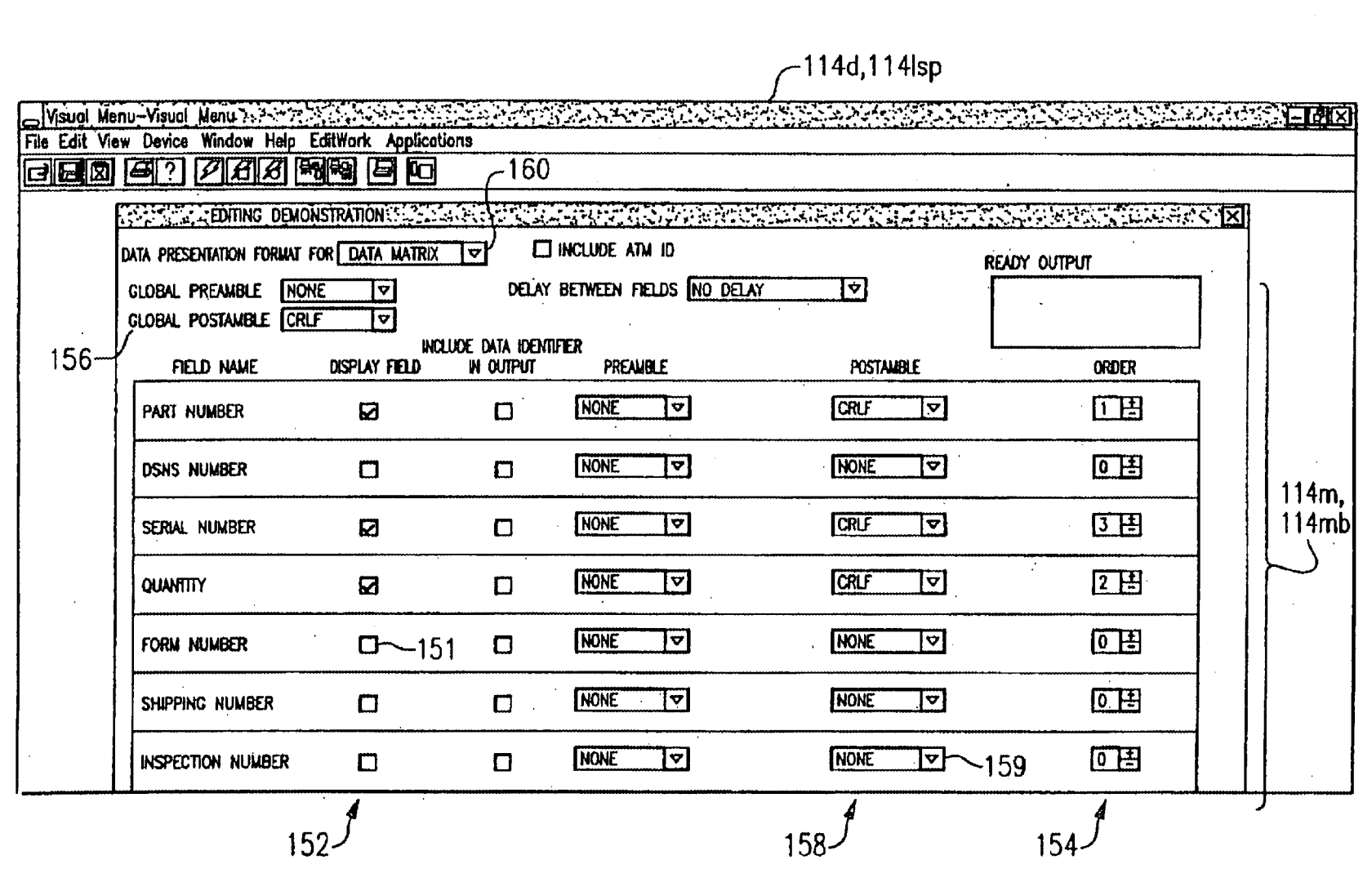
Figure 2J:
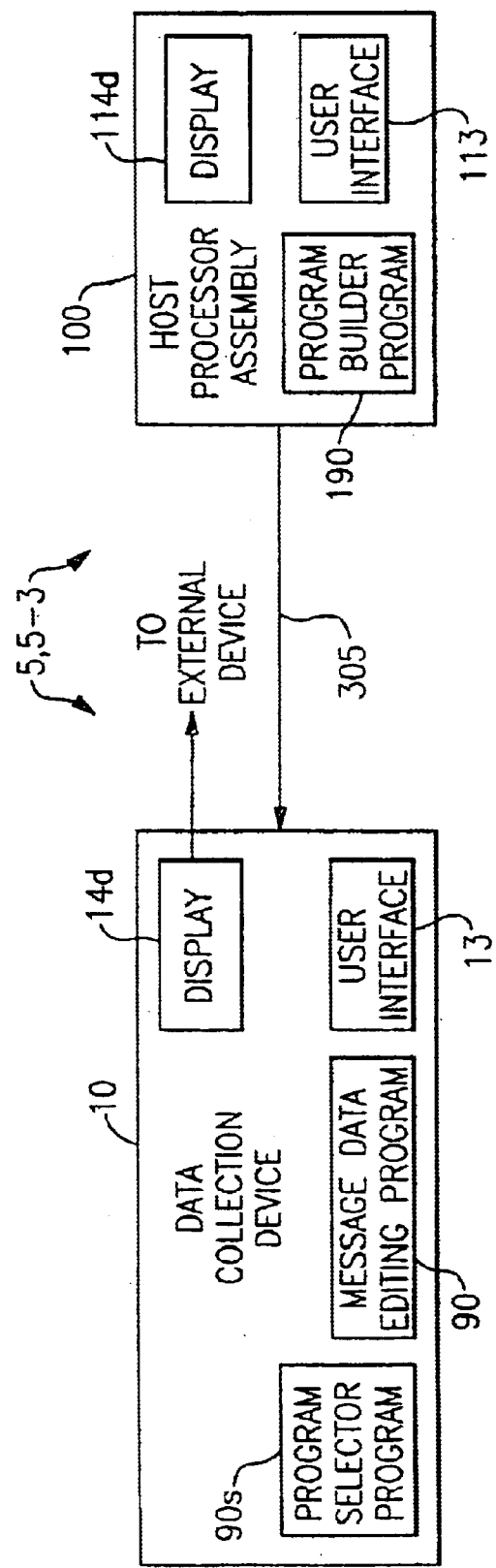
FIG. 2j illustrates a block diagram of an alternate data editing system of the invention.

An example of an embodiment of the invention wherein program builder program 190 operates to actuate a program write mode of operation for host assembly 100 is described with reference to FIG. 2b. In the program write mode of operation, host processor assembly 100 operating in accordance with program builder program 190 operates to display programming language instructions 114MA on display 114d to aid a user in building a set of data editing instructions. With reference to the specific example of FIG. 2b, several control buttons 191, 192, 193, 194 and 195 may be displayed in display 14d in a program write mode. Control button 191 in the example of FIG. 2b in a "SAVE TO DEVICE" control button. Button 191 may be depressed if a programmer user wishes to transmit the set of instructions currently being authored to device 10. A programmer-user may actuate "SAVE TO FILE" control button 192 if he wishes to save the rest of data editing instructions currently being authorized to a memory location of host assembly memory 140. A programmer-user may activate "LOAD FROM FILE" button 193 if he wishes to cause a set of instructions previously stored in host memory 140 to appear on display 114d for further development or revision. A programmer-user may also select "UPDATE MENU DRIVER" control button 194. Selection of the "UPDATE MENU DRIVER" control button 194, allows a programmer to update a device-driver (or host driver) menu driver such as menu driver 14md described with reference to FIG. 1c. Selection of "MENU DRIVER" button 194 may cause the set of instructions currently being authored to be included as one of the selectable data-editing options selectable via menu driver 14md. Selection of "MENU DRIVER" button 194 may cause an additional prompt screen or screens to appear on display 114d which allow a programmer-user to define the specific menu driver which is to be updated and/or which allows the user-programmer to define the indicia 14ix identifying the new or replacement menu driver selectable data editing option. The editing system 5, 5-3 constituted by use of a host incorporated program builder program 190 for use in updating or otherwise reconfiguring a device incorporated program selector program 90s is illustrated in FIG. 2j. Referring to further control buttons, selection of "BUILD INSTRUCTION DATAFORM" 195 may cause control circuit 140 to actuate encoder 115 to build an instructional dataform, e.g. dataform 310, 312 as is explained with reference to FIGS. 3f, 3i and 3j. Selection of control button 196 allows a programmer-user to end the program-write mode of operation. Control buttons 191, 192, 193, 194, 195 and 196 can be made selectable with a point-and-click device such as mouse 113 m provided host 100 is equipped with a GUI.

In an alternative embodiment of the invention described with reference to FIG. 2c, program builder program 190 of host assembly 100 operates to display prompt messages 114mb on display 114d which prompt a user of host assembly 114d to input information relative to the desired output data format of device 10. This information may be information respecting the output data format required by the legacy data receive software incorporated in the host assembly (which may be host 100) to which edited output message data is being output. Based on the inputted informational data respecting the legacy data receive software, program builder program 190 builds a set of instructions which edit decoded-out message data into a format that is receivable by the designated host output assembly operating in accordance with a legacy data receive software package. In the example of FIG. 2c, program builder program 190 operates to display on display 14d legacy software information prompting messages 114MB. Legacy software information prompting messages 114MB prompt a programmer-user of host 100 to enter data respecting the data receipt requirements of a legacy, or existing data receive software package, even though the user intends to use in connection with the software package a dataform type or types not traditionally used with that legacy data receive software package. Legacy software information prompting message 114mb of the type shown in FIG. 2c useful, for example, in the case a manager of a bar code indexed product tracking system wishes to upgrade a set of packaging labels from a multiple 1D symbol label, as indicated in FIG. 2d to a single 2D label symbol as indicated in FIG. 2f, but in the interest of saving significant costs, wishes to maintain the existing, or "legacy" software incorporated in a designated data receive host (which may or may not be the program builder host 100).

The utility of a legacy software information prompt screen 114lps is understood further with reference to a specific case scenario illustrating a case situation involving application of features of the invention. In the specific example provided the invention is used to reconfigure device 10 so that decoded-out message data appears in a form recognized as a series of specific types of 1D symbol data instead of as a specific type of 2D symbol. However, it is understood that the invention is useful for configuring a data collection device to carry out virtually any desired data editing routine. Using the invention, device 10 can be configured, for example, so that decoded-out data is output in a 2D data format instead of in a 1D data format, in an RF ID format instead of in an 1D format, in a 2D format instead of in a smart card format, in a mag strip decoded-out data format instead of in a smart card format, and so on.

FIG. 2d shows a 1D bar code shipping label 230 having first second and third 1D bar code labels 234, 236, and 238. A legacy software data receive software package for configuring a host assembly e.g. host 100 to receive data corresponding to symbols 234, 236, and 238 may drive a data receipt display screen 232 as shown in FIG. 2e. Data receipt display screen 232 prompts a person using a reader e.g. device 10b to read bar codes according to a certain protocol. In the specific example shown in FIG. 2e data receipt display screen 232 prompts a person using a reader e.g. reader 10b to read the symbols on label 230 to read part number encoding symbol 234 first, quantity encoding symbol 236 second, and serial number encoding symbol 238 third. A reader-user entering data with use of display screen 232 can overwrite scanned data with keyboard entered data. A reader user can move from first field 241 to second field 242 to third field 243 by entering a carriage return (CRLF) after entering a string of characters. Accordingly, the POSTAMBLE "CRLF" is attached to the data message generated from symbols 234, 236, and 238 typically in a keyboard wedge (not shown) attached to the host assembly receiving the data.

Referring again to the legacy software information prompting screen 114lsp shown in FIG. 2c, the manner in which legacy software information prompt screen 114lsp can be utilized so that compatibility is achieved between modern 2D shipping label 245 and the data receipt software package driving 1D data receipt screen 232 will be described. Legacy software information prompt screen 114*lsp* shown in FIG. 2*c* prompts a user to enter information respecting (1) the types of data messages (Serial no., Part no., and Quantity) received and (2) the ordering in which those data messages are received. Legacy software information prompting screen 114*lsp* also prompts a programmer-user to enter information regarding whether a PREAMBLE or POSTAMBLE must be attached to the message data output by device 10. In the specific example provided in which a programmer-user wishes to edit data generated by decoding 2d symbol into a form in which it can be received by host operating under the control of the legacy software package driving screen 232 a programmer-user checks appropriate part number, serial no., and quantity boxes of the fields of column 152 to designate the data types being received, and then enters appropriate information in the fields of receive ordering column 154 to designate the ordering in which that data is to be received. A user-programmer also enters the appropriate carriage return entry "CRLF" in the appropriate fields of the POSTAMBLE column 158 of screen 1141 sp and into GLOBAL POSTAMBLE input Field 156 to entering information respecting legacy software package, a programmer-user may utilize screen 114*lsp* to enter the data format type of the dataform replacing the dataforms of the shipping label to be replaced. In the example provided, a user-programmer enters the DATAMATRIX menu choice in field 160 to indicate that the message data being acted upon by the set of data editing instructions being built is DATAMATRIX message data. Referring to additional features of prompt screen 114*lsp*, prompt screen 114*lsp* can include any of control buttons 191, 192, 193, 194, 195, and 196 as explained with reference to FIG. 2*b*.

Provided that program builder program 190 of host 100 is programmed with certain minimal information regarding the message formats of the generated message generated by decoding of new label symbol 247 and old label symbols 234, 236, and 238, program builder program 190 readily builds a set of data editing instructions for editing of message data based on the input data input using screen 114*lsp* and the previously programmed information regarding the formats of unedited data messages corresponding to symbol 247 and symbols 232, 234, and 236.

Unedited data messages corresponding to symbol 234, symbol 236 and symbol 238 of label 231, may have the form:

Part No. Symbol: P12U34

Quantity Symbol: Q0010

Serial No. Symbol: S0056980 wherein the "part number" associated with label 231 is encoded in the 4 characters succeeding the P character, the "quantity" value associated with the label 231 is encoded in the 5 characters succeeding the "Q" characters, and the serial number associated with label 231 is encoded in the 7 characters succeeding the "S" character of the serial number decoded data message.

The DATAMATRIX symbol 247 employed to replace the series of 1D symbols 234, 236 and 238 may have an unedited data message format as:

DATAMATRIX Symbol:

000S0056980000000000P12U340000000Q001000000 0000

It can be seen that host processor assembly 100 operating in accordance with program builder program 190, if provided with minimal information regarding the format of unedited data messages of symbols 234, 236 and 238 and symbol 247 (e.g such information as the fact that serial no. Data is designated by the header "s", quantity information by the character "q" and part number information by the character "P") can readily be configured to utilize the information entered into legacy software information prompt screen 114*lsp* to build a set of data editing instructions which operate to edit message data into a form receivable by the legacy data receive software which commonly but not necessarily incorporated in host 100.

An example of an architecture of a data editing set of instructions which may be built with use of program builder program 190 by way of inputting data respecting a desired output format using prompt screen 114*lsp* is shown in FIG. 2*i*. Program builder program 190 may have established at least one predetermined set of program instructions, e.g instructions 170, for a given prompt screen, e.g. screen 114*lsp* shown in FIG. 2*c*. Predetermined set of program instructions 170 includes program blocks 172 corresponding to each of several data entry fields of prompt screen. It is seen in the example provided that block 172*x* corresponds to field 256 of screen, that block 172*p* corresponds to field 151, that block 172*w* corresponds to input field 159 and so on. The set of predetermined instructions 170 further includes a control block 174. Control block 174 is configured in accordance with the inputs input into screen 114*lps* in order to establish which of the predetermined set of program blocks 172 is to be enabled, and in which order they are to be executed. In the specific example provided, the ordering of execution of blocks 172 is determined by the data entry inputs into "ORDER" column 154. The enabling or disabling of blocks 172 is determined by the inputs into the remaining input fields of screen 114*lsp*. Blocks of code that are disabled by the specific inputs into screen 114*lps* of FIG. 2*c* are designated by x's in the example of FIG. 2*i*. Typically a different set of predetermined program blocks similar to block set 170 may be established for each dataform selectable as an option in field 260. That is, if AZTEC is an option selectable in field 260, program builder program 190 may configure another predetermined set of blocks similar to block set 170, which are useful in converting AZTEC code messages into a form that may be specified using screen 114*lsp*. If a specified RF ID code is an option selectable in field 260, program builder program 190 may configure yet another predetermined set of blocks similar to block set 170, which are useful in converting the specified RF CODE messages into a form that may be specified using screen 114*lsp*. Of course, making available different sets of predetermined program instructions 170 is unnecessary in the case that options selectable in field 260 have identical pre-editing data formats.

Preferably, legacy software information prompting screen 114*lsp* is designed so that it can be utilized repeatedly to develop more than one set of data editing instructions, each new set of instructions for use in forging compliance between a nonconforming data output format with more than one legacy data receive software package. Typically, a large entity that utilizes decodable dataforms for multiple applications controls and utilizes a plurality of data receive software packages, each one having features slightly different from the other legacy data receive software package managed by the entity.

FIG. 2*g* shows another shipping label 260 that is provided by the fictional large entity providing label 231, and FIG. 2*h* shows a data receipt prompts screen 265 of a legacy data receipt program associated with label 260. It is seen that legacy receipt program prompt screen 265 prompts a bar code reader user to enter different message data according to a protocol different than prompt screen 232. However, it is also seen that legacy data receipt software information prompt screen 114*lsp* utilized in the development of the set of data editing instructions for complying a new shipping label 245 with the legacy receipt program associated with prompt screen 232 is configured with sufficient input prompts so that it also can be used in the development of a set of data editing instructions for complying another new shipping label 260 to the message receive requirements of the legacy receipt program associated with prompt screen 265.

In another important aspect of the invention, legacy software prompt screen 1141 sp preferable comprises a graphical user interface (GUI), as is indicated in the embodiment of FIG. 2*c* which typically includes such features as drop down menus and control buttons, e.g. 195 which are operable with use of a point-and-click device such as a mouse 113*m*. Configuring program 190 so that prompt screen 114*lsp* comprises a GUI allows a complete set of instructions for editing message data to be built without typing mnemonics or other words using a keyboard 113*k*.

When a set of data editing instructions is built using high level program instructions a host assembly 100, operating in accordance with the program builder program 190 may binarize or compile the set of instructions into a form executable by circuit 40 or into a form which may be interpreted by a control program associated with control circuit 40. Further, if the set of instructions are authored in an assembly code or interpreted assembly code, compiling of the instructions may not be necessary. If device 10 comprises an operating system, compiling of the set of instructions could also be carried out in device 10. However, a division of labor between device 10 and host 100 in which a set of instructions is compiled by device 10 would not provide the advantage of the editing system being universally applicable to an array of data collection devices wherein some of the devices include an operating system and some do not. By appropriate control either of device 10 or host 100, the set of data editing instructions is transmitted to device 10.

When transmitted to device 10, the set of data editing instructions developed in host 100, can be interpreted and executed in the manner of the data editing instructions described in connection with the flow diagram of FIG. 2*a*. That is, in the main operating loop of device 10, a data editing program 90 is called at block 220 subsequent to the generation of decoded-out data and prior the output of the decoded-out data to an external device. When the program is called (block 220) the instructions of the set of instructions developed in host assembly 100 are interpreted and executed by program 90 in accordance with the information input into host assembly 100 by a user-programmer.

In an alternative embodiment, data editing instructions developed in host assembly 100 could be compiled together in host assembly 100 with main loop operating instructions such as instructions corresponding to blocks 202, 204, 205, 208, 210, 212, 214, 216, 218, and 222 of the flow diagram of FIG. 2*a* in the development of a compiled main operating program specific to the data editing routine defined by the recent user inputs input into host assembly 100 by a programmer-user. The compiled main operating program can then be transmitted to device 10 from host 100 for replacing the existing main operating program of device 10. This method would require that programers of device 10 have access to development tool software associated with device 10, and have knowledge of the software architecture and/or operating systems relating to device 10. Nevertheless, in that data collection devices 10 are expected to increasingly incorporate commercially available operating system the above alternative configuration method is expected to be come more viable.

In another embodiment of the invention, host processor assembly 100 may display to a user-programmer on host display screen 114*d* a menu driver screen 14*md* presenting a user with a limited number of predetermined data editing options as explained previously in connection with FIG. 1*c*. In the case that host assembly 100 displays menu driver 14*md*, presenting a limited number of predetermined data editing options, host assembly 100 can be considered to comprises a program selector program 90*s*. In that case processor assembly 100 or device 10 allows a programmer-user to specify any further details of data editing routine (such as the characters of a POSTAMBLE or PREAMBLE), and does not merely allow selection of one of a predetermined data editing routine, host assembly 100 or device 10 can be considered to include program builder program 190 as described in detail in connection with FIG. 1*b*. It will be understood that device 10 and/or assembly 100 can have both of a program selector program 90*s* and a program building program 190. Program builder programmer 190 can be executed to generate a new menu driver option or to reconfigure an existing option, and then, at a later time, program selector program 90*s* can be enabled to make available the reconfigured menu driver to a user-programmer. A device 10 or assembly 100 configured to display a menu driver e.g. 14MD, where selection of one of the option results in program 90 being configured in accordance with a predetermined data editing routine, and selection of another one of the options results program-aiding messages being displayed can also be considered to comprise both program selector program 90*s* and a program builder program 190.

Referring now to the block diagrams of FIGS. 3*a*–3*h* possible hardware features which may be incorporated in accordance with the invention are described.

FIG. 3*a* is a system block diagram of a preferred embodiment of a data collection device 10 and a data reading host processor system 200 of the present invention. Host processor system 200 may be but is not necessarily the same host that incorporates a program builder program 190 as explained in connection with FIG. 1*b*. Host processor system 200 may be the type that is designed to only accept data from a one-dimensional bar code. The data collection device 10 shown in FIG. 3*a* includes a two-dimensional indicia reading front end 22 for reading 2D symbols and OCR characters, a radio frequency reading front end 23, and a one-dimensional bar code data reading front end 24 for reading one-dimensional bar codes. The two-dimensional indicia reading front end 22, the radio frequency reading front end 23, and the data reading front end 24 are each connected to a control circuit 40.

Data collection device 10 may comprise other data reading front ends such as a mag stripe reading front end or a smart card reading front end. Further, data collection device 10 may comprise only one of the data reading front ends described, e.g. front end 22 only or front end 23 only. Further it is common to combine the functionality of front end 22 and front end 24, into a single front end. While separate front ends can be employed to read both 1D and 2D symbols, a 2D front end e.g. front end 22 can be employed to read both 1D and 2D indicia.

Control circuit 40 is preferably connected to the data specific host computer 200 over an interface, such as a universal serial bus interface (USB) 306, which comprises a serial communication signal line and a set of power signal lines. The USB 306 supplies power from the host computer 200, and establishes a two-way communication link between the data reader 10 and the host computer 200. As an alternative to the host computer 200 supplying power via the USB 206, or in addition thereto, an independent power source (not shown) may be included within the data reader 10, either in the FIG. 3a embodiment or the other embodiments described herein. Communication link 306 can be replaced with another type of communication line, such as RS-232 link, an RF link, an IR link, or a network link such as an internet or intranet network link.

Control circuit 40 preferably comprises a microprocessor or microcontroller (uP/uC) 40p, sufficient amount of memory 40m to store the necessary program (such as a program 90 for editing and formatting data, described later herein) and data, and appropriate glue logic. Alternatively, control circuits based on, for example, microprogrammed bit-slice hardware, digital signal processors, or hard-wired control logic may be used instead of a uP/uC-based controller 40p. Such alternative control circuits may also replace the uP/uC control circuits 140, 240 described herein.

In operation, control circuit 40 receives data signals from the two-dimensional indicia reading front end 22, the radio frequency reading front end 23, and the 10 data reading front end 24. The control circuit then decodes, formats, and edits the received data signals and passes the processed data to the host computer 200 over the USB 306. The control circuit 40 may also be used to activate the two-dimensional indicia reading front end 22, the reading front end 23, and the data reading front end 24.

Figure 3B:
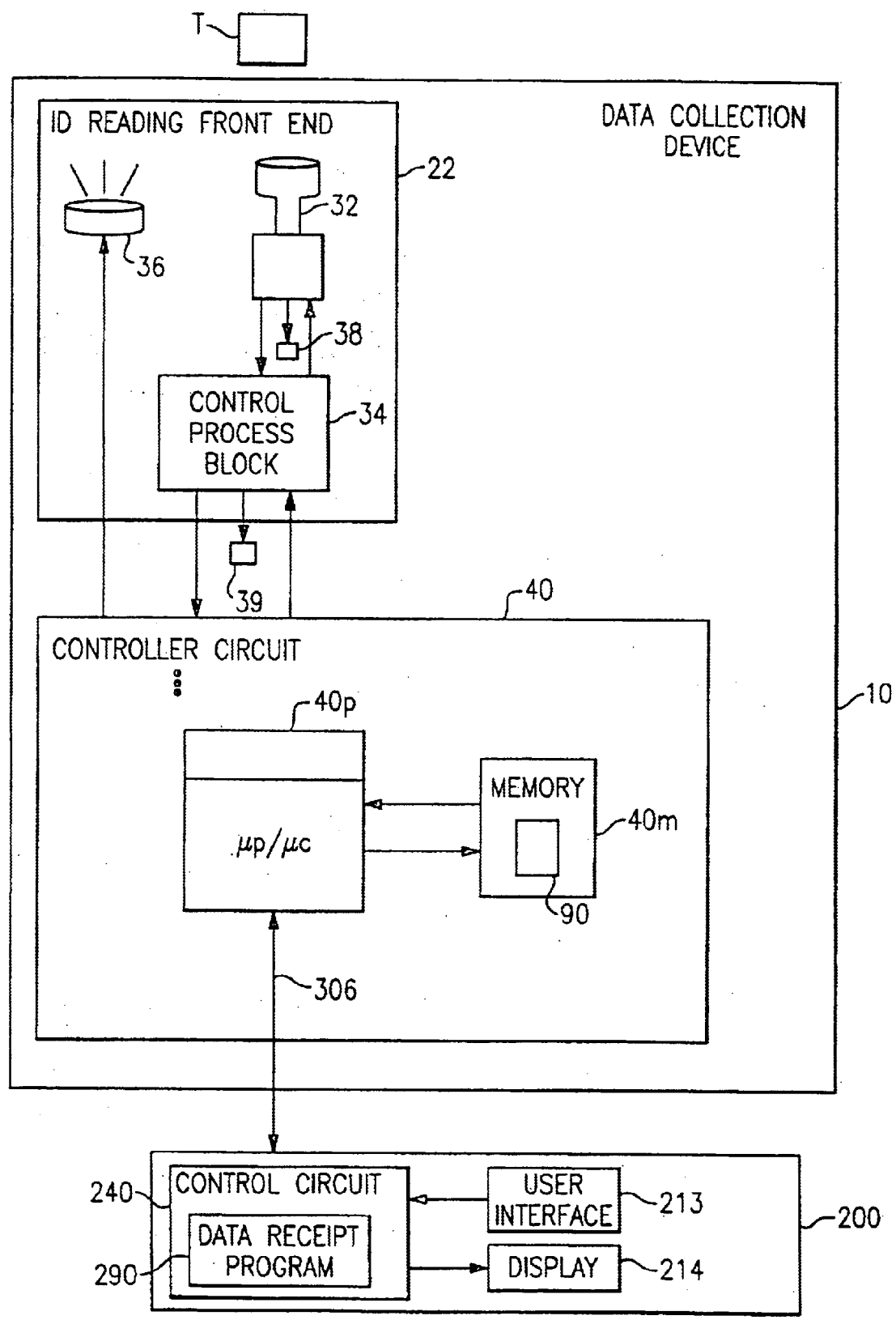

FIG. 3b is a functional block diagram of a data collection device 10 for detecting two-dimensional indicia such as a two-dimensional bar code data in accordance with certain aspects of a preferred embodiment of the present invention. In the preferred embodiment shown in FIG. 3b, the two-dimensional indicia reading front end 22 includes a photo-sensor 32, a control process block 34, and an illumination source 36.

Data collection device 10 includes within its system the two-dimensional indicia reading front end 22 described above, a control circuit 40, and an input/output (I/O) interface 306. Device 10 can be configured with other optical data reading front ends so as to read and recognize information in more than one optical data format, according to techniques described in U.S. patent application Ser. No. 09/118,228, hereby incorporated by reference as is fully set forth herein. Optionally, data collection device 10 can also be configured to include one or more radio frequency reading front ends to detect both optical data as well as radio frequency data a described in U.S. patent application Ser. No. 09/304,228 and U.S. Pat. No. 5,382,784 which have been previously incorporated by reference as is fully set forth herein.

Control circuit 40 preferably comprises a microprocessor LS microcontroller (uP/uC) 40p, a sufficient amount of memory 40m to store the necessary program (such as the program 90 for editing and formatting data, described herein) and data, and appropriate glue logic. Alternatively, control circuits based on, for example, microprogrammed hardware, digital signal processors, or hard-wired control logic may be used instead of a uP/uC-based controller 40p.

In operation, the artificial illumination source 36 is activated so as to illuminate a target T to be read. The artificial illumination source 36 may comprise, for example, an array of light-emitting diodes (LEDs), an incandescent light or any other suitable light source. As another possible alternative, the illumination source may be omitted altogether, and the two-dimensional bar code reading front-end 22 can rely on ambient light to illuminate the target barcodes or OCR decodable characters. Various types of ambient light imaging systems are described, for example, in U.S. Pat. Nos. 5,770,847 and 5,814,803, both of which are incorporated by reference as is set forth fully herein.

Light reflected from the target T is detected by the photo-sensor 32, which outputs a data signal 310 indicative of lighter and darker portions of the target. In a preferred embodiment, the photo-sensor 32 comprises, for example, a CCD linear sensor, but it may also be embodied as a two-dimensional CCD array, a linear or multi-dimensional CMOS array (such as described in U.S. patent application Ser. No. 08/697,408 filed Aug. 23, 1996, hereby incorporated by reference as is set forth fully herein), or a photo-diode. The photo-sensor output data signal 38 is fed to the signal control process block 34, which conditions the photo-sensor output signal 38 and generates an output signal 39 that generally identifies which regions of the image correspond to light areas, and which correspond to dark areas. Either analog or digital signal processing (which may include, for example, amplification and/or filtering) may be utilized in the control process block 34. Preferably, the control process block 34 sets the exposure time and thresholding so that the bars or relatively darker regions of the barcode or other target are reported as being dark, and the spaces or relatively lighter regions between the bars or darker regions are reported as being light, according to any number of techniques well known in the art. Exposure control techniques are described, for example, in U.S. patent application Ser. No. 08/697,408, previously incorporated herein by reference. The control process block 34 outputs data 39 indicative of the relative light and dark portions of the target T, and this data 39 is reported to control circuit 40 for further processing.

In the preferred uP/uC-based embodiment, the control circuit 40 includes message data editing program 90 run by the uP/uC 40p. Control circuit 40 may also control, among other things, the illumination source 36 and the control process block 34. Preferably, program 90 is stored in non-volatile section of 40m memory within control circuit 40.

After receiving the data from control process block 32, the control circuit 40 decodes the data 312 to determine the information represented by the target barcode, symbol, or other indicia contained within the captured image. Preferably, the decoding is accomplished by identifying which areas of the image contain barcodes or symbols or recognizable portions thereof, and then determining the information represented by those barcodes based on the patterns of light and dark pixels within the identified areas. Design and implementation for decoding the captured image data is considered well within the purview of those skilled in the art. After formatting and editing the data, the data is then outputted across the I/O interface 306 to host processor system 200 which utilizes the information. Host processor system 200 which may include such elements as control circuit 240, user interface 213, and display 214d, may include a message data receive program 290 programming circuit 240 to drive data receipt screen 232, 265 as described in connection with FIGS. 2e and 2h herein.

Figure 3C:
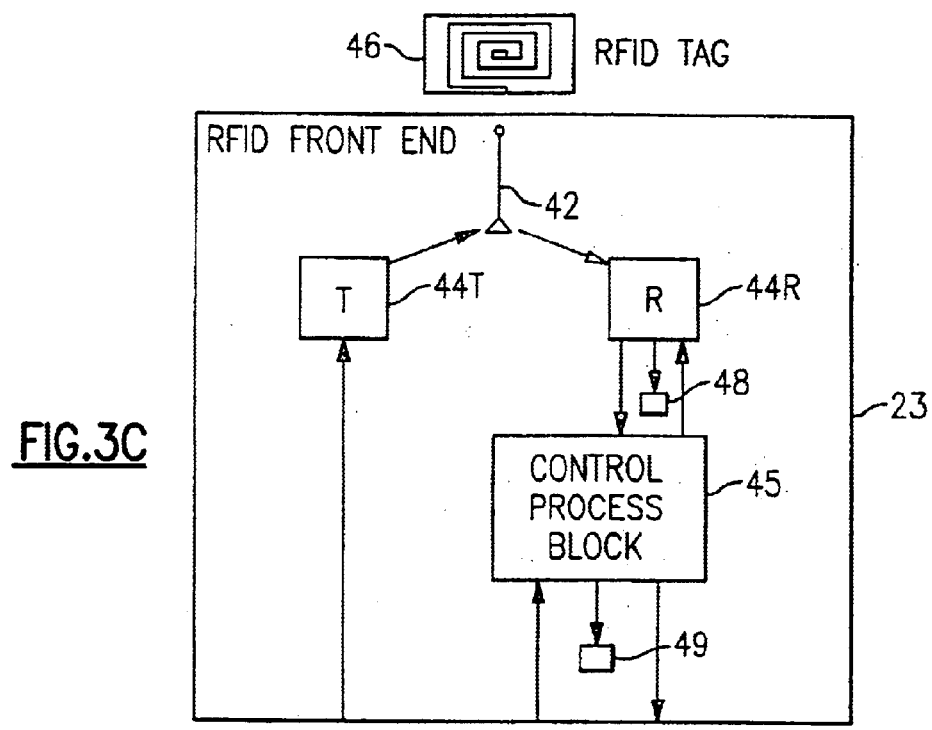

FIG. 3c is a functional block diagram of a radio frequency reading front end 23 in accordance with certain aspects of a preferred embodiment of the present invention. The radio frequency receiver 44R, a control process block 45.

In operation, the radio frequency transmitter 44T transmits over the antenna 42 an electromagnetic signal to a transponder 46 to be read. In response to the signal from the transmitter 44T, the transponder 46 sends out a modulated radio frequency data signal which is detected by the receiver 44R over the antenna 42. The transmitter 44T and the receiver 44R can be configured in a manner described in U.S. patent application Ser. No. 09/304,228 or U.S. Pat. No. 5,382,784, which are incorporated by reference as if set forth fully herein or be configured in a manner described in U.S. Pat. No. 4,990,756 or U.S. Pat. No. 6,150,948 hereby incorporated by reference as is set forth fully herein. Preferably, the impedance of the antenna 42 is matched with the impedance of the receiver 44R. The receiver 44R then outputs the data signal 48 to the control process block 45, which conditions the receiver output data signal 48 and generates an output data 49. Either analog or digital signal processing (which may include, for example, amplification and/or filtering) may be utilized in the signal control process block 45. The control process block 45 then outputs the data 47 to the control circuit 40 described, respectively, for further processing. Optionally, the data 48 from the receiver 44 R may be pre-processed within the control process block 45 or the control circuit 40 so that it will have the same format as the data generated by the two-dimensional indicia reading front end 22. When such pre-processing is implemented, a pre-processing program may be used within the control process block 45 or the control circuit for processing the data 48 from the receiver 44R. Optionally, whenever configurations (user-specified or automatic) are made within program 90, these configurations apply equally and automatically to the pre-processing program. The design and implementation in the control circuit 40 of program 90 for editing and formatting data 49 is described in further detail herein. After formatting and editing the data 49, this formatted and edited data is outputted to a data receiving host processor system 200 as described in FIGS. 3a and 3b or output to integrated display 14d of device 10.

Figure 3D:
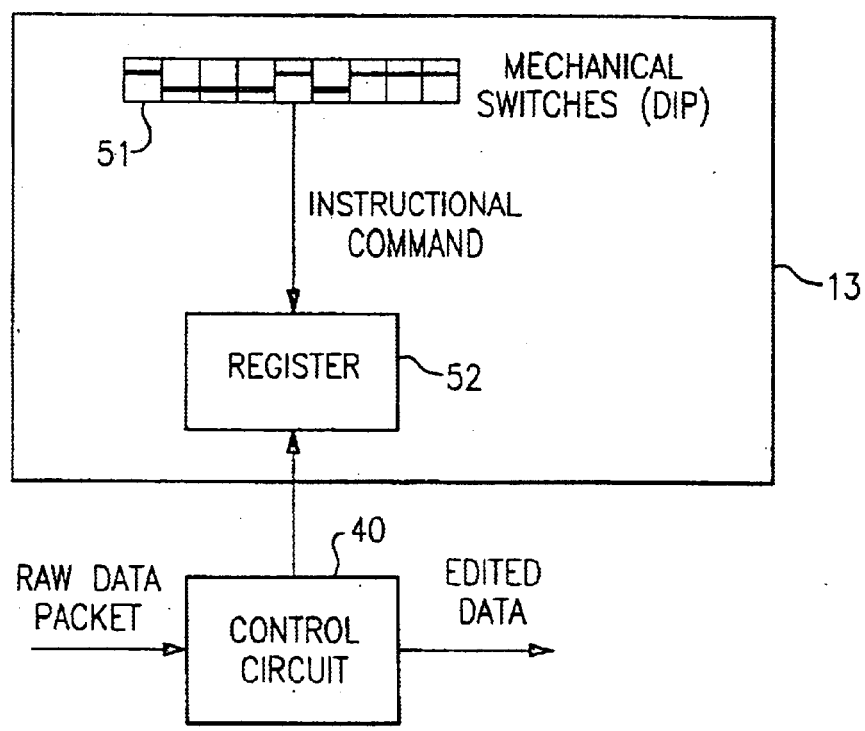

FIG. 3d is a block diagram illustrating an embodiment in the present invention of a user interface 13 for the configuration of program 90 using mechanical switches 51 of the type which may be incorporated in an integrated keyboard 13k of device 10. The user interface 13 includes a plurality of mechanical switches 51 and a register 52. In the embodiment, a device operator flips one or more of the mechanical switches 51 located on the outer body of a device in order to send a set of instructional commands to the register 52. The control circuit 40 then retrieves from the register 52 the set of instructional commands, which configures program 90 data from the data reading front end or ends. In a manner that depends on which of switches 51 or the ordering in which switches 51 are depressed.

Figure 3E:
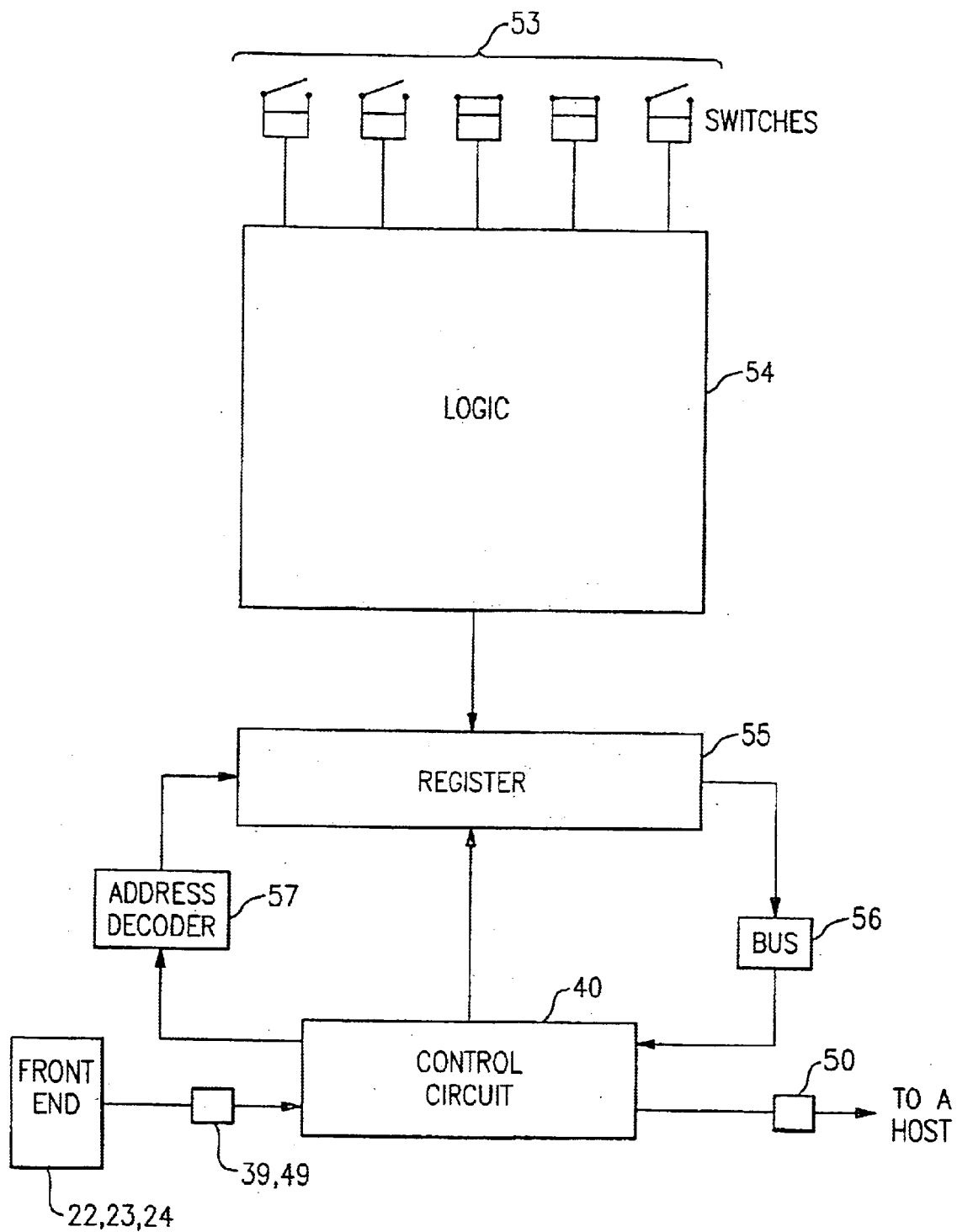

Alternatively, as shown in FIG. 3e, the user interface 13 may include a plurality of switches 53, which may be incorporated as part of keyboard 13k, a logic block 54, a register 55, a bus block 56, and an address bock 57. In this embodiment, a user flips one or more of the switches 53 which triggers the logic block 54 to send a set of instructional commands to the register 55. The register 55 communicates this set of instructional commands to the control circuit 40 through the bus block 56 and the address decoder block 57. The control circuit 40 then uses this set of instructional commands to configure program 90 to initiate the editing and formatting of data e.g. data 39 and 49 from the data reading from end, e.g. 22 and 23. After editing and formatting the data e.g. data 39 from the data reading front end e.g. 22 or the edited and formatted data 50 is transmitted to a host which utilizes the data 610.

Figure 3F:
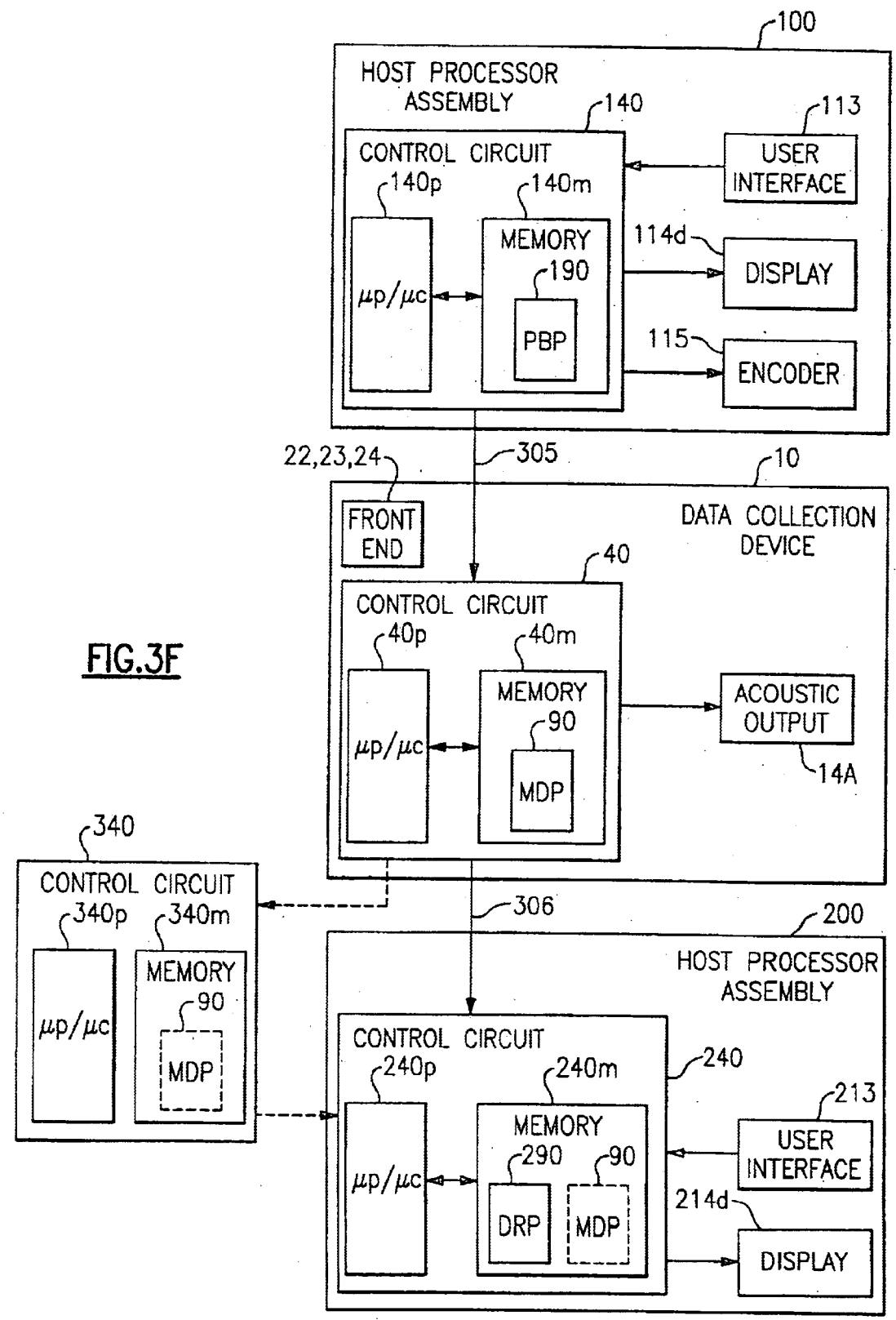

In another embodiment of the present invention depicted in FIG. 3f, the function of device user interface 13 is provided by a host processor assembly 100 as explained previously in connection with FIGS. 1b and 1d. Host processor assembly 100 allows a user to program in a set of data editing instructions. The detachable host processor assembly 100 is connected to device 10 via a communication link 305 for transmission of data editing instructions to device 10. Communication link 305 may be for example, a USB link, an RS232 link, an IR link, an RF link, or a network link such as an Internet or Intranet link. Communication link 305 can also be provided by an instructional dataform, e.g. dataform 310 and 312 as described in FIGS. 3i and 3j. Host 100 transmits the set of data editing instructions over the link 305 and control circuit 40 of device 10 uses this set of instructions to configure the program 90 within the control circuit 40 to edit data from the data reading front end or ends, according to an operator-specified protocol, prior to the data being output to data-receipt host processor assembly 100. Other than the transmission of data editing instructions, communication is normally not required between host 100 and device 10. Therefore, after the transmission of a set of instructions, device 10 can be detached from host if there is a physical communication link between host 100 and device 10.

With further reference to FIG. 3f, it is seen that message data editing program 90 described previously can be incorporated in data receive host-processor assembly 200, or in a "BLACK BOX" type circuit 340 interposed between device 10 data-receipt host processor assembly 200. A control circuit disposed as indicated by control circuit 340 shall be considered included in device 10 for purposes of the invention. As is indicated in FIG. 3g program builder host processor assembly 100, and data relay processor assembly 200 can be embodied by a single processor assembly 100, 200 equipped with both of a program builder program 190 and a data receipt program 290.

Figure 3G:
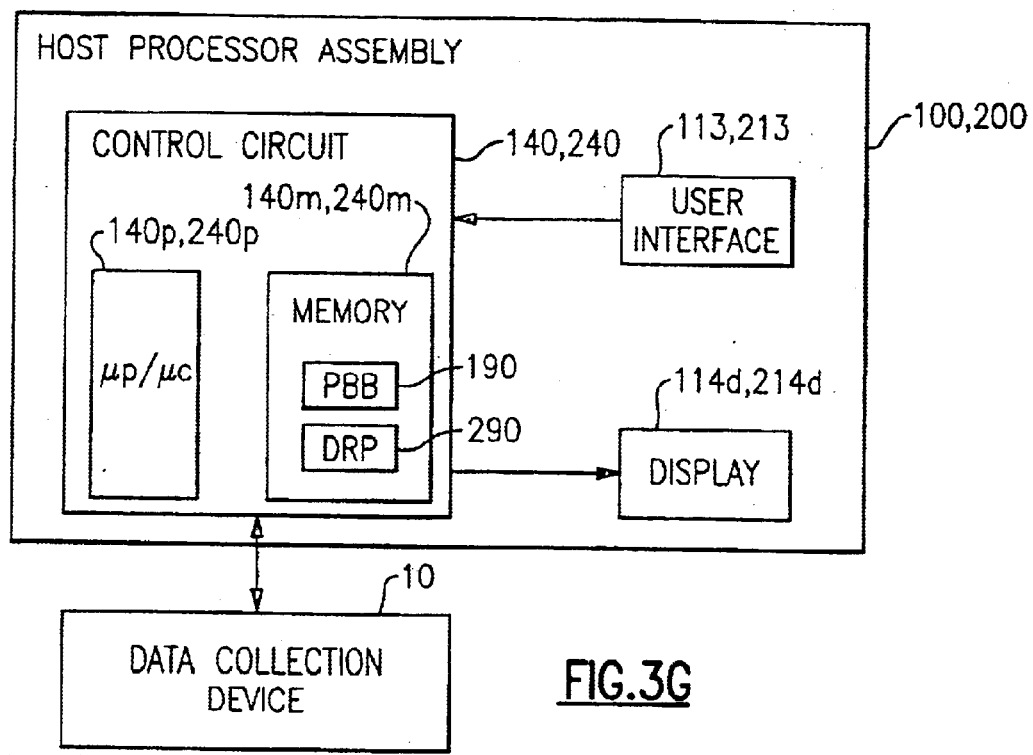
Figure 3H:
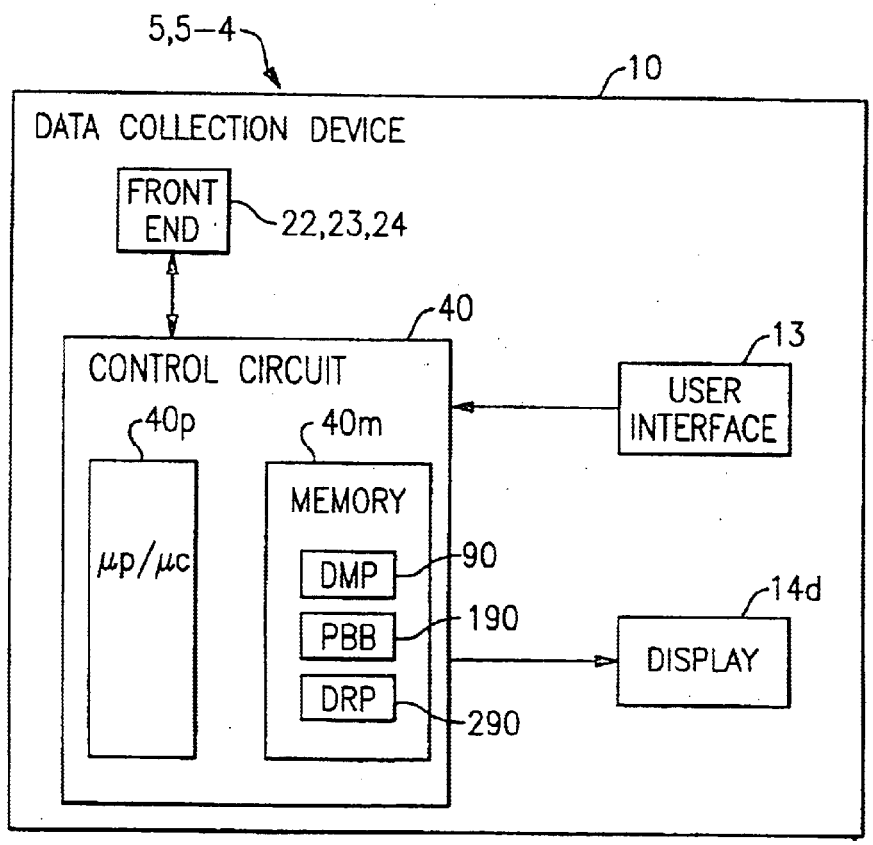

Further, a data editing system of the invention can also have the general form as indicated by system 5-4 of FIG. 3h. In the embodiment of FIG. 3g. data collection device 10 includes a control circuit 40 comprising a powerful processor 40p which is configured to receive data inputs via a device integrated user interface 13 and to control messages displayed on device-integrated display 40. Processor 40p in the embodiment of FIG. 3g may include a combination of a first device-integrated host processor for receiving inputs from user interface 13 and for controlling output functions including controlling display 14d a second device-integrated front-end servicing processor for controlling and receiving data from front end 22, 23, and 24. Processor 40p in the embodiment of FIG. 3g may also comprise a single powerful host processor for coordinating data transfers between processor 40 and user interface 13, between processor 40p and display 14d and between processor 40p and front end 22, 23, and 24.

Control circuit 40 in the embodiment of FIG. 3g may include a program builder program 190 which operates control circuit 40 to display program-building aiding messages on display 14 as described previously in connection with FIGS. 1b, 1d, and 2b–2h. Control circuit 40 may also incorporate a message data receipt program 290, as described previously in connection with FIGS. 2e–2h. Because of the added functionality of processor 40p in the embodiment of FIG. 3g, device 10 of FIG. 11 can be considered to comprise an integrated host processor assembly.

Data editing system 5-4 comprising device integrated program builder program 190 comprises substantially the functionality of system 5-2 described in connection with FIGS. 1*b*, 1, and 2*b*–2*h* and therefore is highly useful and advantageous. However system 5-2 unlike system 5-4 can be universally applied relative to all data collection devices including those that have and those that do not have integrated user interfaces and displays. Further, system 5-2 takes advantage of a normally larger and easier to use user interface 113 and display 114*d* of a nonintegrated host processor assembly 100 which in its most common form is provided by a personal computer (PC). Still further, system 5-2, because it requires fewer installations of program 190 to provide the functionality of the invention to several of devices 10, system 5-2, is easier to upgrade and service than is system 5-4, when the invention is made available in several devices 10.

In yet another embodiment of the present invention shown in FIG. 3*i* the set of instructions to configure the program 90 within the control circuit 40 is communicated to the control circuit 40 by means of an instructional bar code 310 or a set of such bar codes. An instructional bar code 310 may be read by the bar code reading front end, e.g. front end 22 which transmit the data from instructional bar code 310 to control circuit 40. Processor Assembly 100 or device 10 if equipped with a symbology encoder 115, which are well known, can be configured to encode instructional symbol 310 after a set of data editing instructions is built using program builder 190.

In yet another alternative embodiment of the present invention shown FIG. 3*j* instructional commands are communicated to the control circuit 40 by means of instructional radio frequencies transmitted from an instructional transponder 312 or a set of transponders. The instructional radio frequencies are detected by the radio frequency reading front end 23, which transmit the data of the instructional radio frequency reading front end 23, which transmit the data of the instructional radio frequencies to the control circuit 40. The control circuit 40 uses the instructional command data to configure program 90 within control circuit 40. Processor assembly 100 or device 10 if equipped with transponder encoder also designated by reference number 115, can be configured to encode instructional transponder 312 in accordance with a set of data editing instructions built using program builder program 190. Use of instructional dataforms e.g. dataforms 310 an 312 to provide communication link 305 is highly advantageous in certain applications. Use of instructional dataforms e.g. dataforms 310 and 312 renders it unnecessary to provide a physical (e.g. RS-232, USB, RF, IR, Intranet, Internet) communication link between host assembly 100 and device 10. Therefore, the message data editing programs 90 of an inventory of devices 10 can be configured with new messaging data editing routines without there being formed a physical communication link between host 100 and any of the devices 10.

As explained herein the configuration of the program 90 within the control circuit can also be made with a plurality of levels of complexity in the instructional commands. For example in any of the configuration embodiments shown above, program 90 may have a one-action user-friendly configuration level for simple configuration and more advanced plural action levels for more complex yet also user-friendly configuration.

In one embodiment, the one-action user-friendly configuration level includes one-action user commands to configure program 90 to edit a decoded-out message corresponding to a certain two-dimensional data symbol that contains a known sequence of data (e.g. part number, part quantity, license plate number, and reference number into format receivable by a host 200).

In the specific example described with reference to FIG. 1*c*, the single action of selecting one of the menu choices 14*i*1, 14*i*2, 14*i*3, or 14*i*4 displayed on menu driver display screen results in program 90 being reconfigured. Device 10 can be configured so that a menu option e.g. 14*i*1 of display screen 14*md* can be selected by pressing the number e.g. "1" corresponding to the menu option. Device 10 can also be configured with a graphical user interface so that the selecting of a menu option is accomplished by highlighting and "clicking on" the menu option. Reader 10*a* comprises a pointer 13*p* for operating a GUI pointer icon appearing on display 14*d*. The act of selecting a GUI driver menu option is considered a "single-action" herein even though such action can technically be broken down into the plural actions of highlighting and "clicking on."

In operation, once the operator selects one of the one-action commands, the control circuit 40 uses a set of more complex instructional commands already stored inside the control circuit's memory to configure program 90. After receiving the instructional commands, the program 90 data received from a data reading front end into a format acceptable to a host, such as data-receive host 200.

Alternatively, if more complex configuration is desired, the user can custom configure the editing and formatting of the data by using a plurality of actions. In this embodiment, which may or may not be connected with the one-action configuration embodiment described above, the user is allowed to send in specific complex instructions to program 90 on what information to search, sequence, match and/or add.

To facilitate the development at such a set of instructions a programmer-user may use a data editing system such as system 5-2 or 5-3 which as explained previously includes a program builder program 190. Program builder program 190, in one embodiment aids a programmer-user in developing a set of data editing instructions by displaying program build-aiding messages on display 114*d* or display 14*d*. Such messages may be a representation of the set of instructions currently being authorized by the programmer-user and/or prompt messages which prompt a programmer-user to enter information regarding the required output format of edited data. As explained herein, the required output format of the edited data 50 may be established by the requirements of data receipt host processor assembly 200.

In operation the programmer-user using a plurality of user-actions sends a set of complex instructional commands to configure program 90. The set of instructional commands may be stored in the memory 40*m* of control circuit 40 for later use by the one-action command methods shown and described above. After receiving a set of data editing instructions, the program 90 is configured to edit the data received from a data reading front end into a format acceptable to a data receipt 200 host.

It will be apparent to one skilled in the art that other alternatives and variations are possible without departing from the inventive concepts set forth above. For example, the program 90 may allow the user to enter the desired instructional commands in natural English language format. After the user enters the instructional commands in "English," the control circuit 40 and/or control circuit 140 may utilize a translation program stored in the control circuit 40 and/or 140 to determine which set of more complex instructional commands already stored inside a memory 40*m*, 140*m* memory to send to program 90. After receiving the complex instructional commands, the program 90 is configured the editing of the data received from a data reading front end e.g. 22 into a format acceptable to a data receipt 200 host.

In addition to the method of configuration described above, the configuration of the program 90 with the control circuit 40 can also be made automatically. For example in the embodiment shown in FIG. 3*a*, the control circuit 40 may briefly activate the two-dimensional indicia reading front end 22 to test for the presence of a certain type of two-dimensional bar code symbol. The presence of that two-dimensional bar code symbol may be indicated by the satisfaction of certain pre-set criteria stored within the memory 40*m* of the control circuit 40. The pre-set criteria may be, for example: (1) presence of certain levels of reflected light (i.e. from the laser, LED or ambient sources); or (2) presence of certain light modulation in response to printed symbols. If the test conditions are satisfied, the control circuit 40 uses a set of instructional commands already stored inside the memory 40M to configure program 90. After receiving the instructional commands, program 90 is configured to editing and formatting the two-dimensional symbol. data received from the two-dimensional reading front end e.g. 22 into a format acceptable to a data receipt host 200 according to a predetermined data editing protocol that is automatically activated whenever the presence of the certain two-dimensional symbol type in target T is detected by device 10. In a variation of the invention, Device 10 is configured so that a driver indicating a plurality of single action-selectable discreet data formatting options e.g. menu driver 14*d* specific to a certain symbology e.g. driver 14*md* is displayed each time the presence of that symbology type is detected by device 10. Alternatively, if the two-dimensional bar code test conditions are not satisfied, then the radio-frequency reading front end 23 can be activated for a pre-configured test and/or operation similar to the method described above. In yet another alternative, if both the test for the two-dimensional bar code and the test for the radio-frequency are not satisfied, then the data reading front end 24 is activated for pre-configured test and/or operations for data designed for that front end 24. It will be apparent to one skilled in the art that other alternatives and variations are possible without departing from the inventive concepts set forth above. For example, the radio frequency reading front end 23 may be activated briefly first rather than a bar code reading front end to test for the presence of a certain radio frequency transponder based on the following set of pre-defined criteria: (1) return signals are detected that appear to be from that transponder; or (2) packets of data are received which match certain pre-selected protocols.

FIG. 3*k* is a flow chart illustrating an embodiment of the data editing and scheme in a control circuit 40 of the present invention. In this embodiment, raw data e.g. data 39 from data reading front end e.g. 22 is delivered over a front end interface 60 to a decode process area 62*o* the control circuit 40. The decode process area decodes the encoded raw data. The decoded output message data 59 is then presented to the edit/format process area 64 of the control circuit 40. Using a concentrate of edit formats (i.e. commands and or fixed text) of program 90, the edit/process area translates the decoded data 59 into an edited and formatted data 50 that is useful to a host 200. The edited 1106 is then outputted over the interface process area 65 to the host 200.

In any of the above embodiments of the present invention, program 90 may be stored in a nonvolatile memory within control circuit 40. However, as an alternative, program 90 may be stored by hardwired or semi-hardwired means such as microprogrammed hardware or hard-wired control logic within control circuit 40. In addition, program 90 can be a firmware that is specifically designed for the control circuit 40.

In addition, in any of the above embodiments, the purpose of the edit section of program 90 is to allow a decoded symbol data, as reported by the control circuit 40 transformed into a data format is useful to a host by using simple edit formats (i.e., commands and/or fixed text).

A set of edit formats (commands and/or fixed text) exists for each symbology or symbology group, which is applied to symbol data of that symbology. When selecting the set or concatenate of edit forms to be used with a decoded data symbology, the edit formats are chosen through the user configuration process area 66 having a plurality of configuration levels 67*a* and 67*b*). The various configuration methods and apparatus in the configuration process area have been discussed above.

While the present invention has been explained with reference to the structure disclosed herein, it is not confined to the details set forth and this invention is intended to cover any modifications and changes as may come within the scope of the following claims.

What is claimed is:

1. A method for editing message data of a data collection device, said method comprising the steps of:

loading a program builder program into a host processor assembly, said processor assembly having a user interface and a display, said program builder program prompting a user via prompt messages displayed on display to enter input data via said data input data respecting a desired output data format, and building a set of data editing instructions based on said entered input data;

loading a message data editing program into said data collection device, said message data editing program adapting said data collection device to execute said set of data editing instructions to edit decoded-out message data of said data collection device;

executing said program building program to build a set of data editing instructions in accordance with data input by said user;

transmitting said set of data editing instructions to said remote data collection device; and executing said message data editing program to execute commands of said set of data editing instructions so that decoded out message data output by said data collection device is edited in accordance with said entered input data.

2. The method of claim 1, wherein said prompt messages displayed by execution of said program builder program prompt a programmer-user to enter data respecting a legacy data receipt program incorporated in a data receipt host.

3. The method of claim 1, wherein said prompt messages caused to be displayed by said program builder program are displayed with use of a graphical user interface.

4. The method of claim 1, wherein said transmitting step includes the step of utilizing said data collection device to decode an instructional dataform.

5. The method of claim 1, wherein said set of data editing instructions includes at least one conditional type instruction.

6. The method of claim 1, wherein said device and said set of data editing instructions are established so that said data collection device can generate intermediate data messages which are acted upon by subsequent data editing instructions.

7. The method of claim 1, wherein said set of data editing instructions include at least one conditional type instruction coupled with a control flag instruction so that a control flag recognizable by said device is raised when a data condition specified by said at least one conditional the instruction is satisfied, said device controlling at least one hardware element of said device when recognizing said control flag.

8. The method of claim 7, wherein said data collection device comprises the form factor of a gun-shaped optical reader.

9. The method of claim 7, wherein said data collection device comprises the form factor of a gun-shaped optical reader.

10. The method of claim 1, wherein said host processor assembly is a nonintegrated host processor assembly.

11. The method of claim 1, wherein said data collection device comprises a portable data terminal form factor, and wherein said host processor assembly is an integrated host processor assembly which is integrated into said data collection device.

12. A method for editing message data generated by a data collection device, comprising the steps of:
developing a set of data editing instructions using a nonintegrated host processor assembly having a display for displaying program building aiding messages, and a user interface;
transmitting said set of data editing instructions to said data collection device;
programming said data collection device so that said editing command program instructions are executed when said data collection device outputs decoded message data so that said message data is output in a form determined by said set of data editing instructions.

13. The method of claim 12, wherein said program building aiding messages displayed by said host processor assembly include representations of the set of instructions currently being authored by a user programmer.

14. The method of claim 13, wherein said displayed instructions are instructions of an intermediate assembly code language.

15. The method of claim 13, wherein said displayed instructions are instructions of a high level data editing language.

16. The method of claim 12, wherein prompt messages prompting a programmer-user to enter data respecting a legacy data receive program incorporated in a data receipt host.

17. The method of claim 16, wherein said prompt messages caused to be displayed by said program builder program are displayed with use of a graphical user interface.

18. The method of claim 12, wherein said transmitting step includes the step of utilizing said data collection device to decode an instructional dataform.

19. The method of claim 12, wherein said set of data editing instructions includes conditional type instructions.

20. The method of claim 12, wherein said device and said set of data editing instructions are established so that said data collection device can generate intermediate result image data messages stored in buffer memory locations.

21. The method of claim 12, wherein said set of data editing instruction include at least one conditional type instruction coupled with a control flag instruction so that a control flag recognizable by said device is raised when a data message satisfied a condition specified by said at least one conditional the instruction is satisfied, said device controlling at least one hardware element of said device when recognizing said control flag.

22. A data collection device, for decoding a dataform, and generating a decoded out message, said data collection device comprising:

a front end for generating electrical signals corresponding to said dataform;
a control circuit responsive to said electrical signals for providing a decoded out message corresponding to electrical signals;
a message data editing program responsive to a set of data editing instructions presented to said control circuit for editing said decoded out message prior to said decoded out message being output to an external device.

23. The data collection device of claim 22, wherein said front end includes an image sensor.

24. The data collection device of claim 22, wherein said front end includes an RF ID reading front end.

25. The data collection device of claim 22, wherein said front end is provided by a smart card reader.

26. The device of claim 22, wherein said data collection device comprises the form factor of a gun-shaped optical reader.

27. The device of claim 22, wherein said set of data editing instructions includes conditional type instruction.

28. The device of claim 22, wherein said device and said set of data editing instructions are established so that said data collection device can generate intermediate result message data messages stored in buffer memory locations.

29. The device of claim 22, wherein said set of data editing instruction include at least one conditional type instruction coupled with a control flag instructions so that a control flag recognizable by said device is raised when a condition specified by said at least one conditional the instruction is satisfied, said device controlling at least one hardware element of said device when recognizing said control flag.

30. The device of claim 22, wherein said set of instructions and said device are configured so that control circuit determines whether there is an incompatibility between said decoded out message and an expected decoded out message.

31. The device of claim 22, wherein said device is an optical reader including a photodetector element, wherein said set of instructions and said device are configured so that said control circuit actuates control of said photodetector element to capture new image data if there is an intermediate level of compatibility between said decoded out message data and said expected message data.

32. The device of claim 22, wherein said device is an optical reader, wherein said set of instructions and said device are configured so that said control circuit actuates control of said control to re-attempt decoder using a current set of image data if there is an intermediate level of incompatibility between said decoded out message data and said expected message data.

33. The device of claim 22, wherein said control circuit is adapted transmit error-containing message data to a data recipient host when said control circuit detects incompatibly decoded-out message data and experienced decoded-out message data.

34. The device of claim 22, wherein said device is an optical reader including a display, wherein said set of instructions and said device are configured so that said control circuit actuates control of said display to display an error message if there is a high but imperfect level of compatibility between said decoded out message data and said expected message data.

35. The device of claim 22, wherein said set of instructions are selected from the group consisting of report type instruction, data locating type instruction, occurrence count type instructions, sorting type instructions, character adding type instructions, flag adding type instruction, and conditional type instructions.

36. The device of claim 22, wherein said set of instruction includes a string data locator type instructions, which when executed by said control circuit causes said control circuit to locate a specified string of characters in said decoded out message.

37. The device of claim 22, wherein said set of data editing instructions includes an occurrence count type instruction which when executed by said control circuit causes said control circuit to keep a running track of the occurrence of a character or character string in said decoded out message data.

38. The device of claim 22, wherein said set of data editing instruction includes an in-message character string adding type of instruction which when executed by said control circuit causes said control circuit to add a specified character or character string within a string of characters.

39. The device of claim 22, wherein said set of data editing instructions includes a flag adding type instruction which when executed by said control circuit causes said control circuit to recognize a control flag, and to execute an action in repose to said control flag being recognized.

40. The device of claim 22, wherein said set of data editing instructions includes a conditional type instruction which when executed by said control circuit allows a subsequent data editing instruction to be executed on the occurrence of a specified condition.

41. The data collection device of claim 22, wherein said set of data editing instructions includes a conditional type instruction coupled with a report type instruction so that message data is conditionally reported on the occurrence of a specified condition.

42. The data collection device of claim 22, wherein said set of data editing instructions includes a conditional type of instruction coupled with flag adding type instruction so that a control flag recognizable by said device is conditionally executed on the occurrence of a specified condition existing relative to said decoded out message data.

43. The data collection device of claim 22, wherein said data collection device include a program selector program, for selecting at least one predetermined set of data editing instructions for execution by said message data editing program.

44. The data collection device of claim 22, wherein said device is adapted to present to a programmer a menu driver presenting a user with a plurality of data editing options, wherein selection of a certain one of said options results in said control circuit exiting a predetermined set of data editing instructions.

45. The data collection device of claim 22, wherein said device includes a display screen, and wherein said menu driver includes a menu display on said display screen.

46. A data collection device comprising:
a front end for reading data;
a control circuit connected to said front end, said control circuit decoding said data and converting said decoded data into a format selectable from a plurality of data formats;
an interface for conveying said data to a host in the selected data format, said interface is connected with said control circuit, wherein said data is pre-processed into a two-dimensional bar code data format before being converted by said control circuit into the format selectable from the plurality of data formats.

47. The data collection device of claim 46, wherein said data reading front end comprises a two-dimensional bar code reading front end.

48. The data collection device of claim 46, wherein said control circuit uses hardwire means for converting said data into the format selectable from the plurality of data formats.

49. The data collection device of claim 46, wherein said control circuit includes a program for converting said data into the format selectable from the plurality of data formats.

50. The data collection device of claim 49, wherein said control circuit includes a microprocessor to process said program.

51. The data collection device of claim 49, wherein said program is a firmware stored in a nonvolatile memory inside said control circuit and designed specifically for said control circuit in said data collection device.

52. The data collection device of claim 49, wherein said program is configured mechanically.

53. The data collection device of claim 49, wherein said program is configured electronically.

54. The data collection device of claim 49, wherein said program is configured by a user of said data collection device using a detachable computer non-wirelessly connected over a wire interface and into a wire port on a side of said control circuit.

55. The data collection device of claim 49, wherein said program is configured by a user of said data collection device using a detachable computer wirelessly connected by infrared radiation over a infrared interface and into an infrared port on a side of said control circuit.

56. The data collection device of claim 49, wherein said program is configured by wireless means.

57. The data collection device of claim 49, wherein said program is configured by instructional commands that is read by said data reading front end, which communicates said instructional commands to said program within said control circuit.

58. The data collection device of claim 57, wherein said instructional commands are in the form of instructional bar codes.

59. The data collection device of claim 57, wherein said instructional commands are in the form of instruction radio frequencies.

60. The data collection device of claim 49, wherein said program is configured automatically.

61. The data collection device of claim 49, wherein for converting said decoded data, said program uses a set of edit formats selected from the group consisting of data locators, default preambles, default postambles, last result reporting, occurrence number modifiers, IF conditionals, WHILE loops, DO WHILE loops, and fixed text.

62. The data collection device of claim 49, wherein said data locators are used to configure said program for sequencing the transmission of data to said host in any sequence required by said host.

63. The data collection device of claim 49, wherein said data locators are supplemented by preamble and postamble commands that are used to configure said program for adding information to data transmitted to said host.

64. The data collection device of claim 63, wherein said preamble and postamble commands are used to configure said program for adding information to a specific group of data transmitted to said host.

65. The data collection device of claim 64, wherein said preamble and postamble commands are used to configure said program for transmitting the added information before said data is transmitted.

66. The data collection device of claim 64, wherein said preamble and postamble commands are used to configure said program for transmitting the added information before said data is transmitted.

67. The data collection device of claim 49, wherein a set of edit formats is used to configure said program for transmitting a confirmation message if there is a match to the data being searched, said set of edit formats comprises the edit formats IF conditionals and data locators and at least one more edit formats selected from the following group of edit formats consisting of last result reporting, occurrence number modifiers, WHILE loops, DO WHILE loops, and fixed text.

68. A data collection device comprising:

a front end for reading data;

a control circuit connected to said front end, said control circuit decoding said data and converting said decoded data into a format selectable from a plurality of data formats;

an interface for conveying said data to a host in the selected data format, said interface is connected with said control circuit, wherein said data reading front end comprises a radio frequency reading front end to read radio frequency data, wherein said pre-processing of said radio frequency data into said two-dimensional bar code data format is made in a control process block within said radio frequency reading front end.

69. A data collection device comprising:

a front end for reading data;

a control circuit connected to said front end, said control circuit decoding said data and converting said decoded data into a format selectable from a plurality of data formats;

an interface for conveying said data to a host in the selected data format, said interface is connected with said control circuit, wherein said control circuit includes a program for converting said data into the format selectable from the plurality of data formats, wherein said program is configured by a user of said data collection device using a plurality of mechanical switches and a register connected with said switches and said control circuit.

70. A data collection device comprising:

a front end for reading data;

a control circuit connected to said front end, said control circuit decoding said data and converting said decoded data into a format selectable from a plurality of data formats;

an interface for conveying said data to a host in the selected data format, said interface is connected with said control circuit, wherein said control circuit includes a program for converting said data into the format selectable from the plurality of data formats, wherein said program is configured by temporarily activating said data reading front end to test for the presence of certain data type and, if said test is satisfied, then said control circuit uses a set of instructional commands already stored inside the memory of said control circuit to configure said program.

71. The data collection device of claim 70, wherein said data reading front end is a two-dimensional bar code reading front end, said test is for a certain type of two-dimensional bar code symbol.

72. A data collection device comprising:

a front end for reading data;

a control circuit connected to said front end, said control circuit decoding said data and converting said decoded data into a format selectable from a plurality of data formats;

an interface for conveying said data to a host in the selected data format, said interface is connected with said control circuit, further comprises a radio frequency reading front end and means for activating said radio frequency front end if the test is not satisfied.

73. A data collection device comprising:

a front end for reading data;

a control circuit connected to said front end, said control circuit decoding said data and converting said decoded data into a format selectable from a plurality of data formats;

an interface for conveying said data to a host in the selected data format, said interface is connected with said control circuit;

means to test for presence of a certain type of radio frequency data, and if said test for said radio frequency data is satisfied, then said control circuit uses a set of instructional commands stored inside the memory of said control circuit to configure said program for editing and formatting said radio frequency data.

74. The data collection device of claim 73, wherein said data reading front end is a radio frequency reading front end, said test is for a certain type of radio frequency data, and said instructional commands is for said radio frequency data.

75. A data collection device comprising:

a front end for reading data;

a control circuit connected to said front end, said control circuit decoding said data and converting said decoded data into a format selectable from a plurality of data formats;

an interface for conveying said data to a host in the selected data format, said interface is connected with said control circuit;

a two-dimensional bar code reading front end means for activating said two-dimensional bar code reading front end if a test is not satisfied.

76. A data collection device comprising:

a front end for reading data;

a control circuit connected to said front end, said control circuit decoding said data and converting said decoded data into a format selectable from a plurality of data formats;

an interface for conveying said data to a host in the selected data format, said interface is connected with said control circuit;

means to test for the presence of a certain type of two-dimensional bar code symbol, and if said test for said two-dimensional bar code symbol is satisfied, then said control circuit uses a set of instructional commands stored inside the memory of said control circuit to configure said program for editing and formatting said two-dimensional bar code symbol.

77. A data collection device comprising:

a front end for reading data;

a control circuit connected to said front end, said control circuit decoding said data and converting said decoded data into a format selectable from a plurality of data formats;

an interface for conveying said data to a host in the selected data format, said interface is connected with said control circuit, wherein said control circuit includes a program for converting said data into the format selectable from the plurality of data formats, wherein said data locators are used to configure said program for searching a specific section of data read by said data reading front end and send said specific section of data to said host after said specific section of data is found.

78. A data collection device comprising:
a front end for reading data;
a control circuit connected to said front end, said control circuit decoding said data and converting said decoded data into a format selectable from a plurality of data formats;
an interface for conveying said data to a host in the selected data format, said interface is connected with said control circuit, wherein said control circuit includes a program for converting said data into the format selectable from the plurality of data formats, wherein said data locators are used to configure said program for searching a plurality of specific sections of data read by said data reading front end and send said plurality of specific sections of data to said host after said sections of data are found.

79. A data collection device comprising:
a front end for reading data;
a control circuit connected to said front end, said control circuit decoding said data and converting said decoded data into a format selectable from a plurality of data formats;
an interface for conveying said data to a host in the selected data format, said interface is connected with said control circuit, wherein said data reading front end comprises a two-dimensional bar code reading front end and a radio frequency reading front end.

80. A data collection device comprising:
a front end for reading data;
a control circuit connected to said front end, said control circuit decoding said data and converting said decoded data into a format selectable from a plurality of data formats;
an interface for conveying said data to a host in the selected data format, said interface is connected with said control circuit, wherein said data reading front end comprises a two-dimensional bar code reading front end and a radio frequency reading front end.

81. A data collection device comprising:
a radio frequency reading front end including;
a radio frequency receiver for reading radio frequency data connected with said antenna;
a control process block connected with said frequency receiver;
a control circuit connected to said control process block, said control circuit comprising:
a decode process area for decoding said radio frequency data;
an edit/format process area connected to said decode process area, said edit/format process are converts said decoded data into a format selectable from a plurality of data format and;
an interface for conveying said data to a host in the selected data format, said interface is connected to said control circuit,
wherein said radio frequency data is pre-processed into a two-dimensional bar code format before being converted in the edit-format process area.

82. A data collection device comprising:
a radio frequency reading front end including;
a radio frequency receiver for reading radio frequency data connected with said antenna;
a control process block connected with said frequency receiver;
a control circuit connected to said control process block, said control circuit comprising:
a decode process area for decoding said radio frequency data;
an edit/format process area connected to said decode process area, said edit/format process are converts said decoded data into a format selectable from a plurality of data format and;
an interface for conveying said data to a host in the selected data format, said interface is connected to said control circuit,
wherein said control process block pre-processed said radio frequency data into a two-dimensional bar code data format.

* * * * *

UNITED STATES PATENT AND TRADEMARK OFFICE
CERTIFICATE OF CORRECTION

PATENT NO. : 6,758,403 B1
DATED : July 6, 2004
INVENTOR(S) : Barry Keys, Stephen P. Deloge and Larry Ramsey-Macomber It is certified that error appears in the above-identified patent and that said Letters Patent is hereby corrected as shown below:

Column 1,
Line 18, delete "4".

Column 3,
Line 63, delete "builder program".

Column 5,
Line 59, change "10 a" to -- 10a --.

Column 7,
Line 59, change "in that in" to -- in that --

Column 9,
Lines 37 and 39, change "sl" to -- s1 --;
Line 39, change "pall" to -- pal1 --.

Column 11,
Line 42, delete "is" before "actual decoded-out".

Column 12,
Line 48, change "me" to -- be --.

Column 13,
Line 31, "#32" should read -- # --.

Column 14,
Lines 17-18, "% PRA(Default" to -- %^PRA(Default --.

Column 17,
Lines 25-26, "between the and ' (characters" should read -- between the ' and (characters --.

Column 20,
Line 41, "%DM^N=9,2-1." should read -- %DM^N=9,2-1%. --.

Column 21,
Line 31, change "me" to -- may --.

Column 23,
Line 15, change "to.used" to -- to use --;
Line 44, after "keywords" delete "in".

UNITED STATES PATENT AND TRADEMARK OFFICE
CERTIFICATE OF CORRECTION

PATENT NO. : 6,758,403 B1
DATED : July 6, 2004
INVENTOR(S) : Barry Keys, Stephen P. Deloge and Larry Ramsey-Macomber It is certified that error appears in the above-identified patent and that said Letters Patent is hereby corrected as shown below:

Column 26,
Line 50, delete entire line beginning with "S1".

Column 27,
Line 62, "j = j + 1." should read -- j = j + 1 --.

Column 28,
Lines 42-43, "k = k + 1" should read -- k = k + 1
 } --;
Line 45, delete the entire line beginning with "While(k<j)".

Column 30,
Lines 3-5, insert -- { -- on separate line under "else".
Lines 19-20, "A '%' in the" should read -- A '*' in the --.

Column 38,
Line 22, "retu 4 rns immediate" should read -- returns immediately --.
Line 55, "bee3p" should read -- beep --.

Column 39,
Line 21, change "display 14d" to -- display 114d --.

Column 44,
Line 14, change "comprises" to -- comprise --.
Line 19, change "routine, host" to -- routine. Host --.
Line 23, delete "of".

Column 45,
Line 52, change "a described" as -- as described --.
Line 57, before "microcontroller" delete "LS".

Column 47,
Line 10, change "is" to -- if --.
Line 44, change "device" to -- device 10 --.
Line 49, change "ends. In a manner" to -- ends, in a manner --

Column 48,
Line 28, after "device 10" insert -- and --.
Line 38, "FIG. 3g." should read -- FIG. 3g, --
Line 46, after "display 14d" insert -- and --.

Column 49,
Line 12, change "system 5-2, is" to -- system 5-2 is --.

UNITED STATES PATENT AND TRADEMARK OFFICE
CERTIFICATE OF CORRECTION

PATENT NO. : 6,758,403 B1
DATED : July 6, 2004
INVENTOR(S) : Barry Keys, Stephen P. Deloge and Larry Ramsey-Macomber It is certified that error appears in the above-identified patent and that said Letters Patent is hereby corrected as shown below:

Column 49 (cont'd),
Line 42, after "dataforms 310" change "an" to -- and --.

Column 51,
Line 19, change "symbol." to -- symbol --.
Line 26, change "discreet" to -- discrete --.
Line 51, change "62o" to -- 62 of --.
Line 58, change "edited 1106" to -- edited and formatted data --.

Column 53,
Lines 57-58, change "set of data editing instruction include" to -- set of data editing instructions includes --.

Column 54,
Line 25, change "include" to -- includes --;
Line 28, after "conditional" change "the" to -- type --.
Line 34, before "control circuit" insert -- said --.
Line 51, before "transmit" insert -- to --.

Column 55,
Lines 12-13, change "instruction includes" to -- instructions includes --.
Line 37, change "include" to -- includes --

Column 56,
Lines 46, 50 and 65, before "data locators" delete "said".

Column 59,
Line 14, before "data locators" delete "said".

Signed and Sealed this

Thirty-first Day of May, 2005

JON W. DUDAS
*Director of the United States Patent and Trademark Office*